(12) United States Patent
Boualleg et al.

(10) Patent No.: US 12,404,762 B2
(45) Date of Patent: Sep. 2, 2025

(54) DRILLING SYSTEM

(71) Applicant: Schlumberger Technology Corporation, Sugar Land, TX (US)

(72) Inventors: Riadh Boualleg, Stonehouse (GB); Geoffrey Charles Downton, Stonehouse (GB); Jean Marie Degrange, Sugar Land, TX (US); Steven G. Villareal, Houston, TX (US); Maja Ignova, Stonehouse (GB); Ling Li, Stonehouse (GB); Katharine L. Mantle, Stonehouse (GB); Tao Yu, Beijing (CN); Jia Yao, Beijing (CN); Kai Feng Zhao, Beijing (CN); Paul Bolchover, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 870 days.

(21) Appl. No.: 17/441,522

(22) PCT Filed: Mar. 20, 2020

(86) PCT No.: PCT/US2020/024021
§ 371 (c)(1),
(2) Date: Sep. 21, 2021

(87) PCT Pub. No.: WO2020/191360
PCT Pub. Date: Sep. 24, 2020

(65) Prior Publication Data
US 2022/0170359 A1    Jun. 2, 2022

Related U.S. Application Data

(60) Provisional application No. 62/950,934, filed on Dec. 20, 2019, provisional application No. 62/849,975, (Continued)

(51) Int. Cl.
*E21B 44/00* (2006.01)
*E21B 7/04* (2006.01)
(Continued)

(52) U.S. Cl.
CPC ............... *E21B 44/00* (2013.01); *E21B 7/04* (2013.01); *E21B 47/024* (2013.01); *G06N 20/20* (2019.01);
(Continued)

(58) Field of Classification Search
CPC .......... E21B 44/00; E21B 7/04; E21B 47/024; E21B 2200/20; E21B 2200/22;
(Continued)

(56) References Cited

U.S. PATENT DOCUMENTS 7,172,037 B2   2/2007  Dashevskiy et al.
7,461,705 B2   12/2008 Hulick et al.
(Continued)

FOREIGN PATENT DOCUMENTS

WO  WO-2018132786 A1 *  7/2018 ............... G01V 1/50
WO     2018231363 A1   12/2018
(Continued)

OTHER PUBLICATIONS

Barr et al. "Steerable Rotary Drilling with an Experimental System" SPE/IADC Drilling Conference (Year: 1995).*
(Continued)

*Primary Examiner* — Rehana Perveen
*Assistant Examiner* — Troy A Maust
(74) *Attorney, Agent, or Firm* — Jeffrey D. Frantz

(57) ABSTRACT

A method can include acquiring drilling performance data for a downhole tool; modeling drilling performance of the downhole tool to generate results; training a machine learning model using the drilling performance data and the results
(Continued)

to generate a trained machine learning model; and predicting behavior of the downhole tool using the trained machine learning model.

16 Claims, 47 Drawing Sheets

Related U.S. Application Data filed on May 20, 2019, provisional application No. 62/821,551, filed on Mar. 21, 2019.

(51) Int. Cl.
*E21B 47/024* (2006.01)
*G06N 20/20* (2019.01)

(52) U.S. Cl.
CPC ....... *E21B 2200/20* (2020.05); *E21B 2200/22* (2020.05)

(58) Field of Classification Search
CPC . E21B 7/10; E21B 44/02; E21B 34/16; E21B 43/12; E21B 47/00; E21B 47/003; G06N 20/20
See application file for complete search history.

(56) References Cited

U.S. PATENT DOCUMENTS

| | | | |
|---|---|---|---|
| 9,285,794 B2 | 3/2016 | Wang et al. | |
| 9,482,084 B2 | 11/2016 | Chang et al. | |
| 10,472,893 B2 | 11/2019 | Benson et al. | |
| 11,391,143 B2* | 7/2022 | Johnston | E21B 7/04 |
| 2007/0021857 A1* | 1/2007 | Huang | E21B 10/00 |
| | | | 703/7 |
| 2009/0114445 A1 | 5/2009 | Dashevskiy | |
| 2010/0127530 A1 | 5/2010 | Elliott et al. | |
| 2015/0218914 A1 | 8/2015 | Marx et al. | |
| 2016/0281490 A1 | 9/2016 | Samuel | |
| 2017/0191314 A1 | 7/2017 | Faircloth et al. | |
| 2017/0211356 A1 | 7/2017 | Samuel et al. | |
| 2019/0284908 A1 | 9/2019 | Dykstra et al. | |
| 2019/0284909 A1 | 9/2019 | Spencer et al. | |
| 2019/0284921 A1 | 9/2019 | Xue et al. | |

FOREIGN PATENT DOCUMENTS

| | | |
|---|---|---|
| WO | 2019190982 A1 | 10/2019 |
| WO | 2019217813 A1 | 11/2019 |

OTHER PUBLICATIONS

Exam Report issued in United Kingdom patent application No. GB2113750.0 dated Jun. 21, 2022, 2 pages.
International Search Report and Written Opinion in International Patent Application No. PCT/US2020/024021, dated Jun. 9, 2020, 11 pages.
International Preliminary Report on Patentability in International Patent Application No. PCT/US2020/024021, dated Sep. 30, 2021, 10 pages.

* cited by examiner

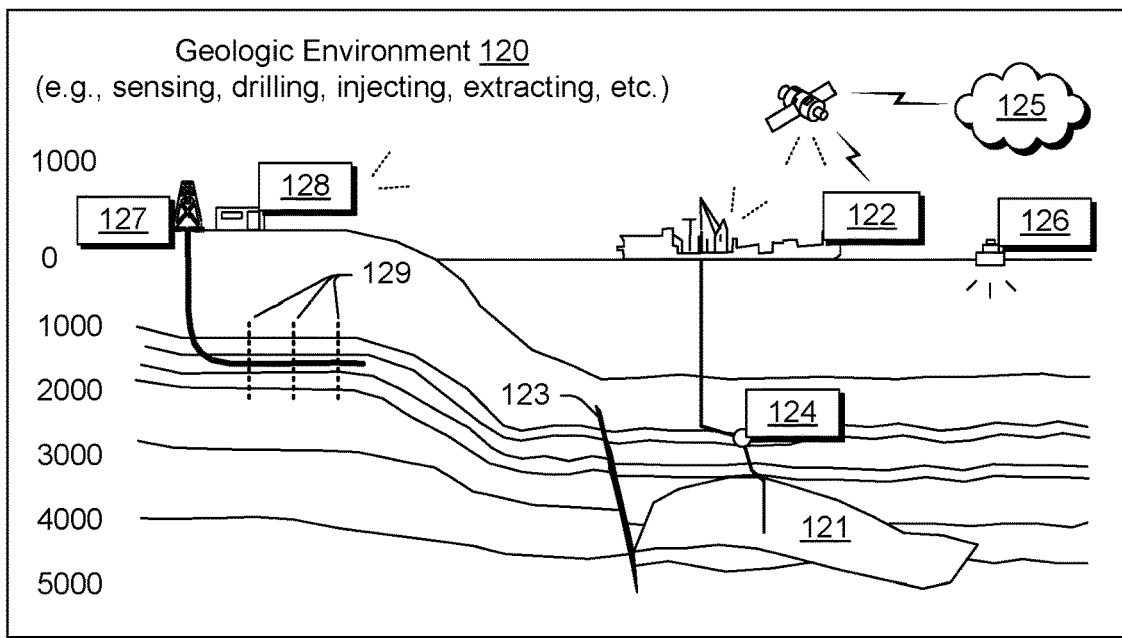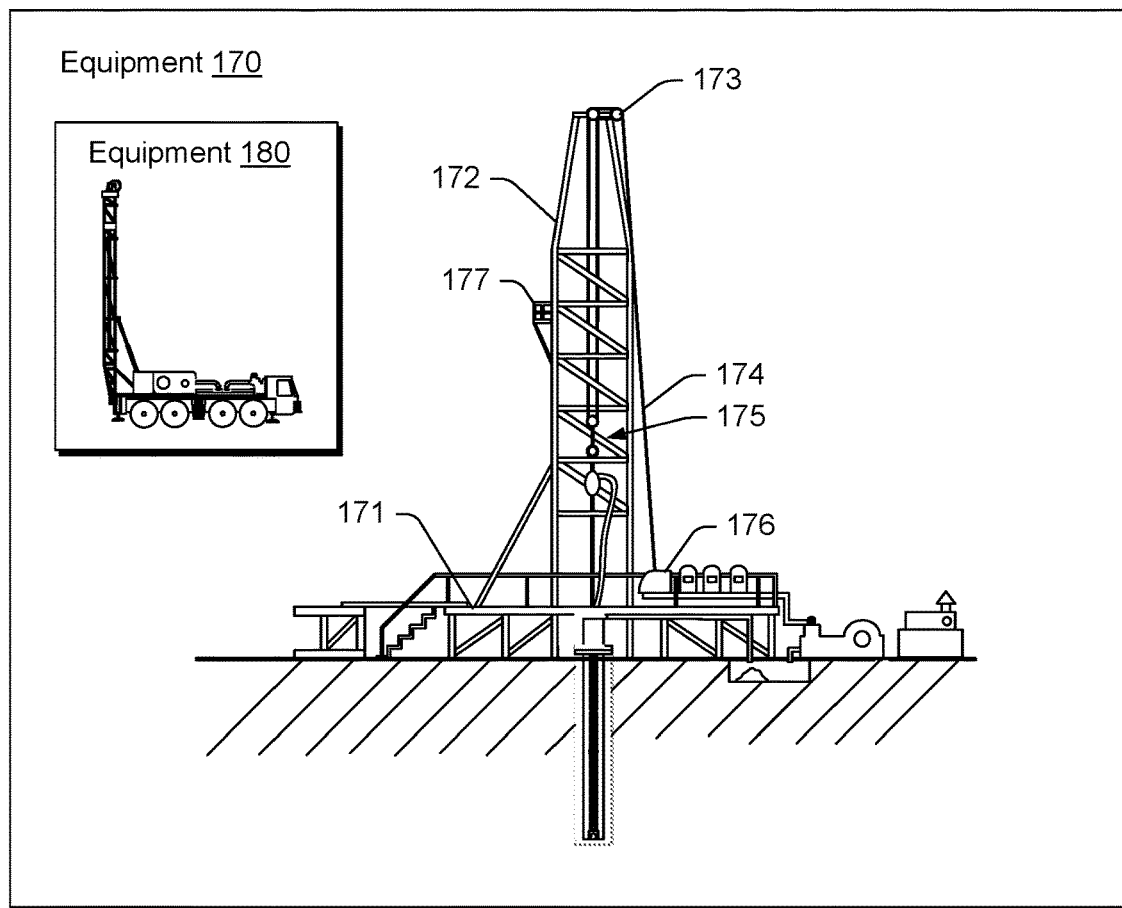
Fig. 1

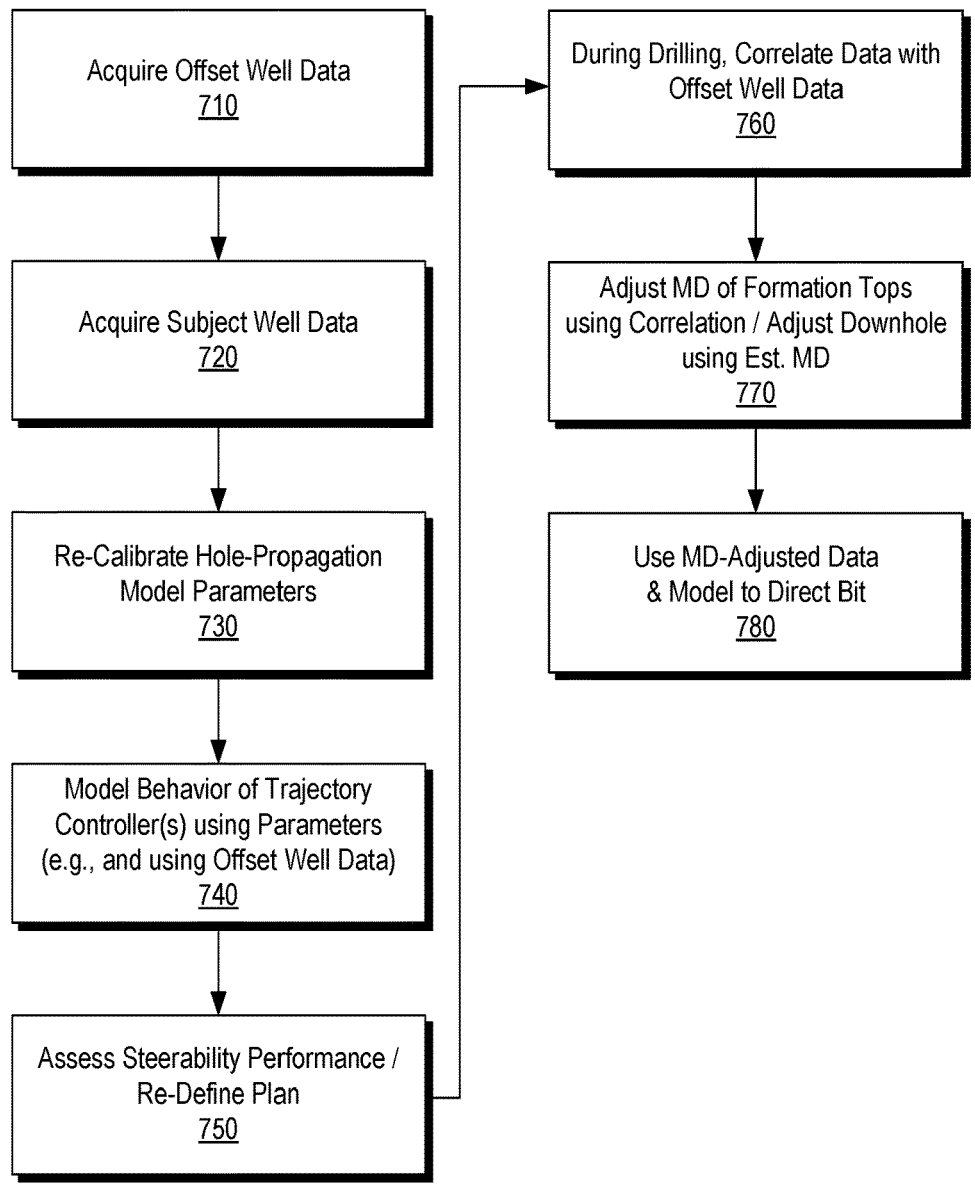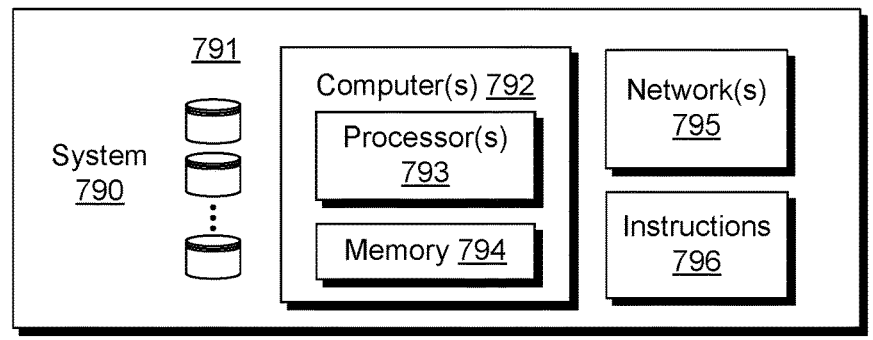
Fig. 7

Outputs 1100
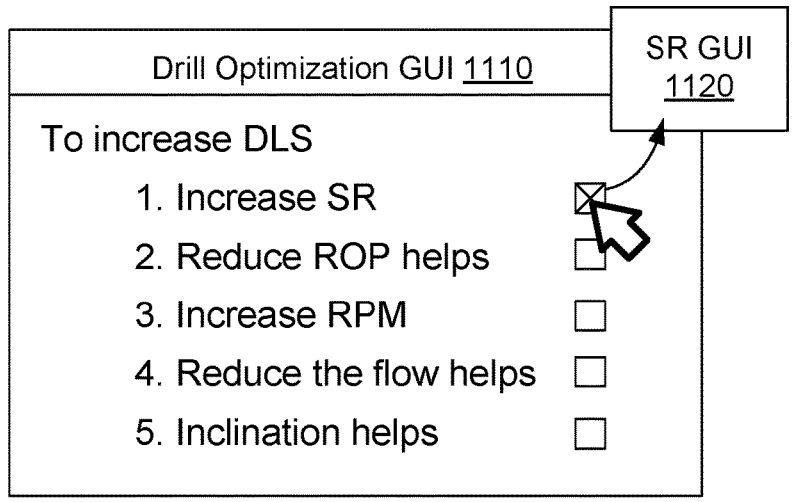
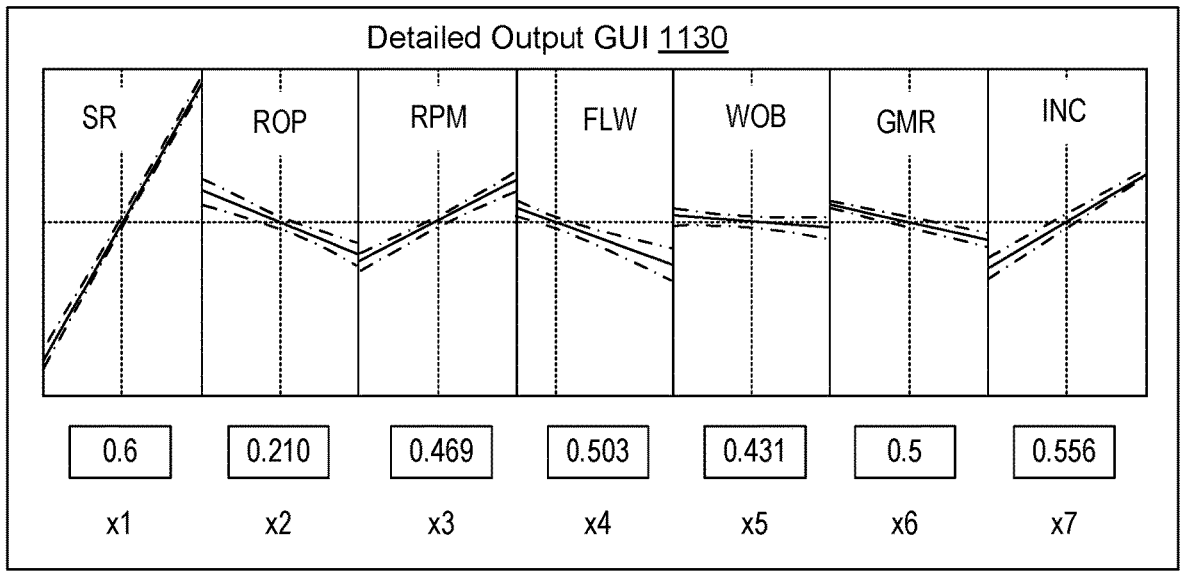
Fig. 11

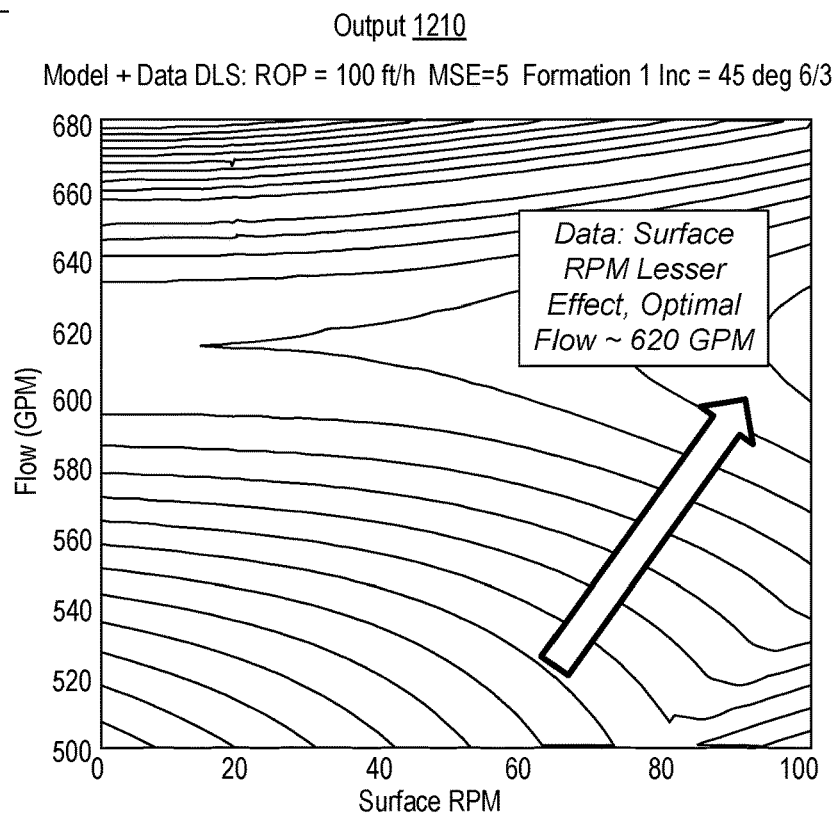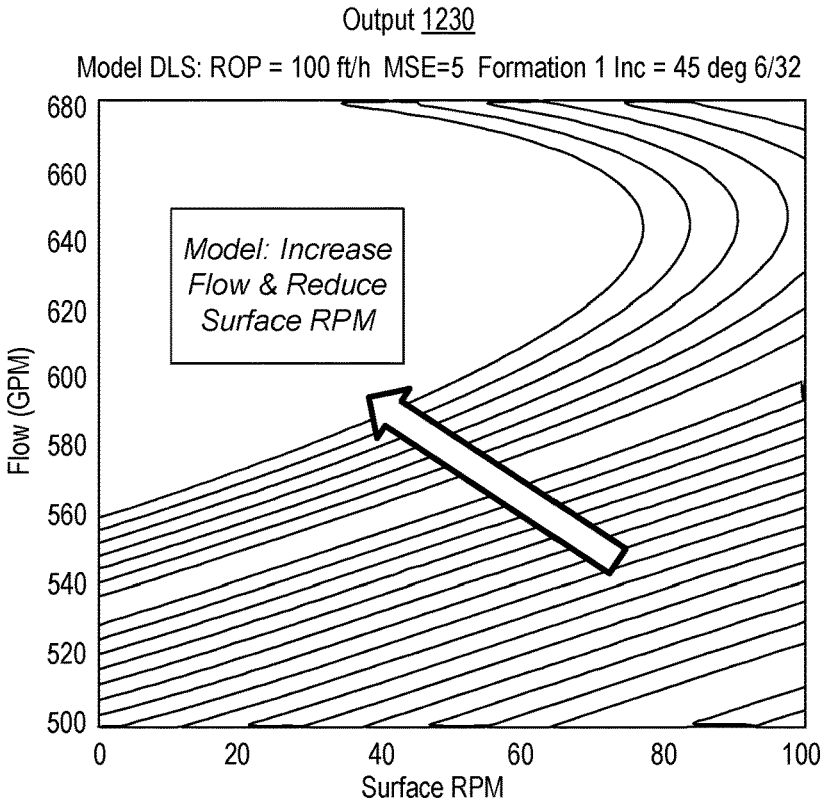
Fig. 12

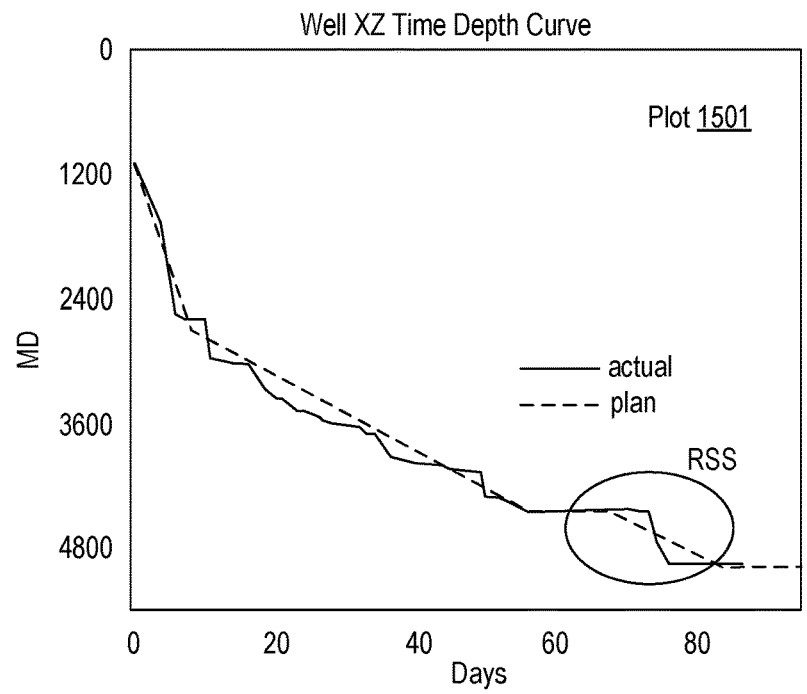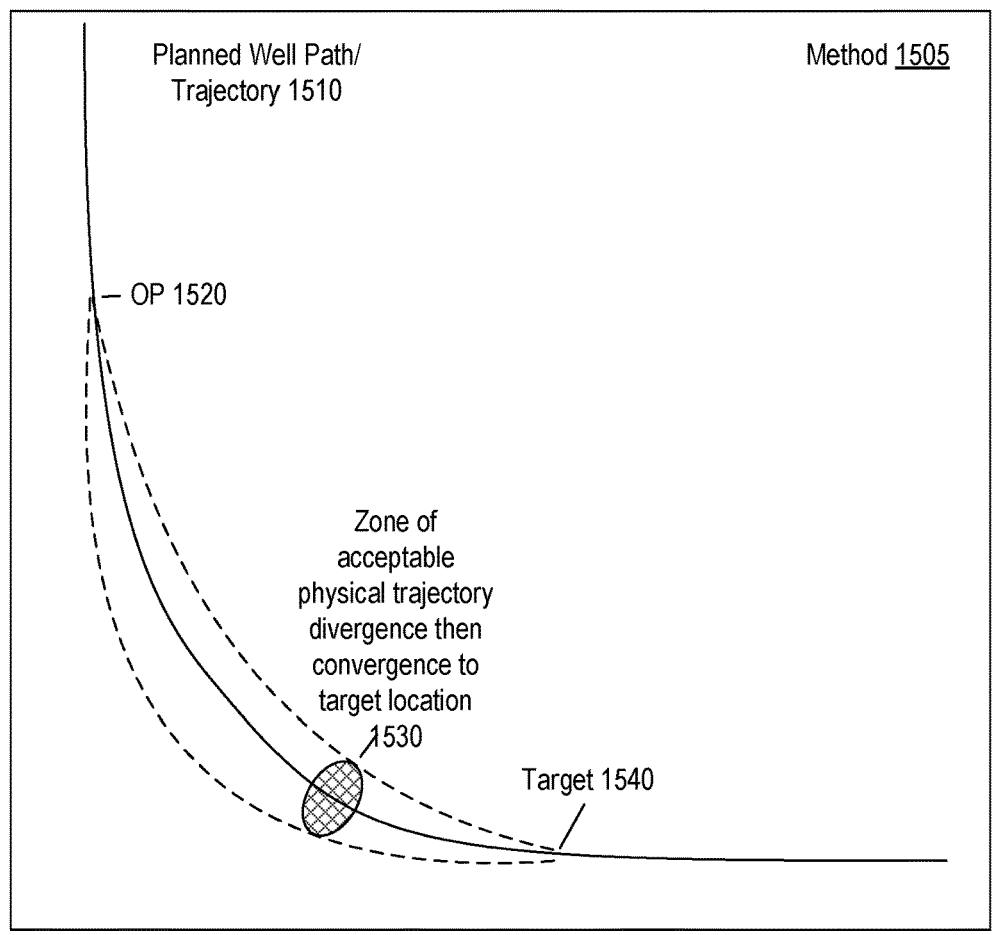
Fig. 15

2310 — L1

| Channel | Source | RT/RM | Time/Depth |
|---|---|---|---|
| WOB | Surface | RT | Depth |
| ROP | Surface | RT | Depth |
| RPM | Surface | RT | Depth |
| FLOW | Surface | RT | Depth |
| SPPA | Surface | RT | Depth |
| Cont. INC | MWD/PD | RT/RM | Depth |
| Cont. AZM | MWD/PD | RT/RM | Depth |
| CRPM | MWD/PD | RT | Depth |
| SR Demand | PD | RT | Depth |
| TF Demand | PD | RT | Depth |
| Gamma Ray | MWD/PD | RT | Depth |

| Static | | |
|---|---|---|
| MW / MUD TYPE | EOWR | |
| BHA | EOWR | |
| BIT | EOWR | |

2330 — L2

| Channel | Source | RT/RM | Time/Depth |
|---|---|---|---|
| SR Effective | PD | RM | Depth |
| TF Effective | PD | RM | Depth |
| Shocks | PD | RM | Depth |
| Torque | Surface | RM | Depth |
| MW | Surface | RM | Depth |
| Piston Disp | PiP | RM | Depth |
| Piston Press | PiP | RM | Depth |

| Static | | |
|---|---|---|
| BIT Grading | EOWR | |
| Slide Sheet | EOWR | |

2350 — L3

| Channel | Source | RT/RM | Time/Depth |
|---|---|---|---|
| Caliper 1D/3D | LWD | RT/RM | Depth |
| Density | LWD | RT/RM | Depth |
| Sonic | LWD | RT/RM | Depth |
| Image | LWD | RT/RM | Depth |

Fig. 23

Outputs 3000
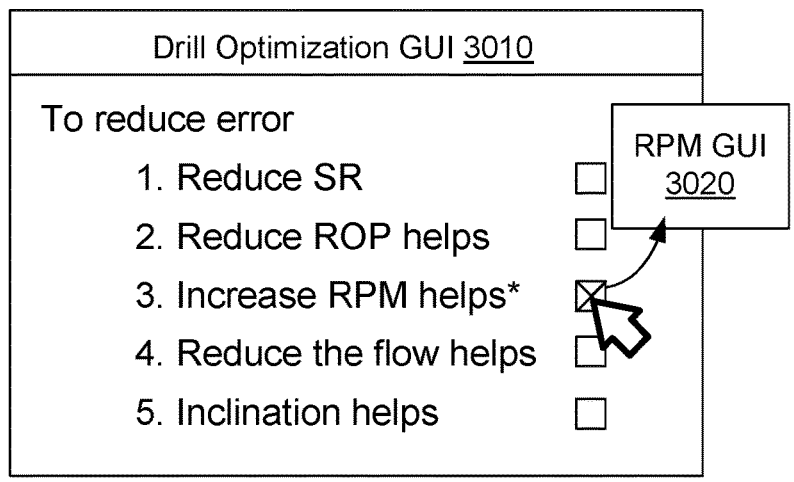
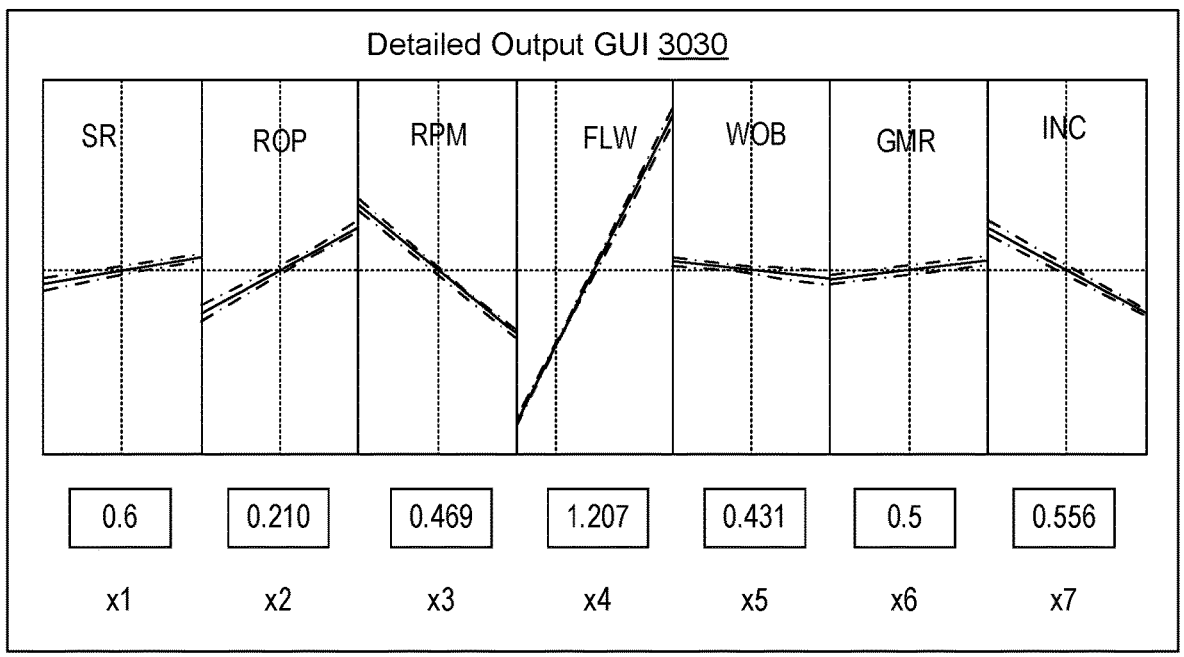
Fig. 30

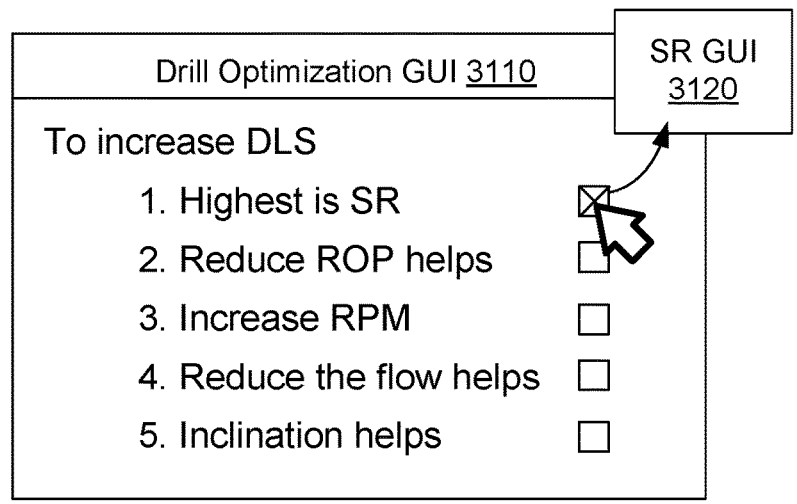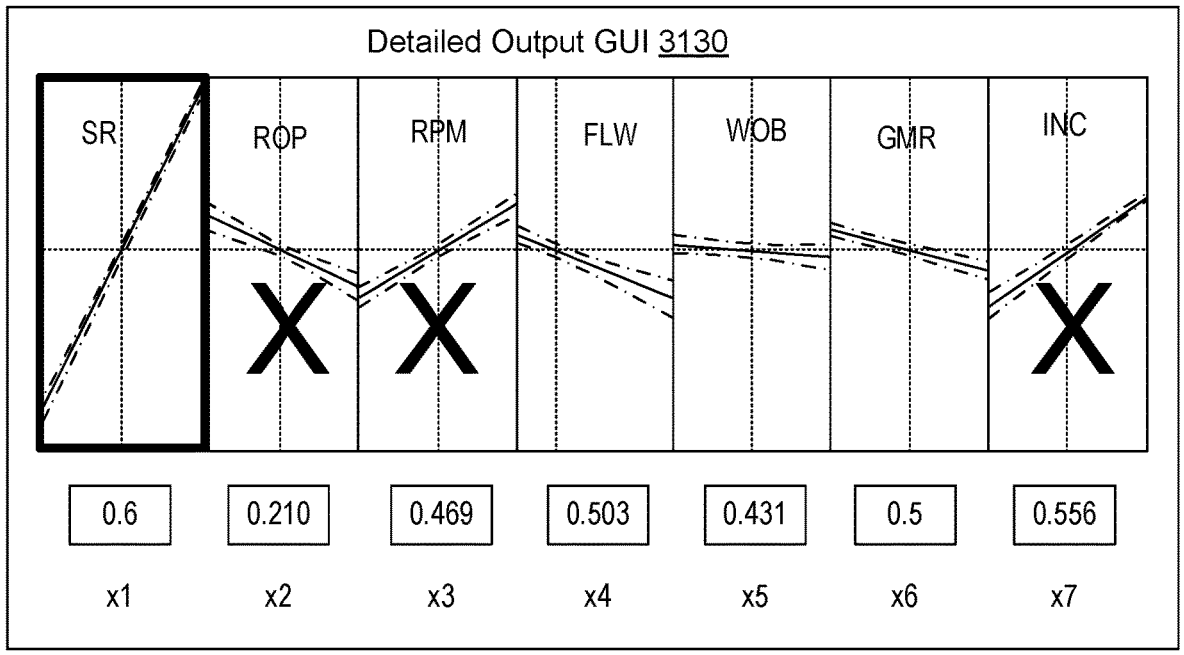
Fig. 31

GUI 3400

Full Steering Tendency

 The BHA DLS capability is less than the trajectory DLS requirement in the run Suggested Control Action(s):

If motor, increase bend setting
    Adjust stabilizer position
    Adjust WOB & RPM

| | |
|---|---|
| 100% Steering DLS: | 0.0 deg/100ft |
| Analysis Toolface: | 97.73 deg |
| Trajectory DLS: | 8.50 deg/100ft |
| Analysis Depth: | 8360.95 ft |
| Calculated By: | Hybrid Machine Learning |
| Tendency: | View Chart |

Input      ∧

Fig. 34

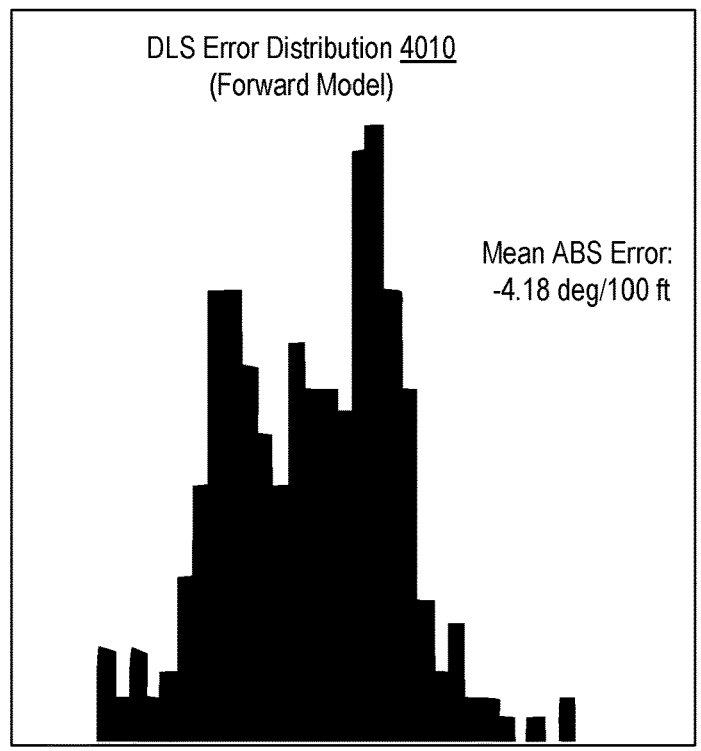
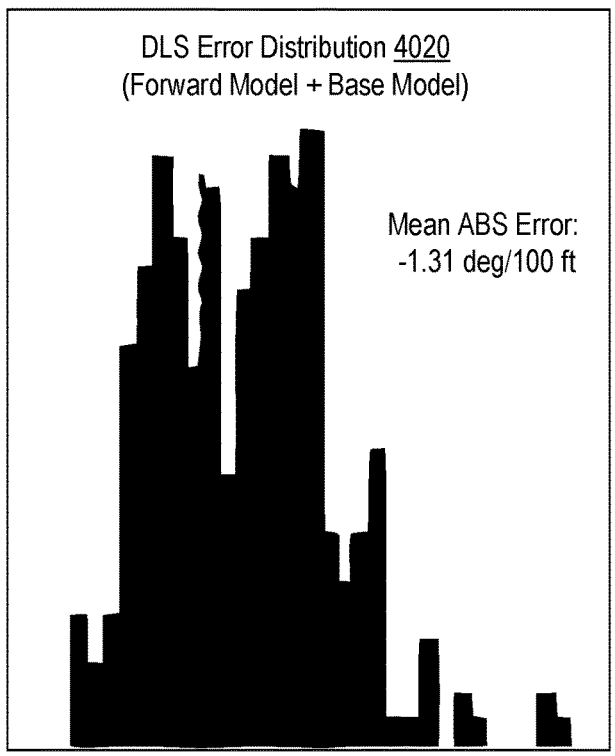
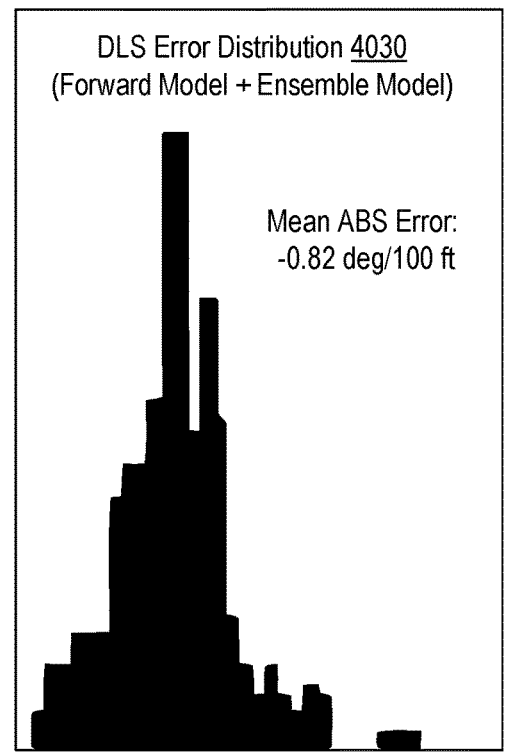
Fig. 40

DRILLING SYSTEM

RELATED APPLICATIONS

This application is the U.S. national phase of International Patent Application No. PCT/US2020/024021, filed 20 Mar. 2020, which claims priority to and the benefit of a U.S. Provisional Application having Ser. No. 62/821,551, filed 21 Mar. 2019, which is incorporated by reference herein; a U.S. Provisional Application having Ser. No. 62/849,975, filed 20 May 2019, which is incorporated by reference herein; and a U.S. Provisional Application having Ser. No. 62/950,934, filed 20 Dec. 2019, which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.).

SUMMARY

A method can include acquiring drilling performance data for a downhole tool; modeling drilling performance of the downhole tool to generate results; training a machine learning model using the drilling performance data and the results to generate a trained machine learning model; and predicting behavior of the downhole tool using the trained machine learning model. A system can include a processor; memory accessible by the processor; processor-executable instructions stored in the memory and executable to instruct the system to: acquire drilling performance data for a downhole tool; model drilling performance of the downhole tool to generate results; train a machine learning model using the drilling performance data and the results to generate a trained machine learning model; and predict behavior of the downhole tool using the trained machine learning model. One or more computer-readable storage media can include processor-executable instructions to instruct a computing system to: acquire drilling performance data for a downhole tool; model drilling performance of the downhole tool to generate results; train a machine learning model using the drilling performance data and the results to generate a trained machine learning model; and predict behavior of the downhole tool using the trained machine learning model. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 7 illustrates an example of a method and an example of a system;

FIG. 11 illustrates examples of outputs of the system of FIG. 10;

FIG. 12 illustrates examples of outputs of the system of FIG. 10;

FIG. 15 illustrates an example of a method with respect to example plots;

FIG. 23 illustrates examples of operational data structures;

FIG. 30 illustrates examples of outputs;

FIG. 31 illustrates examples of outputs;

FIG. 34 illustrates an example of a graphical user interface;

FIG. 40 illustrates examples of plots.

DETAILED DESCRIPTION

Figure 2:
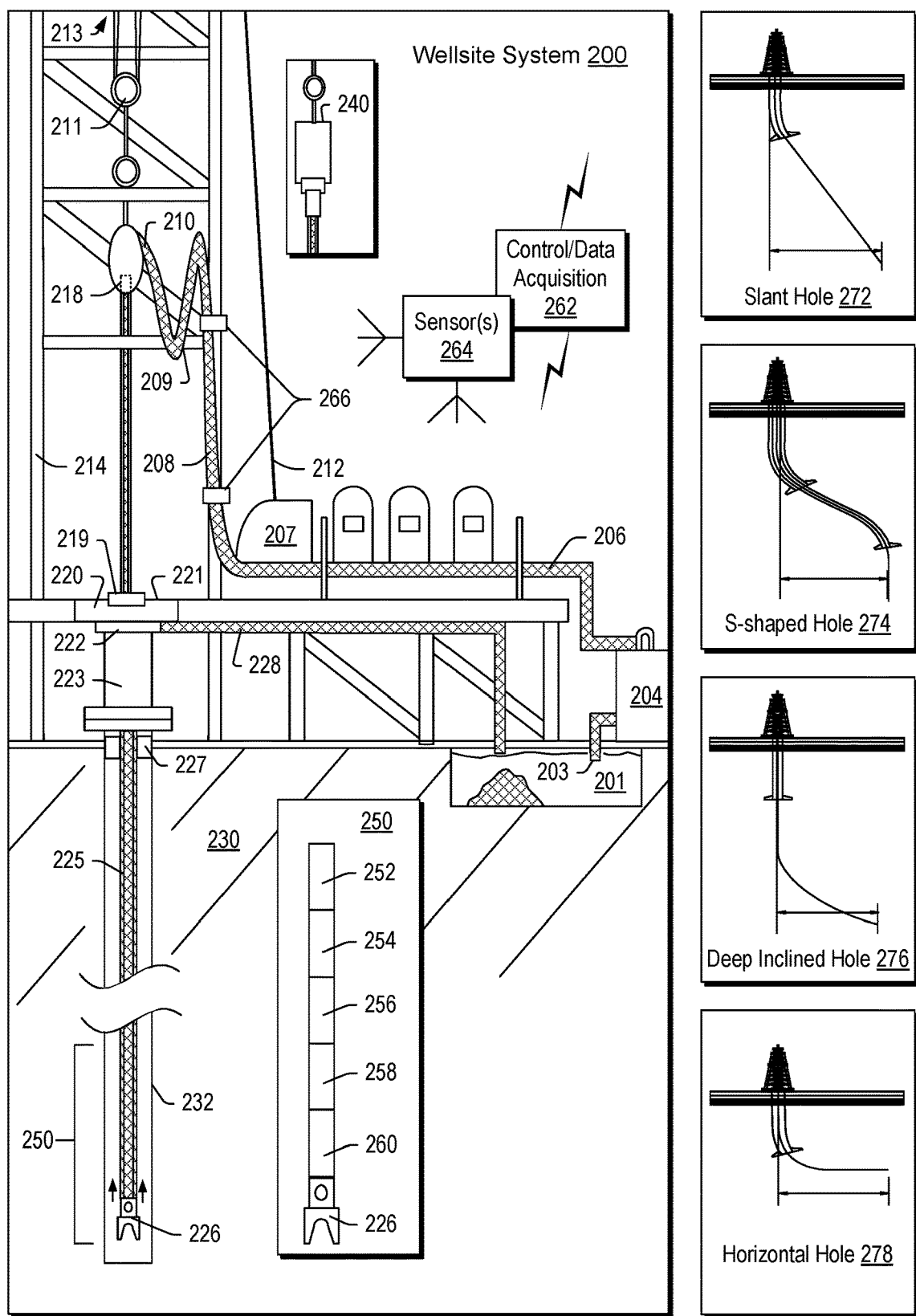
FIG. 2 illustrates examples of equipment and examples of hole types.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a method for surface supervision and predictive control of a directional drilling process can use real-time data (e.g., azimuth and inclination measurements, sensor data, etc.) with depth based estimates of sensor data obtained from one or more off-set wells and a model of steering drilling performance (e.g., time-series model, semi-analytical model, analytical model) to predict ahead of a drill bit and thus optimize set-point changes in terms of closed-loop trajectory control, optionally using automated closed-loop trajectory control to satisfy given performance index targets (PI targets). In such an example, PI targets can be kept constant or can be changed, for example, depending whether steering is geometrical or geological.

As an example, a method can include using a combination of offset data to predict performance of a steering system, for example, in terms of dogleg severity (DLS) capabilities. For example, consider a workflow that can extract information from offset wells and combine it with one or more physical models (e.g., physics-based models) to improve rotary steering predictabilities. Such an approach may utilize expert knowledge from a physics-based understanding and from experience learnt from offset data and/or data acquired while drilling (e.g., during drilling of a current borehole). A workflow can include running a fast-physical model using offset well drilling parameters to predict steering performance for a section or sections of a well. In such an approach, results may be compared to actual data where an error log can be computed based on the difference between the model and the data. In such an approach, a machine learning (ML) process can connect the error with additional logged data. For example, consider a ML model that can be trained to predict correlations, differences, etc., between actual data and output of a physics-based model (e.g., a finite element model, etc.). Where error is utilized, error may be propagated to predict the performance under various conditions. As an example, error may be utilized to account for behavior that is not explicitly included in a physics-based model. An error analysis approach can utilize error to improve predictions, which may be utilized to improve optimization of one or more drilling operations (e.g., trajectory, parameters, etc.).

For sake of brevity, the following acronyms may be utilized herein:
ADN=azimuthal density neutron tool
AMR=anisotropic magneto resistive
API=application programming interface
Bcmd=Build Command
BHA=bottom hole assembly
BR=build rate
BS=bit steerability (BS=Fs/DLS)
CDR=compensated dual resistivity tool
DD=directional drilling
DDP=digital drill plan
DLS=dogleg severity
D&I=D&I responses: Directions and Inclination
FB=feedback
FLWI=flow rate channel (mud flowrate in)
Fs=steer force or side force
GMR=giant magneto resistive
GP=general programming (model)
GR=gamma ray
GUI=graphical user interface
HIA=hold inclination and azimuth
HPU=hydraulic power unit
HWDP=heavy weight drill pipe
IH=inclination hold
Kdls=nominal maximum curvature response
LWD=logging while drilling
MD=measured depth
ML=machine learning
MLM=machine learning model
MSE=mechanical specific energy
MWD=measuring while drilling
PDM=positive displacement motor
PD_PRDS=POWERDRIVE desired power proportion (percent)
PDSTEER=POWERDRIVE steering setting (unitless)
PD_TFDS=POWERDRIVE desired toolface setting (plane angle)
PI=performance index
PRDS=desired proportion
ResForce=resultant steering forces
RM=recorded mode
ROP=rate of penetration
RPM=revolutions/rotations per minute
RSS=rotary steerable system
RT=real time
SI=steerability index
SQUID=SC quantum interference device
SR=steering ratio (percent)
SRATIO=steering ratio (percent)
SWOB=surface weight on bit
TD=total depth
TF=toolface (raw, plane angle)
TFDS=desired toolface setting
TR=turn rate
TVD=total vertical depth
Udls=dogleg severity as a product of SR and Kdls
Utf=neutral phase toolface error
WOB=weight on bit
WR=walk rate As to bit steerability, it may be defined as how easy a bit will steer (e.g., tilt) when a side force or a side moment is applied to the bit. As an example, bit steerability may be defined as follows: BS=Fs/DLS where Fs is the required steer force or side force which is to be applied to the bit to steer the bit with an expected DLS.

As to steerability index (SI), it may be provided as a system steerability, which may account for various factors associated with drilling equipment and/or formation characteristics. As an example, a parameter can be build rate (BR), a parameter can be turn rate (TR), a parameter can be dogleg severity (DLS), etc.

As to toolface (TF), in directional drilling, the angle between a reference direction on the drillstring and a fixed reference, measured in a plane normal to the drillstring. In near-vertical applications, North (N) is the fixed reference ("Magnetic_Toolface"); for higher deviation applications, Top of Hole (TOH) is the reference ("Gravity_Toolface").

As an example, a method can include closed-loop operation with respect to control of steering. In such an example, consider using one or more of hold inclination and azimuth (HIA) and auto-nudge (e.g., nudging directional drilling with respect to an object). Such an approach can include, for example, 2 inputs and 2 outputs where inputs can be steering ratio (SR) and toolface (TF) demand while outputs can be inclination and azimuth, with respect to dogleg severity (DLS) and toolface (TF) response. In such an approach, machine learning (ML) to train a machine learning (ML) model can be related to the formation that causes the drillstring to under-perform. For example, under-performance can be added to the drillstring (e.g., past data/model) plus location information (e.g. GR minimum) to adjust one or more steering targets downhole (e.g., if a rate of penetration (ROP) estimate/downlinked/measured is present) or from the surface using a suitable computational framework.

As an example, in a closed-loop mode of a steering controller, weight on bit (WOB) and rotational speed (RPM) can act as disturbances with respect to time during drilling. In such situations, where a drillstring is not operating under 100 percent steering ratio (SR), such disturbances can be handled by the steering controller. For example, if there is sufficient power, the WOB disturbance can be adjusted automatically by the steering controller, which can make the steering controller operate in a manner that is independent of the rate of penetration (ROP).

In various methods, system, etc., machine learning can be performed using a computerized system to train a machine learning model to generate a trained machine learning model. Such a trained machine learning model can be utilized for one or more purposes. As an example, a trained machine learning modeling approach can be utilized for inversion or can be utilized for forward modeling. As to forward modeling, such an approach may be utilized to analyze error (e.g., one or more types of differences, correlations, etc.). Through such an approach, a physics-based model can be utilized that becomes specialized through an error analysis such that predictable error (e.g., via a trained ML model) can be utilized in combination with output of a physics-based model to more accurately model one or more phenomena associated with drilling. As mentioned, a method can be for planning, for real-time control, or another aspect of an oil field (e.g., oil and/or gas field).

As an example, a method can include, during drilling of a bore in a formation using a drillstring, acquiring measurements; analyzing steerability of the drillstring using the measurements, offset bore measurements and a steerability model; and, based on the analyzing, adjusting at least one control parameter of the drilling. In such an example, the measurements can include downhole measurements acquired using one or more sensors of the drillstring and/or surface measurements acquired using rigsite equipment operatively coupled to the drillstring. As an example, measurements can include orientation measurements of the drillstring and physical measurements of the formation. As an example, a drillstring can include a rotary steerable system (RSS) that includes a logging while drilling (LWD) tool that can acquire measurements. As an example, a method can include adjusting that adjusts at least one control parameter in a closed-loop based at least in part on at least one acquired measurement. As an example, a drillstring can include one or more processors that can perform one or more analyses and/or a system can include surface equipment performs one or more analyses. For example, consider a method where drillstring and surface equipment perform analyses.

As an example, a method can include acquiring formation and drilling data; predicting drillstring steerability using a model; determining errors in the predicted drillstring steerability using the formation and drilling data; correlating the errors to physical parameters associated with drilling; and predicting drillstring steerability using at least one of the correlated physical parameters and the model. In such an example, the method may include controlling a drillstring using the predicted drillstring steerability. As an example, a method can include performing correlating using machine learning. For example, consider machine learning where one or more machine learning models are utilized where weights can be assigned corresponding values using data. As an example, a model can be a physics-based model and correlating may be performed using machine learning and a machine learning model to account for non-modeled physics-based phenomena. As an example, physical parameters associated with drilling can include at least one of a rotational speed parameter (RPM), a rate of penetration parameter (ROP), a flow rate parameter (FLWI), an inclination parameter (INC), a weight on bit parameter (WOB), a gamma ray parameter (GR), and a steering ratio parameter (SR).

As an example, a method can generate a plan for drilling as fast as possible with acceptable wear to one or more tools and while keeping within an acceptable distance from a desired trajectory and/or target.

As an example, a method can include accessing data from previous runs and using that data to plan a better next well (e.g., select more appropriate tools, bits, BHA and drilling parameters). As an example, during drilling, a method can include utilizing measured depth to trigger one or more drilling parameter changes (e.g., using an acceptable understanding of the formation). As an example, a gamma ray sensor can help to identify formation top changes, which may be utilized as a trigger. As another example, inclination can be a relevant parameter, which may be utilized in alone or in combination with one or more other parameters for triggering a change. As an example, one or more LWD measurements may be utilized for triggering a change to one or more drilling parameters, which may be accomplished downhole (e.g., downhole trigger and control) or at surface (e.g., receipt of downhole measurements, etc., to trigger a control command to be issued at surface).

As an example, a method can include utilizing various data in real-time to refine one or more drilling parameters (e.g., steering related, etc.) in real-time. For example, consider an approach that utilizes what is acquired or otherwise learned during drilling to optimize drilling (e.g., via a downhole controller and/or a surface controller). Such an approach can include planning to arrive at a plan and models (e.g., predictive models, sensitivity models, error models, etc.) where the plan and/or the models can be revised using information gleaned from drilling.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore (e.g., a borehole) may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry; noting that one or more other types of telemetry may be utilized, additionally and/or alternatively.

As an example, mud-pulse telemetry equipment may include a downhole device configured to effect changes in pressure in the mud to create an acoustic wave or waves upon which information may be modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.). As an example, telemetry equipment can include one or more types of transmission media such as, for example, a medium that can transmit electromagnetic energy (e.g., metal, alloy, optical fiber, etc.) and/or a medium that can transmit pressure energy (e.g., fluid, solid, etc.). As an example, telemetry equipment can include one or more antennas that can transmit and/or receive wireless energy. As an example, wireless telemetry can include circuitry that transmits and/or receives electromagnetic energy. As an example, wireless telemetry can include circuitry that transmits and/or receives pressure energy. For example, consider circuitry that operates to provide bidirectional communication between surface equipment and downhole equipment, which can provide for one or more of data monitoring and tool control via use of acoustic signals that are digitized and transmitted using a network of repeaters. As an example, a drillstring can include one or more types of media and/or one or more types of circuitry that can be utilized for transmissions, which may be for data acquisition, control and/or one or more other purposes.

As mentioned, one type of telemetry is mud-pulse telemetry. As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a rotary-steerable system (RSS) and/or motor 260, and the drill bit 226. Such components or modules may be referred to as tools where a drillstring can include a plurality of tools.

Above, LWD, MWD and RSS are mentioned where one or more of such technologies may be implemented during one or more operations.

LWD involves measurement of one or more formation properties during excavation of a hole, or shortly thereafter, through the use of one or more tools, which may include one or more tools that are integrated into a BHA of a drillstring. LWD can, depending on circumstances, provide for measuring properties of a formation before drilling fluids invade deeply. LWD may provide for data acquisition where conditions prove to be difficult such that use of wireline tools is not practical (e.g., confounded, particularly for highly deviated wells). In such situations, LWD can help to ensure that at least some data are acquired of the subsurface. As an example, LWD data can be utilized to guide well placement so that a wellbore remains within a zone of interest or in a desirable productive portion of a reservoir (e.g., consider LWD data that helps to target a region in a highly variable shale reservoir, etc.).

As to MWD, such technology can provide for evaluation of physical properties such as one or more of pressure, temperature and bore trajectory in three-dimensional space, while extending a bore. In MWD, measurements can be made downhole (optionally stored in solid-state memory for some time) and transmitted (e.g., to the surface and/or another tool). Data transmission techniques can involve digitally encoding data and transmitting the digitally encoded data. MWD tools that measure formation parameters (e.g., one or more of resistivity, porosity, sonic velocity, gamma ray, etc.) may be referred to as logging-while-drilling (LWD) tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

Operation of a RSS can be characterized in part by its steerability, which can be referred to as bit steerability. Bit steerability can be concerned with various physical aspects such as bit response to a side force, bit walk direction and walk rate, and bit torque variance. Bit steerability may be defined as how easy a bit will steer (tilt) when a side force or a side moment is applied to the bit. For example, consider a bit steerability (BS) being defined using a steer force or side force that is to be applied to the bit to steer the bit with an expected dogleg severity (DLS), which can be measured as degrees per distance (e.g., per 100 feet or per 30 meters). For example, consider defining BS by force divided by DLS (e.g., force per degree per distance).

A steerability index (e.g., a steerability index value) may be provided as a system steerability, which may account for various factors associated with drilling equipment and/or formation characteristics. As an example, a parameter can be build rate (BR), a parameter can be turn rate (TR), a parameter can be dogleg severity (DLS), etc.

In drilling a directional well, drilling modes can include a straight section mode (e.g., DLS is approximately zero), a build/drop section mode (e.g., DLS is approximately constant) and kick-off section mode (e.g., DLS varies). A bit of a RSS can behave differently in each different drilling mode. For example, kick-off operations can demand a large side force to steer a bit to an expected DLS where the cutting structure of the bit (e.g., face cutters) may play a relatively small role in determination of bit steerability and bit walk force; whereas, a gage pad and/or a sleeve may tend to govern steerability and bit walk force. As to drilling into a build or drop section in which DLS is to remain relatively constant, considerably less side force can be demanded to steer the bit. In such operation, bit stability and bit drillability can be more of a concern than bit steerability.

A RSS can include circuitry such as a bit inclination sensor, a downhole processor, and steering features (e.g., electronically controllable steering ribs, etc.). A RSS may be operable in one or more control modes. For example, consider a closed-loop control mode and an open-loop control mode. As an example, a closed-loop RSS system can include a near bit inclination and near bit actuator module, which may be part of a non-rotating steerable stabilizer. Such a system may include a pulser/alternator sub as a portion of a drillstring, which may be uphole from the bit inclination, bit actuator module. In such an example, measurements as to bore position relative to desired position (e.g., a planned trajectory) may be utilized within the drillstring in a closed-loop to adjust a steering portion of the drillstring.

As an example, a RSS may operate with directional control from a surface unit. For example, a drillstring can include telemetry equipment that can be utilized to receive one or more surface commands that cause downhole equipment of the drillstring to drill in a particular direction. For example, consider a drilling process that includes vertical drilling followed by kicking-off laterally, which may be via a specified dogleg with a specified dogleg severity (e.g., or range, etc.).

Drilling operations may include geosteering, which involves an intentional directional control of a trajectory based on results of one or more downhole geological logging measurements rather than primarily on three-dimensional targets in space. As an example, geosteering may be implemented to maintain a directional bore within a pay zone. In mature areas, geosteering may be used to maintain a bore in a particular section of a reservoir, for example, to minimize gas or water breakthrough and maximize economic production from the well.

Referring again to various examples of equipment of FIG. 2, the LWD module 254 may be housed in a suitable type of drill collar and can contain one or a plurality of selected types of logging tools. It will also be understood that more than one LWD and/or MWD module can be employed, for example, as represented at by the MWD module 256 of the drillstring assembly 250. Where the position of an LWD module is mentioned, as an example, it may refer to a module at the position of the LWD module 254, the MWD module 256, etc. An LWD module can include capabilities for measuring, processing, and storing information, as well as for communicating with the surface equipment. In the illustrated example, the LWD module 254 may include a seismic measuring device, a resistivity measuring device, a porosity measuring device, and a density measuring device.

The MWD module 256 may be housed in a suitable type of drill collar and can contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device. The MWD and/or LWD modules may be configured to obtain formation information.

In embodiments employing a rotary steerable tool (e.g., a RSS), various types of suitable rotary steerable tool configurations may be used. For example, the AUTOTRAK rotary steerable system (available from Baker Hughes), and the GEOPILOT rotary steerable system (available from Sperry Drilling Services) include a substantially non-rotating (or slowly rotating) outer housing employing blades that engage a borehole wall. Engagement of the blades with the borehole wall is intended to eccenter the tool body (e.g., shift from a bore axis), thereby pointing or pushing the drill bit in a desired direction while drilling. A rotating shaft deployed in the outer housing can transfer rotary power and axial weight-on-bit (WOB) to the drill bit during drilling. Accelerometer and magnetometer sets may be deployed in the outer housing and therefore be non-rotating or rotate slowly with respect to the borehole wall.

A magnetometer-based tool can determine its azimuthal orientation in an open or uncased borehole (e.g., with respect to magnetic north). A magnetic sensor or magnetometer may be based on one or more of a variety of sensor technologies such as Hall Effect sensors, silicon based sensors (e.g., anisotropic magneto resistive (AMR), giant magneto resistive (GMR)), superconducting quantum interference device (SQUID), search-coil, magnetic flux-gate, magneto inductive, and others. Because of their sensitivity (40μ gauss) and temperature rating (225 degrees C.), the magneto-resistive type devices can be included in various downhole tools.

A magnetometer may be focused, having an axis with maximum sensitivity. For additional focus, shielding can be provided on a "back-side" with material having high magnetic permeability. Magnetometers may be arranged for bi-axial and tri-axial coverage. This allows cross-referencing and gives the opportunity for complete composition. A number of algorithms can be used for treating the measured data, and to optimize the presentation of radial magnetic survey. For example, measurements may be linearly computed, with linear gain amplification, or the data may be filtered or processed with other algorithms, ratios, or statistical analysis.

The POWERDRIVE rotary steerable systems (Schlumberger Limited, Houston, Texas) fully rotate with the drillstring (i.e., the outer housing rotates with the drillstring). The POWERDRIVE XCEED makes use of an internal steering mechanism that does not demand contact with a borehole wall and enables the tool body to fully rotate with the drillstring. The POWERDRIVE X5, X6, and ORBIT rotary steerable systems make use of mud actuated blades (or pads) that contact the borehole wall. The extension of the blades (or pads) may be rapidly and continually adjusted as the system rotates in a borehole. The POWERDRIVE ARCHER system makes use of a lower steering section joined at a swivel with an upper section. The swivel is actively tilted via actuatable pistons so as to change the angle of the lower section with respect to the upper section and maintain a desired drilling direction as the BHA rotates in a borehole. Accelerometer and magnetometer sets may rotate with the drillstring or may alternatively be deployed in an internal roll-stabilized housing such that they remain substantially stationary (in a bias phase) or rotate slowly with respect to a borehole (in a neutral phase). To drill a desired curvature, the bias phase and neutral phase can be alternated during drilling at a predetermined ratio (e.g., consider the steering ratio (SR)).

Various drilling/steering tools can be configured to respond with a nominal maximum curvature response $K_{dls}$ when drilling. To generate a curvature of less than $K_{dls}$ the tool may be configured to drill in cycles (e.g., akin to a duty cycle in power electronics or pulse-width-modulation) in which drilling time is quantized into regularly spaced intervals which are further proportioned into neutral and bias periods (e.g., neutral phase and bias phase). In the neutral phase toolface error (or input) $U_{tf}$ is cycled at a constant rate such that the net trajectory response of the tool is approximately a tangent with zero net curvature, and in the bias phase the toolface is held constant and the tool responds with a curvature equal to $K_{dls}$. Consequently, the average curvature over one drilling cycle can, in principle, be varied anywhere between zero and $K_{dls}$. The ratio of the neutral phase to the bias phase in the drilling cycle can be referred to as the percent steering ratio (SR) with the dogleg severity $U_{dls}$ being the product of the percent steering ratio (SR) and $K_{dls}$.

FIG. 2 also shows some examples of types of holes that may be drilled. For example, consider a slant hole 272, an S-shaped hole 274, a deep inclined hole 276 and a horizontal hole 278. The holes 272, 274, 276 and 278 include one or more deviated sections that can be directionally drilled.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM). The deviation may also be accomplished by using a rotary steerable system (RSS).

As an example, a system may be a steerable system and include equipment to perform a method such as geosteering. As an example, a steerable system can include a rotary steerable tool on a lower part of a drillstring just above a drill bit. As an example, above a rotary steerable tool, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a borehole trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a borehole based on results of downhole geological logging measurements in a manner that aims to keep a directional borehole within a desired region, zone (e.g., a pay zone), etc. As an example, geosteering may include directing a borehole to keep the borehole in a particular section of a reservoir, for example, to minimize gas and/or water breakthrough and, for example, to maximize economic production from a well that includes the borehole.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc. For example, consider tracking one or more distances, times, etc., of a tripping-in operation (run in hole, RIH) and/or a tripping-out operation (pull out of hole, POOH). In various instances, a driller may log measurements such as lengths of drill pipe, etc., to estimate depth (e.g., length of a borehole), etc. During a drilling operation, when more drill pipe is to be added, a drillstring may be suspended by slips (e.g., in-slips) where the bit has been pulled a short distance off the bottom of the borehole. Once additional drill pipe is added, the drillstring may be unsuspended by releasing the slips (out-of-slips) where the drillstring can be brought back on bottom to engage rock and further drill into a formation to deepen the borehole. As an example, a process of adding drill pipe (e.g., an individual pipe, coupled sections, etc.) can include various pumping adjustments (e.g., mud flow, etc.) and may be of the order of minutes, which may provide time for one or more processes to occur (e.g., consider one or more actions of a workflow). In such an example, results of such one or more processes may be utilized, for example, during further drilling.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium. In various examples, one or more signals may be transmitted downhole via one or more of electromagnetic telemetry, wired drill pipe, optical fiber, pump flow rates, and drillstring rotation rates.

Figure 3:
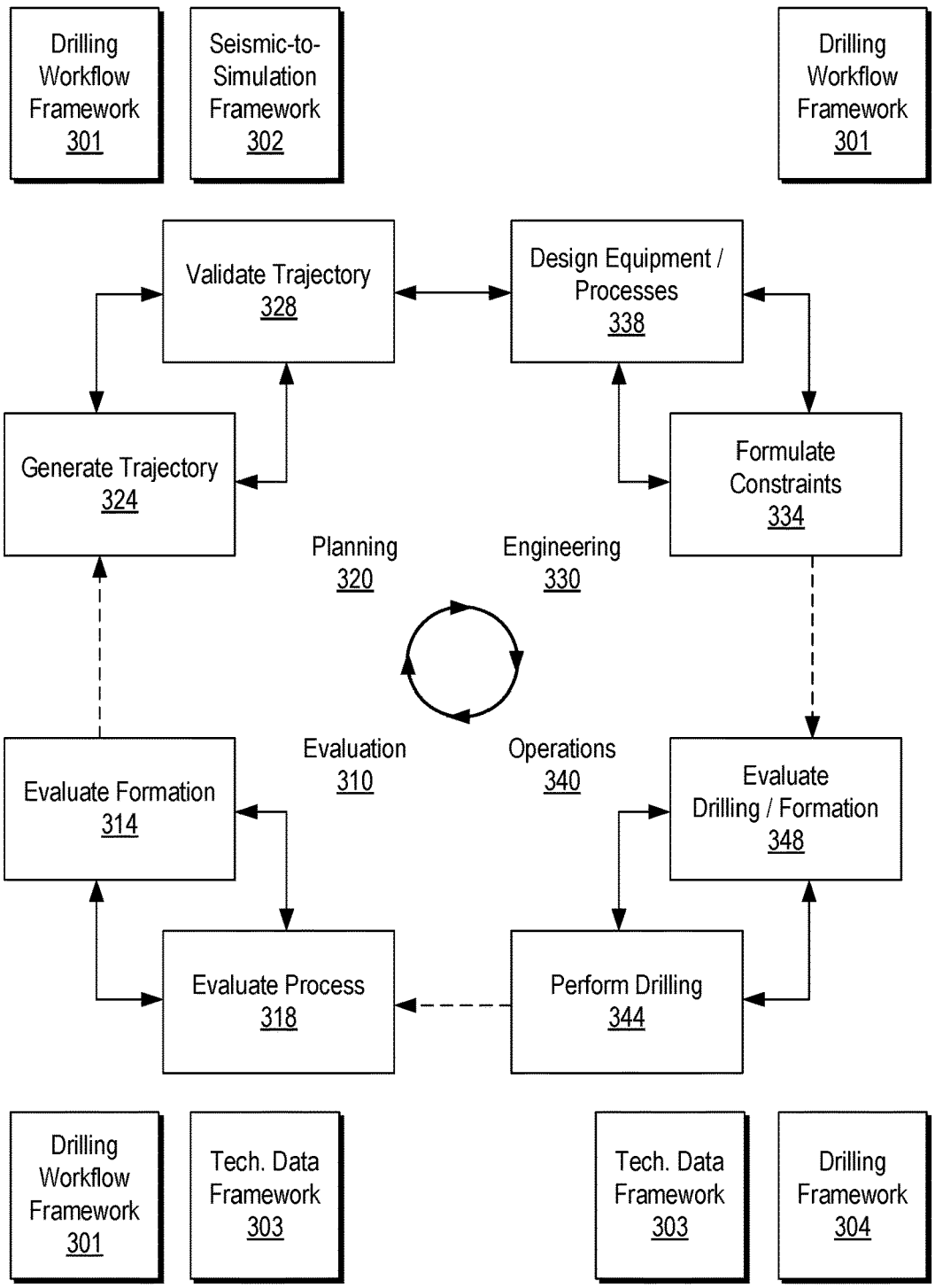
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL framework (Schlumberger Limited, Houston, Texas) and the technical data framework 303 can be, for example, the TECHLOG framework (Schlumberger Limited, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data. In a graphical user interface (GUI), object parameters may be utilized for rendering. For example, consider rendering a well in a formation using parameters of a well object and parameters of one or more formation objects (e.g., surfaces, layers, etc.). In such an approach, a GUI can show a 1D, 2D or 3D representation of a well in a formation, optionally while the well (e.g., borehole) is being drilled. In such an example, a trajectory object (e.g., a planned trajectory) may be rendered to allow for an assessment between a planned trajectory and an actual trajectory.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger Limited, Houston Tex.), the INTERSECT reservoir simulator (Schlumberger Limited, Houston Tex.), etc. Reservoir simulation may generate results for flow of fluid, which can include flow in porous material and one or more wells.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the framework environment marketed as the OCEAN framework environment (Schlumberger Limited, Houston, Texas), which allows for integration of add-ons (or plug-ins) into a PETREL framework workflow. The OCEAN framework environment leverages .NET tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the OCEAN framework where the model simulation layer can include or operatively link to the PETREL model-centric software package that hosts OCEAN framework applications. In an example embodiment, the PETREL software may be considered a data-driven application. The PETREL software can include a framework for model building and visualization. Such a model may include one or more grids.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a model simulation layer may provide domain objects, act as a data source, provide for rendering and provide for various user interfaces. Rendering may provide a graphical environment in which applications can display their data while the user interfaces may provide a common look and feel for application user interface components. As an example, data may be stored in one or more data sources (or data stores, generally physical data storage devices), which may be at the same or different physical sites and accessible via one or more networks.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework (e.g., within the DELFI environment, etc.), for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger Limited, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework (e.g., the OCEAN environment, the DELFI environment, etc.). As an example, a workflow may include one or more worksteps that access a module such as a plug-in (e.g., external executable code, etc.).

As an example, a framework may provide for modeling petroleum systems. For example, the modeling framework marketed as the PETROMOD framework (Schlumberger Limited, Houston, Texas) includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework, the DELFI environment, etc.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, BHA design, fluid design, and/or the like, to implement a well trajectory (see, e.g., the design block 338). In some embodiments, a second engineering service provider may perform such design using one or more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a BHA, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a borehole. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of a wellbore, and/or after the drilling of an entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or aerial networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
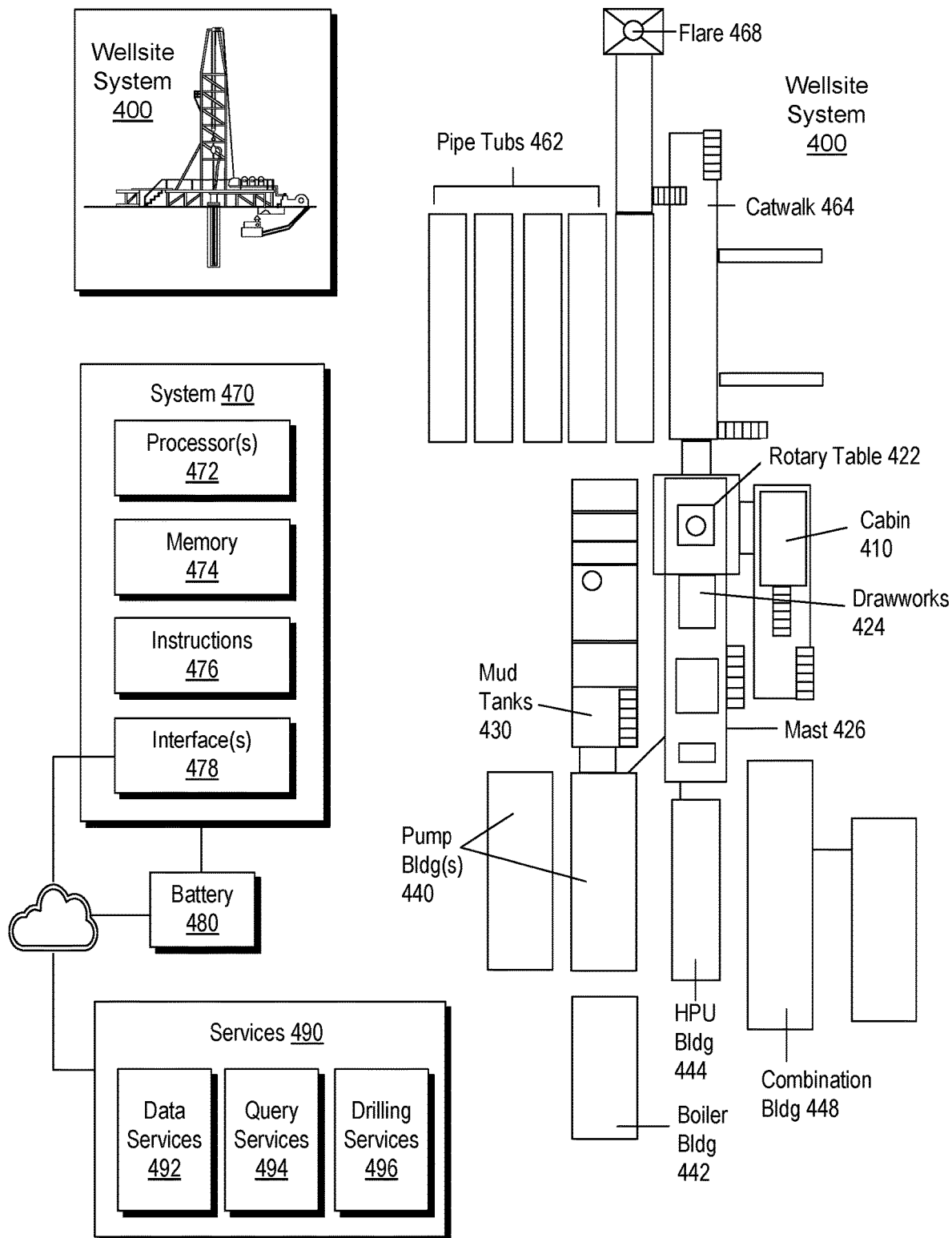
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470. The wellsite system 400 can include one or more of the components, features, etc., of the wellsite system 200 of FIG. 2. As an example, the wellsite system 400 can include one or more of LWD equipment, MWD equipment, PMD equipment, RSS equipment, etc.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, a hydraulic power unit (HPU) building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a smart bus (SMBus) or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

Figure 5:
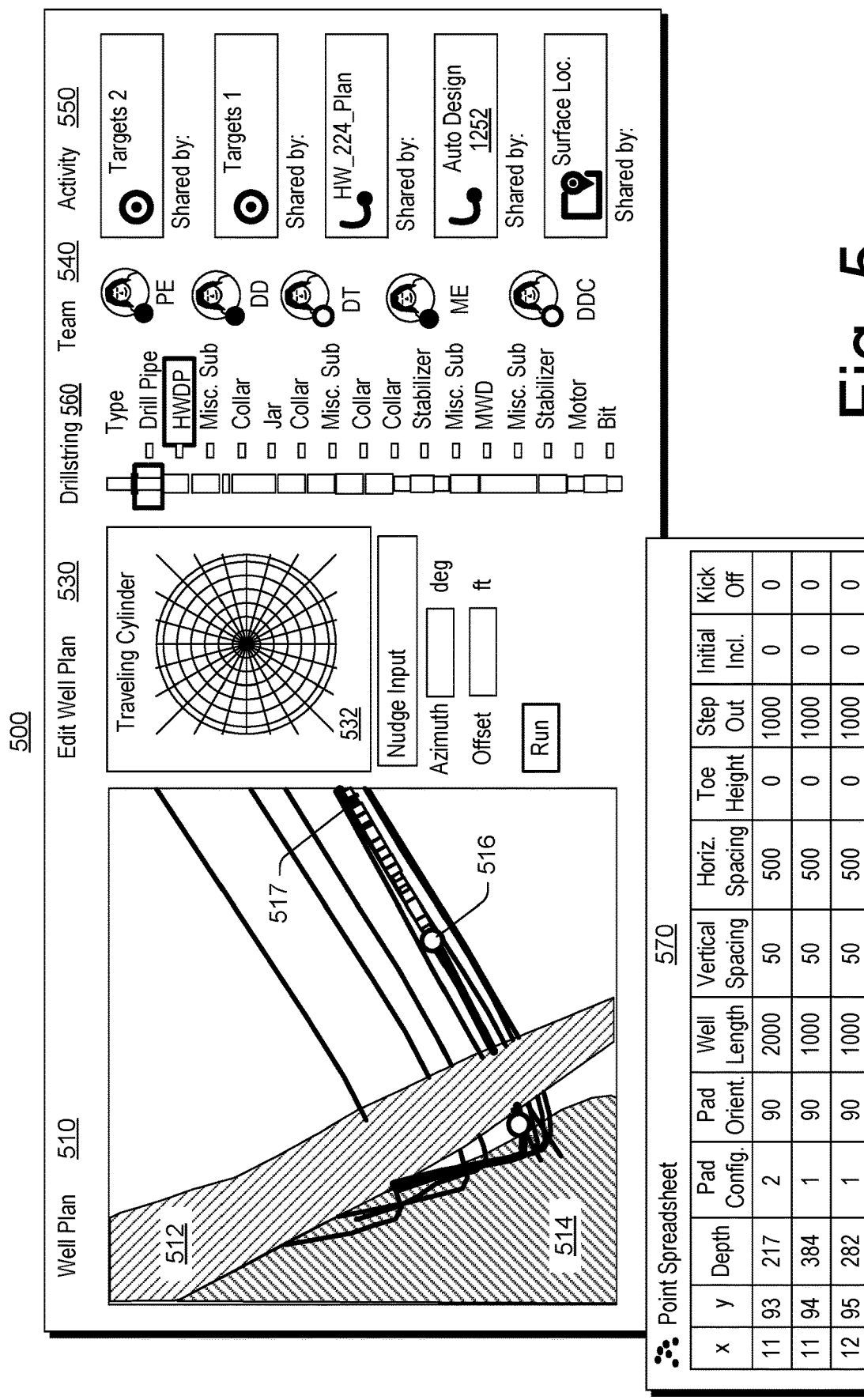
FIG. 5 illustrates an example of a graphical user interface.

FIG. 5 shows an example of a graphical user interface (GUI) 500 that includes information associated with a well plan. Specifically, the GUI 500 includes a panel 510 where subsurface surface representations 512 and 514 are rendered along with well trajectories where a location 516 can represent a position of a drillstring 517 along a well trajectory. The GUI 500 may include one or more editing features such as an edit well plan set of features 530. The GUI 500 may include information as to individuals of a team 540 that are involved, have been involved and/or are to be involved with one or more operations. The GUI 500 may include information as to one or more activities 550. As shown in the example of FIG. 5, the GUI 500 can include a graphical control of a drillstring 560 where, for example, various portions of the drillstring 560 may be selected to expose one or more associated parameters (e.g., type of equipment, equipment specifications, operational history, etc.). FIG. 5 also shows a table 570 as a point spreadsheet that specifies information for a plurality of wells.

In the example of FIG. 5, the drillstring graphical control 560 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation). As an example, the drillstring graphical control 560 can be configured to render one or more components that can include one or more components of LWD equipment, MWD equipment, PMD equipment, RSS equipment, etc. (see, e.g., FIG. 2 and description thereof, etc.).

As to the table 570, it includes entries for surface locations (e.g., x, y coordinates), depth, pad configuration, pad orientation, well length (e.g., from heel to toe, etc.), vertical spacing as to a plurality of wells that may extend from a common pad, horizontal spacing as to a plurality of wells that may extend from a common pad, toe height, step out (e.g., from surface bore opening to heel, etc.), initial inclination and kick-off. As an example, a North American shale well may be constructed using drilling that can include a build rate of approximately 6 degrees to approximately 15 degrees per 100 ft (e.g., or 30 meters) to land a substantially horizontal, lateral section that may extend for 1,000 ft (e.g., 300 meters) or more in a laterally extensive shale formation.

A traveling cylinder graphic 532 is shown being rendered where such a graphic can include information such as location of a drillstring or a portion thereof (e.g., a bit) and, for example, one or more of a location of a target, a location of another borehole, etc. As to various fields, an azimuth field is shown as well as an offset field. As an example, the GUI 500 can include rendering a representation of a bit at a location where various indicia can be co-rendered such as, for example, a no-go line, a safe-drilling window, etc.

As an example, the traveling cylinder graphic 532 can be utilized for anti-collision planning, control, drilling, etc., particularly in in densely drilled areas (e.g., onshore and/or offshore). As an example, a planned or actual subject survey can be at the center and representations of offset wellbores can be rendered along with, for example, distance and direction from the subject well. Real-time directional survey measurements while drilling may be utilized to update one or more renderings, which can help to visualize subsurface conditions and, for example, reduce risk of collision with one or more existing wellbores.

As to the graphical control labeled "nudge input", such a control can be utilized for nudging, which is a technique that can be utilized in one or more sections of a trajectory, for example, consider a scenario where bores in close proximity to one another can pose interference issues. Such issues may include magnetic interference as to metallic equipment (e.g., consider use of one or more tools that utilize magnetic sensors such as magnetometers). As an example, a trajectory of a drillstring can be nudged or deflected to direct the trajectory away from a hazard. In such an example, the trajectory may be brought back to a planned trajectory or otherwise continued toward a desired target.

As an example, a directional drilling operation may implement hold inclination and azimuth (HIA) technology, which may be implemented in a manner that is automated, optionally continuously. HIA technology can help to reduce human-machine interaction by using real-time measurement of inclination and azimuth for control of trajectory and, for example, to help reduce tortuosity of a borehole that is being drilled. As an example, a wellsite system may utilize HIA technology (see, e.g., the wellsite system 200, the wellsite system 400, etc.). As mentioned, a drillstring may include one or more features of the POWERDRIVE RSS tools (Schlumberger Limited, Houston, Texas).

As an example, HIA technology may be utilized to compare actual inclination and azimuth against target inclination and azimuth, for example, to make adjustments during drilling. Such technology can aim to reduce time for drilling one or more portions of a well.

As an example, as to a lateral section of a well, drilling may implement inclination hold (IH) technology; though, azimuth measurements can in some instances be noisier than inclination measurements and may be unstable in north/south direction (e.g., due to magnetic sensing).

As an example, a lateral section may be drilled using one or more technologies (e.g., IH, HIA, etc.). As an example, a six-axis continuous inclination and azimuth measurement tool or tools may be utilized as part of a HIA scheme. As an example, IH and/or HIA may be performed in combination with one or more formation property sensor measurements (e.g., via LWD tool(s), MWD tool(s), etc.).

As an example, a technology such as HIA may be implemented in a closed-loop manner where a downhole controller makes inclination and/or azimuth adjustments to steer a drill bit. For example, a drillstring can include a controller that receives sensor data from one or more sensors of the drillstring where the controller can issue one or more signals to equipment of the drillstring to drill directionally. As an example, a drillstring with a RSS that can implement control based on measurements such as inclination and azimuth (e.g., and/or LWD, MWD, etc.) may help to shorten days to depth (e.g., measured depth (MD) or total depth (TD)) of a borehole when compared to a drillstring with a PDM.

Figure 6:
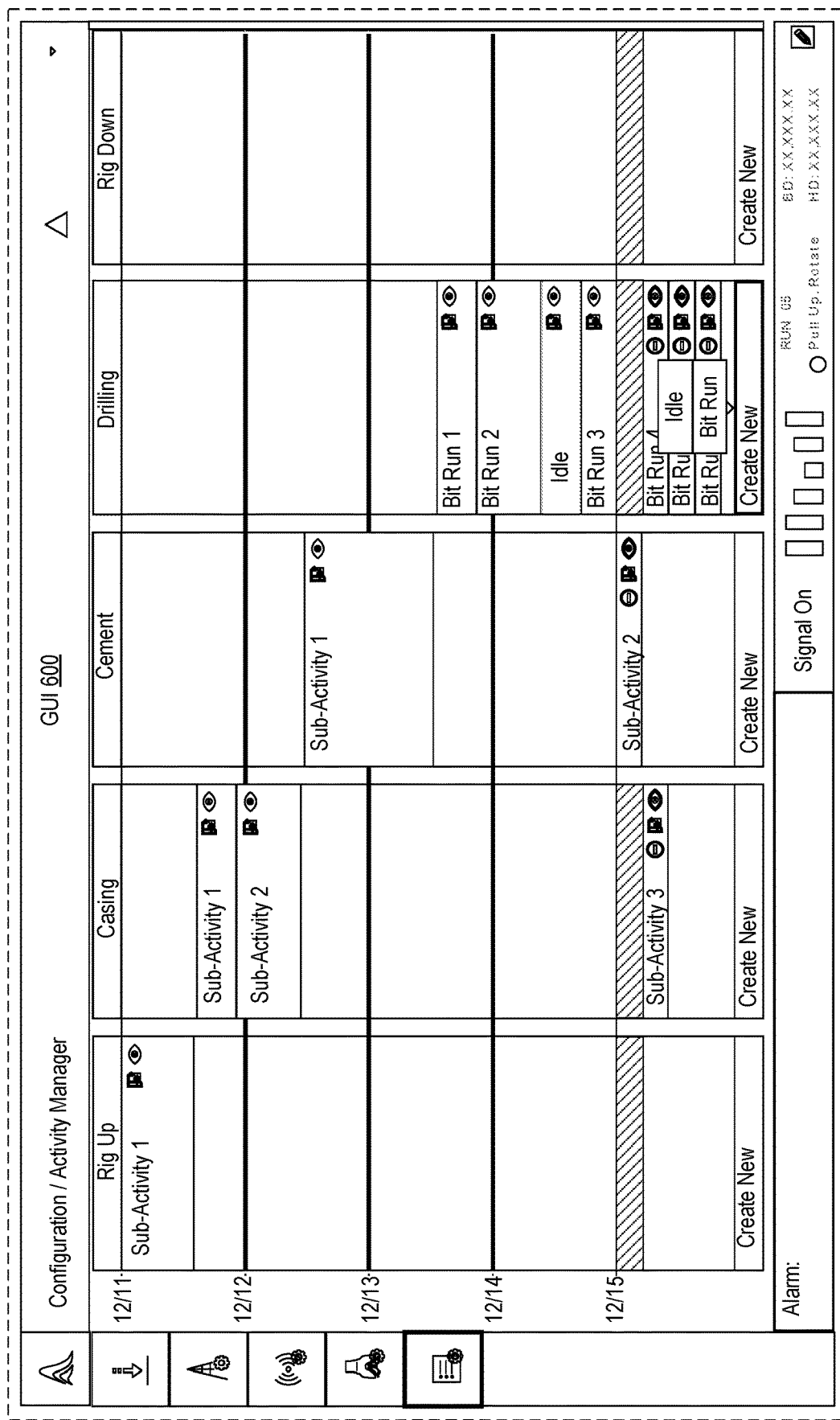
FIG. 6 illustrates an example of a graphical user interface.

FIG. 6 shows an example of a graphical user interface 600 that includes a schedule organized with respect to time (days, dates, etc.) and with respect to various types of operations. The GUI 600 can be part of a well planning system, which may be part of a field development framework. For example, the various operations in the GUI 600 can be implemented to drill at least a portion of a well in a geologic environment (e.g., an oil field or oilfield) where the well may be completed for one or more purposes (e.g., production of hydrocarbons, injection of fluid(s), fracturing of rock, etc.).

As an example, the GUIs 500 and 600 can be part of a field development framework. For example, the well plan 510 of the GUI 500 may be based at least in part on information rendered in the GUI 600. As an example, an interaction with the GUI 500 may be processed by one or more processors to generate information that can be rendered to the GUI 600 and, for example, vice versa.

As an example, a framework may be implemented using computing resources (e.g., hardware, communication equipment, etc.) as may be available, for example, in the cloud, a server, a workstation, etc.

As an example, a framework can include components that can take certain inputs and generate certain outputs. The outputs of a component may be used as inputs of another component or other components such that a real-time workflow can be constructed.

As an example, the GUIs 500 and 600 can be generated using processor-executable instructions stored locally and/or remotely. Referring to FIG. 4, such instructions may be stored in the system 470 (see, e.g., instructions 476) and/or remotely (e.g., as may be associated with one or more of the services 490). The system 470 can include and/or be operatively coupled to one or more displays (e.g., monitor, projector, etc.).

As an example, a method can perform real-time automated predictive trajectory control. For example, consider a method or methods such as a method 700 as in FIG. 7 and/or a method 800 as in FIG. 8. Such methods can be implemented using equipment such as, for example, rig equipment and drilling equipment. As an example, a method for surface supervision and predictive control of a directional drilling process can utilize real-time data (e.g., azimuth and inclination measurements, formation data, LWD data, etc.) with depth based estimates of formation data (e.g., LWD data, etc.), obtained from off-set wells, and a model of steering drilling performance (e.g., time-series model, semi-analytical model, analytical model, etc.), to predict ahead of a bit in a formation and thus optimize one or more set-point changes in terms of closed-loop trajectory control. Such an approach can provide for automated closed-loop trajectory control to satisfy given performance index (PI) targets. As an example, PI targets can be kept constant or can be changed depending whether steering is geometrical or geological.

As an example, a method can include using sensor data in real-time and combining those data with estimates (e.g., model and data) from offset wells to optimize set-point changes for a closed-loop trajectory control system (e.g. auto-nudge, HIA, etc.) to satisfy PI targets.

As mentioned, drilling parameters can include a steering ratio (SR) parameter. Another drilling parameter can be a toolface (TF) parameter. Toolface is the angle measured in a plane perpendicular to a drillstring axis that is between a reference direction on the drillstring and a fixed reference.

For near-vertical wells, north can be the fixed reference and the angle can be the magnetic toolface. For more-deviated wells, the top of a borehole can be the fixed reference and the angle can be the gravity toolface, or high side toolface.

Magnetic toolface angle may be utilized for near-vertical wells where the magnetic TF is the angle, or azimuth, of a borehole instrument within a borehole measured clockwise relative to magnetic north and in the plane perpendicular to the borehole axis; the north, east, south and west directions have magnetic toolface angles of 0 degrees, 90 degrees, 180 degrees and 270 degrees, respectively. As an example, magnetic toolface may be adjusted to reference grid north or true north.

Gravity toolface angle can be utilized for deviated wells where gravity TF is the angle of the borehole instrument within a borehole measured clockwise relative to up and in the plane perpendicular to the borehole axis; the high side (maximum build), maximum right, low side (maximum drop) and maximum left directions have gravity toolface angles of 0 degrees, 90 degrees, 180 degrees and 270 degrees, respectively.

As an example, a closed-loop can be established around steering (e.g., HIA, auto-nudge, etc.). Such an approach can allow a control system to be in a closed-loop around the steering. As an example, a control system can include 2 input/2 outputs (e.g., consider inputs of SR and TF demand and outputs of inclination/azimuth (e.g., DLS and TF response)).

As an example, a computational framework can be utilized for model inversion and a computational framework can be utilized for forward modeling. As to inversion, consider providing inputs and outputting WOB, etc. Such an approach can predict values of parameters that were utilized in drilling operations. As an example, an inversion can output a steerability at a particular point in time during a drilling operation. As an example, a forward model can be utilized to predict DLS. For example, consider providing inputs and outputting DLS capabilities.

As an example, predictions can be used for PI calculations and set-points adjustments. As an example, one or more PIs can be adjusted for each job (e.g., client, field, BHA, etc.).

As an example, a method can perform predictive steering of a drilling process. Such a method can include combining offset data to predict steering system performance, for example, in terms of dogleg capabilities (e.g., dogleg severity capabilities, etc.). Such a workflow can be configured to extract information from offset wells and combine that information with one or more physical models to improve RSS steering predictabilities and RSS steering for generating at least a portion of a borehole. As an example, a method can take advantage of expert knowledge from physics and experience learnt from offset data. A workflow can include running a fast-physical model (computationally fast) using offset well drilling parameters to predict steering performance for an entire section of a well (e.g., a section along a trajectory of a well). As an example, results can be compared to actual data as acquired during drilling where, for example, an error log can be computed based on the difference between model output and data. As an example, a method can operate based in part on a machine learning (ML) process, which, for example, may be performed to connect error with logged data. Such error can be propagated to predict performance under one or more other conditions. Results are presented herein for such an approach (see, e.g., FIGS. 26 to 31) with respect to the methods such as a method 2200 of FIG. 22 and a method 2500 of FIG. 25. As explained, a method can be an error-based learning method.

For example, error can be determined between values of a model and actual measurements from drilling where error can be utilized to train a machine learning system. Such a method can be generated by a trained machine learning system that can determine error (e.g., predict error) and can be utilized to determine where error is likely to occur for one or more scenarios. Such an approach can be utilized for one or more purposes, which can include, for example, planning and/or drilling (e.g., control, etc.).

As an example, a machine learning (ML) system can include a machine learning model (ML model or MLM), which is part of a computing system. Such a machine learning model (MLM) can be trained, for example, utilizing error, which can be from a number of drilling operations for a number of wells, which can include different wells. As an example, a physics-based model can be part of a computational system that is utilized for drilling and/or planning. As an example, a computational system can include a machine learning system with one or more machine learning models (MLMs), which may be neural network and/or one or more other types of machine learning models, and can include one or more physics-based models.

As an example, a method can use modeling and offset data learning to improve steering performance predictions and hence enable well construction planning and automation. For example, such a method can be implemented via computing equipment that is operatively coupled to field equipment for drilling (e.g., one or more drilling operations).

From a control perspective learning can be performed on past data (e.g., consider an open-loop multi-input/multi-output system). As an example, prediction of steering performance can be modeled as a function of drilling parameters, past trajectory and steering commands. Such an approach can be utilized for steering equipment during drilling of a borehole for a well, which may be a "next" well (e.g., learning from prior well(s)).

As an example, inclination and azimuth (e.g., dogleg severity and TF direction) can be influenced by inputs (e.g., drilling parameters and the steering commands). As an example, if a parameter changes, to get the same output, one or more other parameters can be modified (e.g., tool response with respect to DLS capabilities can be sensitive to ROP; for the same steering ratio (SR), WOB can change tool response; etc.).

As an example, a learning approach can utilize learning for steering parameters and the drilling parameters. As an example, steering changes can be called for from surface equipment, optionally with or without PI targets.

As an example, a method can include generating a steerability log, which can be a series of values of a steerability index (SI) with respect to location (e.g., x, y, z, depth, etc.). As an example, an inversion approach that utilizes a computational framework can search steerability information such that a model can fit data, which can generate a steerability log. Such an approach can search for parameter values that make a model fit acquired data where the parameter values can be utilized to generate a steerability log. A computational framework can be utilized as an inverter to perform an inversion process that generates values of steerability index with respect to location. The steerability index values can be utilized for purposes of learning, for example, to understand what conditions underlie the steerability index values. As an example, an inverter can be physics-based, which accounts for steerability index and walk angle. For example, an inversion can output more than one parameter such as, for example, steerability index and walk angle (e.g., or one or more other parameters).

As an example, surface supervision involvement can depend on one or more levels of downhole automation and ability to estimate speed of drilling (e.g., ROP). For instance, if the ROP (or MD) is available downhole, the predictive control can take place downhole with less surface interactions and downlinks, on the other hand, where no sensor/estimate of the ROP or MD is available, predictive control can be implemented as a combination of downhole and surface control. As an example, a downhole controller, once it receives targets via downlinking (e.g., or profile of the targets), it may use an automated control method to achieve the given goals.

FIG. 7 shows an example of a method 700 and an example of a system 790. The method 700 includes an acquisition block 710 for acquiring offset well data from one or more offset wells, an acquisition block 720 for acquiring subject well data (e.g., a well to be drilled or further drilled), a re-calibration block 730 for re-calibrating hole-propagation model parameter(s), a model block 740 for modeling behavior of trajectory controller(s) using parameter(s) (e.g., and using offset well data), an assessment block 750 for assessing steerability performance and/or re-defining a plan (e.g., a trajectory plan, etc.), a correlation block 760 for correlating data with offset well data during drilling, an adjustment block 770 for adjusting a depth metric such as measured depth (MD) of formation tops using correlation and adjusting downhole using estimated measured depth (MD), and a utilization block 780 for utilizing measured depth adjusted data and modeling to direct the bit of the drilling (e.g., during drilling).

In the example of FIG. 7, the system 790 includes one or more information storage devices 791 (e.g., data stores, server accessible data storage, etc.), one or more computers 792, one or more networks 795 and instructions 796. As to the one or more computers 792, each computer may include one or more processors (e.g., or processing cores) 793 and memory 794 for storing the instructions 796, for example, executable by at least one of the one or more processors. As an example, a computer may include one or more network interfaces (e.g., wired or wireless), one or more graphics cards, a display interface (e.g., wired or wireless), etc.

Figure 8:
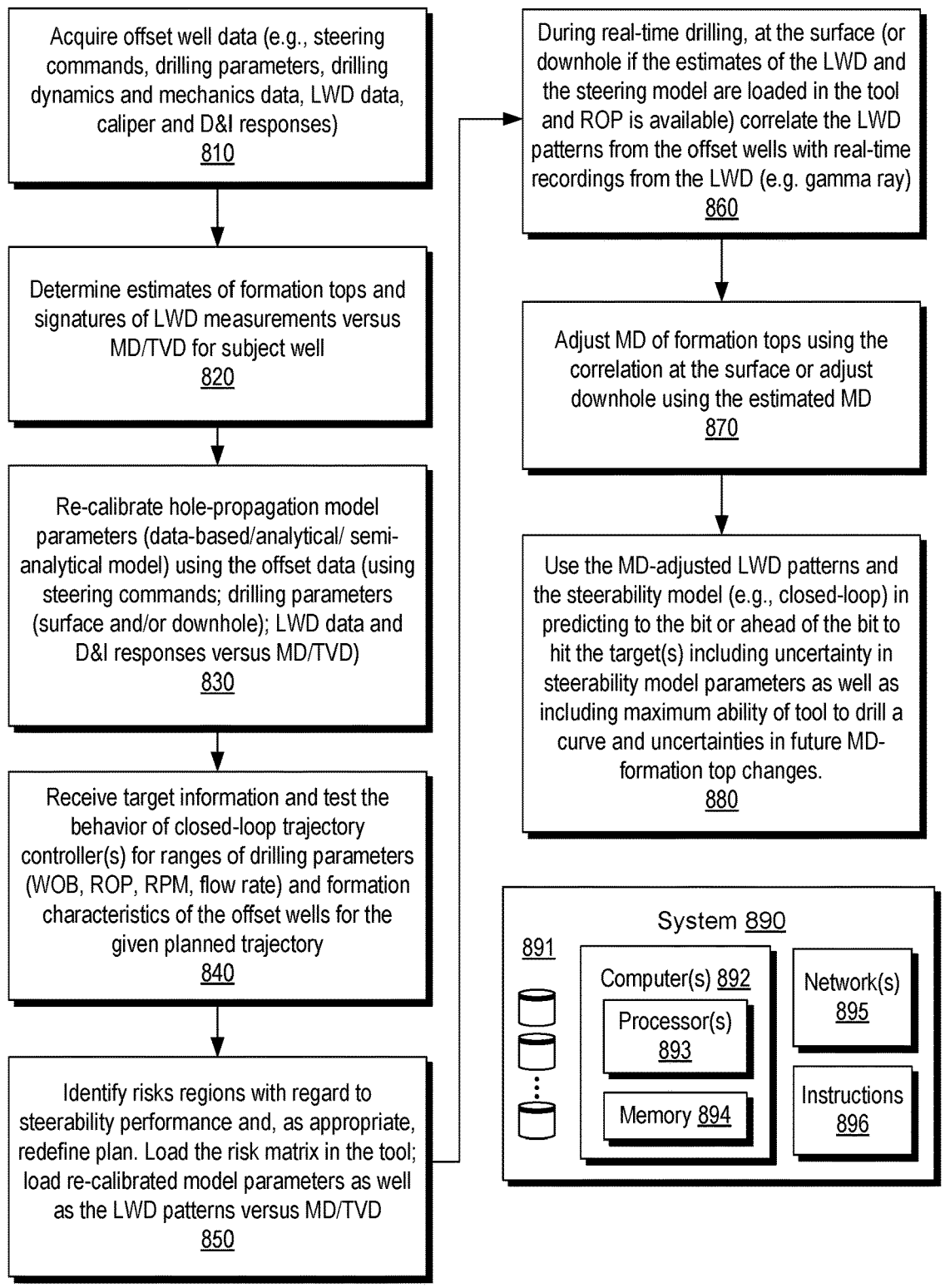
FIG. 8 illustrates an example of a method.

FIG. 8 shows an example of a method 800 that includes an acquisition block 810 for acquiring offset well data (e.g., steering commands, drilling parameters, drilling dynamics and mechanics data, LWD data, caliper and D&I responses), a determination block 820 for determining estimates of formation tops and signatures of LWD measurements versus MD/TVD for subject well, a re-calibration block 830 for re-calibrating hole-propagation model parameters (data-based/analytical/semi-analytical model) using the offset data (using steering commands; drilling parameters (surface and/or downhole); LWD data and D&I responses versus MD/TVD), a reception block 840 for receiving target information and testing the behavior of closed-loop trajectory controller(s) for ranges of drilling parameters (WOB, ROP, RPM, flow rate) and formation characteristics of the offset wells for the given planned trajectory, an identification block 850 for identifying risks regions with regard to steerability performance and, as appropriate, redefining a plan (e.g., loading a risk matrix in the tool, loading re-calibrated model parameters as well as the LWD patterns versus MD/TVD, etc.), a correlation block 860 for, during real-time drilling, at the surface (or downhole if the estimates of the LWD and the steering model are loaded in the tool and ROP is available) correlating the LWD patterns from the offset wells with real-time recordings from the LWD (e.g. gamma ray), an adjustment block 870 for adjusting MD of formation tops using the correlation at the surface or adjust downhole using the estimated MD, and a utilization block 880 for using the MD-adjusted LWD patterns and the steerability model (e.g., closed-loop) in predicting to the bit or ahead of the bit to hit the target(s) including uncertainty in steerability model parameters as well as including maximum ability of tool to drill a curve and uncertainties in future MD-formation top changes. As an example, one or more actions of the method 800 may be utilized in the method 700.

FIG. 8 also shows an example of a system 890 that includes one or more storage devices 891, one or more computers 892, one or more network interfaces 895 and one or more sets of instructions 896. As shown, the one or more computers 892 can each include one or more processors 893 and memory 894 that is accessible to at least one of the one or more processors 893. As an example, the memory 894 can store instructions such as one or more of the one or more sets of instructions 896. As an example, the one or more sets of instructions 896 can include instructions executable by at least one processor to perform one or more actions of a method such as the method 800 and/or the method 700.

As an example, automated predictive trajectory control can include a surface supervisory mode (e.g., with predictive capabilities at the surface) and a predictive downhole control mode.

In a supervisory mode, consider steering commands chosen and sent by a directional driller from the surface. In such an example, the system can send a message to indicate a positive correlation (e.g., correlation between real-time LWD data and estimated LWD data from offset-well) that has been obtained that would indicate the DLS yield reduces in a formation coming up in 20 m MD and would advise changing the setting to xx deg/xx % SR, or that a formation push to the left is expected to start in 20 m MD and would advise changing the setting to xx deg/xx % SR.

In a downhole control mode, a system may operate and steer drilling of a well autonomously. As an example, a downhole control mode may operate on a distance and/or time basis that is less than that of a mode that depends on surface transmission(s). For example, consider a mode that depends on transmitting during addition of drill pipe where a bit is not rotating. If a stand of drill pipe is approximately 30 meters in length and drilling at an ROP of approximately 30 m/h, then the opportunity for transmission of control instructions may be at approximately 60 minute intervals (e.g., unless rotation of a drill bit is halted while drilling the stand). In various instances, a downhole control mode may operate during drilling; noting that such a mode may operate while rotation of a drill bit is halted).

As an example, one or more control modes can provide for real time drilling decisions to be made with the addition of correlated information from relevant offset wells. As an example, a correlating and predictive method can be refined and enabled downhole for predictive trajectory control and drilling parameter optimization with automated closed loop systems. As an example, a method can be part surface and part downhole, which may optionally change during the course of drilling. For example, depending on information (e.g., correlations, etc.) available, control may shift from downhole to surface and/or from surface to downhole. For example, consider a scenario where real-time data indicates a change in one or more of sensitivities, formation properties (e.g., from those expected), error in a forward model, etc., such that control is shifted from downhole to surface. Once a change is addressed, for example, via re-optimization, control may be shifted to downhole, optionally in a progressive manner (e.g., parameter by parameter, etc.).

Referring to FIG. 8, as an example, the blocks 810 to 850 can be part of a process flow that is performed before a job and includes collecting the relevant data from offset wells in terms of the steering and disturbances (e.g., inclination and azimuth data versus MD, steering commands, controller gains, LWD data, other measurements such as caliper and vibration data if available). The data can be used before the job to re-calibrate the hole-propagation model and the LWD data can be used to estimate the formation patterns for the new run. Once one or more models are re-tuned, one or more simulations can be used to identify one or more risk areas in terms of steerability performance and suggest one or more mitigation measures such as ranges of drilling parameters or changes in the BHA configuration if appropriate. As an example, such a process may control operations as to where control is performed (e.g., surface, downhole or both). As to re-tuning, consider, for example, a system 1070 of FIG. 10, which is described further below. Such a system can be configured to receive real-time data of a well, of an offset well, etc., such that one or more outputs can be revised.

As an example, once LWD estimates are obtained and a hole-propagation model is re-calibrated, depending on a desired level of automation, information may be loaded in a tool and/or used at the surface as part of a predictive control method. In FIG. 8, the blocks 860 to 880 show a process for real-time predictive trajectory control.

Figure 9:
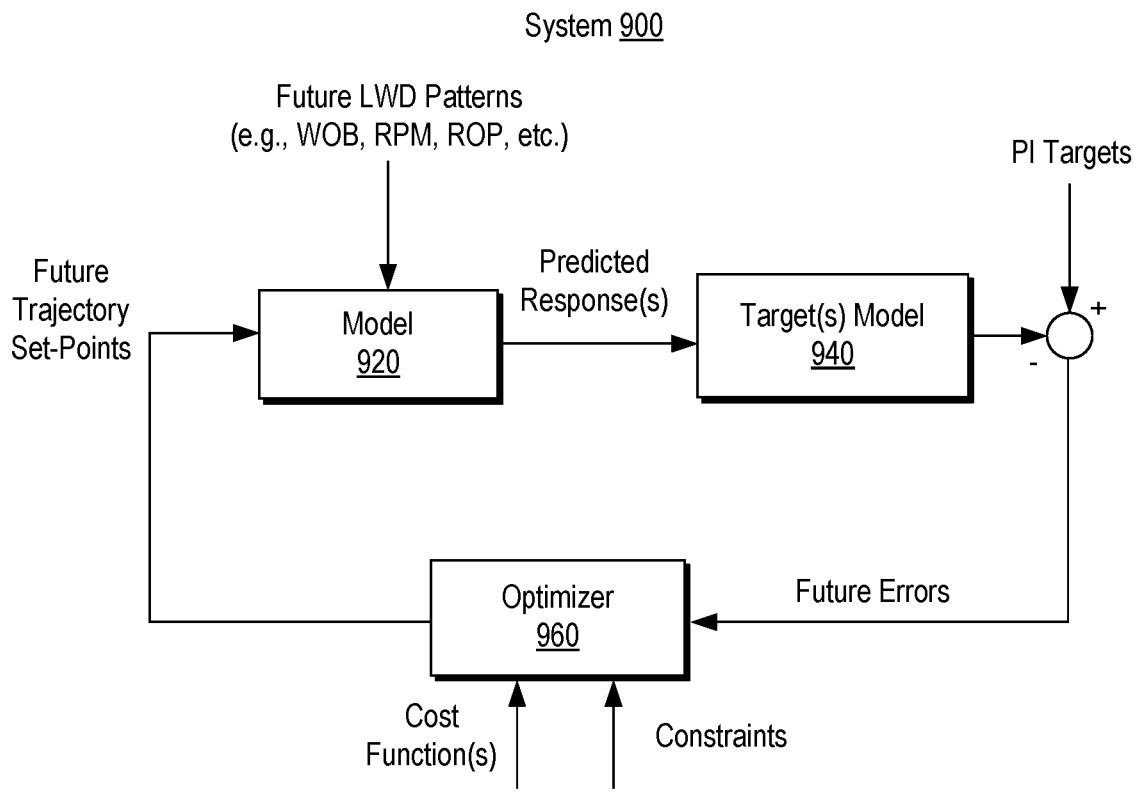
FIG. 9 illustrates an example of a system.

FIG. 9 shows an example of a system 900 that includes a model block 920, a target(s) model block 940 and an optimizer block 960. Such a system may be implemented for performing one or more methods (e.g., of FIG. 7, FIG. 8, etc.). As an example, the system 900 can be utilized for predictive control. As shown, a PI model (e.g., one or more mathematical equations implemented in circuitry, which can include processor-executable instructions executable by a processor, etc.) can be used as part of the optimization process along with the re-calibrated model of the steering performance and future patterns of the LWD data, WOB, RPM and ROP.

In FIG. 9, as to the system 900, the cost functions and the constraints in the predictive model can be customized and dependent on specific well location and well characteristics. As an example, PI targets can also be derived specifically for a particular job (e.g., client, well, BHA, etc.). Examples of the cost functions can include finding a trajectory with the minimum MD to achieve a PI target, minimize the number of instructions to be downlinked to the tool, minimize the deviation around desired DLS, minimize the tortuosity, etc.

A cost function can be, for example, part of a computational mathematical optimization, which may be a loss function that is a function to be minimized. As an example, a cost function can be a function that a network, networks or one or more other machine learning models want to minimize. Such a function can be represented as the difference between a target and a model's output. (e.g., consider a mean absolute error, a mean square error, etc.). Different cost functions may implement different notions of "distance" between a target and a model's network output (e.g., softmax cross-entropy, Kullback-Leibler divergence, etc.). In general, a cost function can give a distance metric, and a model (e.g., a network, a kernel, etc.) tries to make the distance negligible.

As an example, steering model constraints can include a geometric 3D "zone of acceptable trajectory". Such an approach may incorporate an ellipsoid of uncertainty (EOU) and one or more anti-collision constraints. A system can also include the DLS capability of a specific tool being used and limits set by a client, etc., for maximum DLS in a section.

As an example, a tool may be specified according to its DLS capability, which may pertain to a type of formation or types of formations. As an example, consider the POWERDRIVE ARCHER (Schlumberger Limited, Houston, Texas) high build rate rotatable steerable system (RSS), which is suitable for high-curvature 3D wells, operations involving sidetrack and dogleg severity (DLS) assurance, etc. Such a tool can provide for well trajectories akin to those achieved using positive displacement motors. Such a tool can include a near-bit continuous inclination and azimuth measurement unit, and a near-bit azimuthal gamma ray (GR) measurement unit. As to mechanical specifications of an example RSS (e.g., POWERDRIVE ARCHER 475 RSS (4% in OD) or 675 RSS (6% in OD); noting some specifications can differ), a nominal OD may be about 120.7 mm with an overall tool length of about 4.56 m (e.g., about 15 ft) for the 475 RSS and about 171.5 mm and 4.92 m (e.g., about 16 ft) for the 675 RSS. As to DLS capability, it may be approximately 18 degrees per 30 m (e.g., about 18 degrees per 100 ft) for the 475 RSS and approximately 15 degrees per 30 m (e.g., about 15 degrees per 100 ft) for the 675 RSS. The DLS capability can depend, for example, on one or more of bit specifics, bottom hole assembly specifics, various parameters, formation type, etc.

As an example, a bit speed may be in a range from greater than 0 to approximately 350 RPM. A maximum weight on bit (WOB) can be approximately 155,688 N (e.g., about 35,000 lbf) and a maximum torque can be about 12,202 Nm (e.g., about 9,000 ft lbf). As to overpull, consider a maximum of approximately 1,210,000 N and passthrough (DLS sliding) of approximately 30 degrees. As to hydraulics, a flow range may be about 490 to about 1,350 liters per minute. Measurement units can include, for example, inclination offset to tool bottom, azimuth offset to tool bottom, azimuthal gamma ray (GR), average gamma ray (GR), gamma ray (GR) offset to tool bottom, vibration axial, vibration radial, shock, and shock and vibration axis. An automated communication loop (e.g., telemetry loop) can provide for inclination and azimuth and downlinking may be utilized, for example, as to flow and RPM (e.g., POWERDRIVE ARCHER 475 RSS or 675 RSS; noting some specifications may differ).

As an example of a drilling operation, consider a high DLS and completed lateral in single run utilizing a POWERDRIVE ARCHER RSS in a POWERDRIVE VORTEX powered RSS configuration to drill a 6-in section in a subsurface region of Kazakhstan. In such an operation, a relatively constant DLS of 10 degrees per 30 m was sustained through a curve with a lateral section drilled to 515 m (e.g., 1,690 ft) in a single run over 42 drilling hours. The operation involved using the QUIKDOWNLINK service for 83 percent of the time to enable steady flow and stand pipe pressure, both of which can provide for reduction or prevention of differential sticking. The operation was implemented in a manner that reduced drilling time by up to 6 hours under what had been planned. A 4½-in liner was run without issues. The success of the run and resulting wellbore quality helped to reduce the overall well construction process by approximately 12 days.

Figure 10:
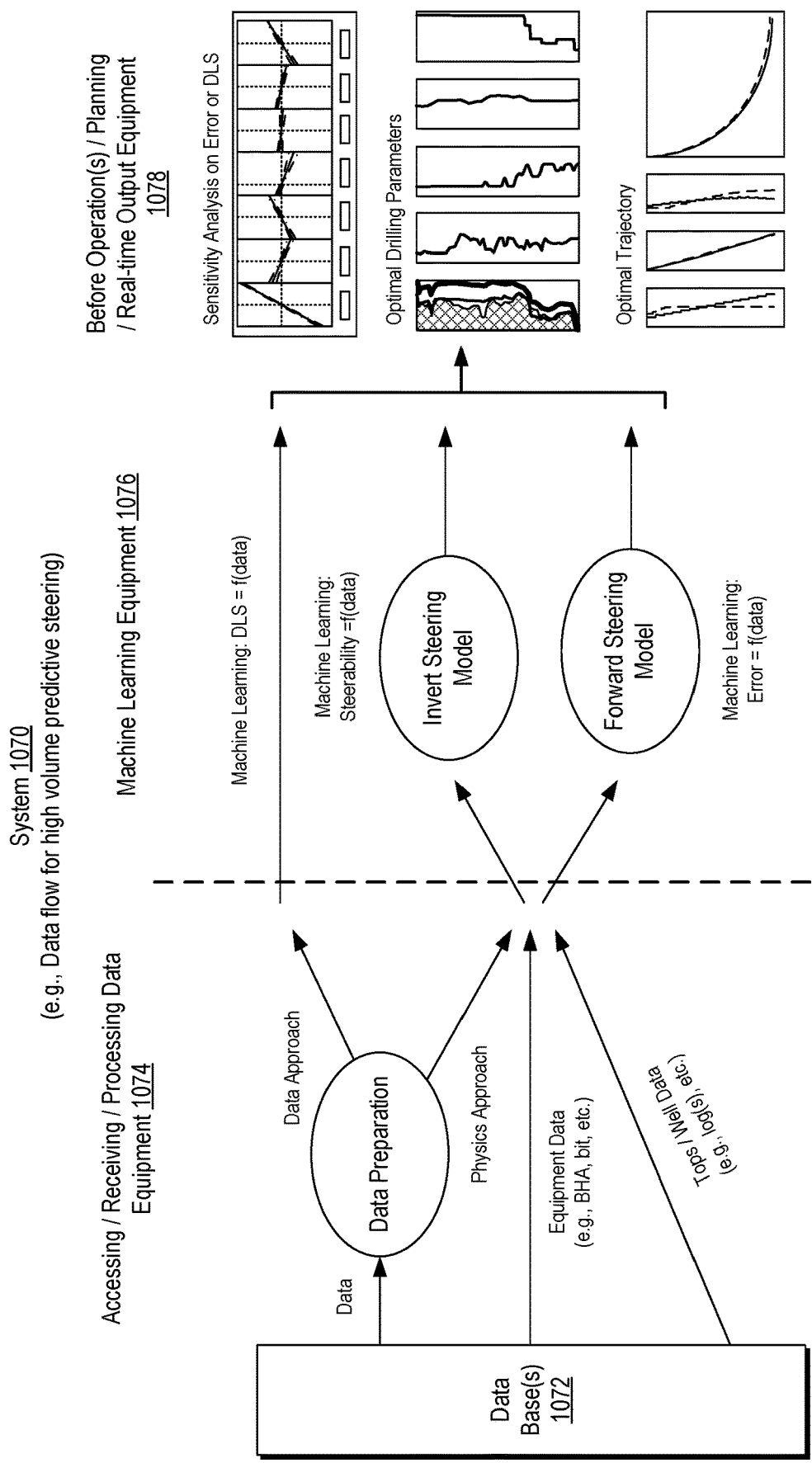
FIG. 10 illustrates an example of a system.

FIG. 10 shows the example system 1070 that can be implemented, for example, for predictive steering. The system 1070 includes one or more data bases 1072, equipment for accessing, receiving and processing data 1074, equipment for machine learning (ML) 1076 and output equipment 1078. The equipment of the system 1070 can include computerized equipment and associated types of components (e.g., network components, etc.), which may include cloud-platform components (e.g., to access one or more cloud-based resources, etc.).

The system 1070 can be utilized in a planning phase, re-planning phase, forensics phase, or in real-time. For example, one or more drilling plans may be revised during one or more drilling operations. As an example, consider revising one or more drilling parameters in real-time that may be to maintain drilling along a planned trajectory or to drill along a revised trajectory (e.g., an optimal or optimized trajectory or portion of a trajectory). As an example, drilling parameters can include one or more steering parameters that cause a drillstring to drill into rock along a desired trajectory through that rock (e.g., to reach an intended target).

As to the machine learning equipment 1076, it can be configured via instructions stored in memory to perform machine learning as to dogleg severity (DLS) and/or other data (e.g., as output per the equipment 1074), as to steerability and one or more parameters, as to error and one or more parameters, etc.

As shown, a sensitivity analysis may provide an indication of various control parameters, for example, as to error and/or DLS. For example, consider an example of a well trajectory with a 90 degree horizontal portion. The system 1070 may output optimal drilling parameters to achieve a 90 degree horizontal portion, which can include optimal drilling parameters to land at a location in the Earth to commence the 90 degree horizontal portion (e.g., with optimal time to landing, etc.). As an example, one or more optimal drilling parameters can be provided in an effort to achieve a desired DLS during drilling.

As shown, the ML equipment 1076 can include equipment for machine learning DLS as a function of data using a data-based approach, for machine learning steerability as a function of data utilizing a physics-based model/approach, and for machine learning error as a function of data utilizing a physics-based model/approach. As shown, the ML equipment 1076 can provide for inversion and forward modeling with respect to steering. The former may be for outputting steerability versus one or more parameters while the latter may be for outputting error versus one or more parameters. As indicated, a physics-based model may be utilized for one or more actions and/or a data-based approach may be utilized for one or more actions. As an example, a model can be a DLS model, which can be for the data-based approach to output sensitivity analysis results. A DLS can be a desired DLS or desirable DLS. Output as to a DLS can be dependent on formation, target, drilling equipment, etc. using a data-based approach and/or a physics-based model approach.

As to DLS with respect to one or more parameters, a sensitivity analysis can consider one or more of the following parameters SR, ROP, RPM, FLW, WOB, GMR, and INC. As an example, output can be given with a most likely relationship with one or more limits (e.g., upper and lower). As an example, as to ROP (rate of penetration), consider DLS capability reduces with ROP, such that faster drilling reduces ROP. As an example, as to INC (inclination), if inclination increases, DLS can increase. The two foregoing examples demonstrate that some parameters can affect DLS in one manner and that others can affect DLS in another manner. Further, the parameters themselves have an effect on an overall drilling process. For example, it can be desirable to utilize a higher ROP in an effort to reach a target via drilling in lesser time. Going as fast as possible, the drillstring may not achieve a desired DLS; however, going slow, may achieve the desired DLS while not being optimal in time. A balanced approach can be output with various ROPs that are appropriate for various corresponding portions of a trajectory. For example, if a trajectory has a portion with lesser DLS demand, then a higher ROP may be utilized; whereas, for a portion that has a higher DLS demand, a lesser ROP may be utilized. Such an approach may achieve a faster time to a landing point and a faster time to a desired total depth (TD).

As an example, optimal drilling parameters may be output with respect to depth. For example, consider outputting one or more of ROP, RPM, flow, and build command with respect to depth (e.g., measured depth, vertical depth, etc.).

As an example, an optimal trajectory may be illustrated with respect to total vertical depth (TVD) and direction (e.g., N-S, E-W, etc.) along with one or more of DLS, INC and ROP with respect to measured depth (MD), which can be expected to be a greater value than TVD. As an example, an output can be plots of MD versus DLS values, MD versus INC values, MD versus ROP values and trajectory in TVD versus direction.

As explained, the system 1070 can perform a sensitivity analysis, which may optionally be updated in real-time. Real-time drilling can provide meaningful data to confirm and/or revise a sensitivity analysis. As an example, data may be received in real-time from one or more offset wells, which may be drilled and/or being drilled.

In FIG. 10, the system 1070 may aim to establish or uncover a correlation between one or more wells, which may also consider how many wells to consider for such a correlation and whether it improves substantially upon addition of another well. As an example, the system 1070 may consider one or more types of machine learning models (e.g., linear, non-linear, Gaussian process (GP), neighboring component analysis (NCA), etc.) and, for example, what parameters to be utilized.

As an example, a physics-based model can be generic to a particular extent and can be made to be more specific using error. For example, an error analysis can help to characterize a physics-based model for a particular well. As an example, an overarching model or customized model for a well can be a physics-based model that is made more specific for the well via use of error. Such an approach can utilize error to account for phenomena, equipment, formation, etc., that may be difficult to capture in a physics-based model alone. As an example, a model can be revised based on an error analysis, for example, to revise the model to account for a physical aspect of a drillstring (e.g., a BHA, etc.). For example, if the error indicates a deviation for particular operations of a drillstring, which logically correspond to flexing of the drillstring, a model may be revised to include terms that describe flexing of the drillstring. Such an approach can be tested to determine whether the terms reduce that particular error. As an example, such an approach can be performed in real-time such that a balance between a physics-based approach and data-based approach is tuned, which can improve output(s).

FIGS. 11, 12, 13 and 14 show some examples of outputs that may be generated and output by the system 1070, which may be pre-drilling outputs for purposes of planning or during drilling outputs (e.g., real-time outputs during drilling operations, etc.).

FIG. 11 shows examples of outputs 1100 as to a sensitivity analysis as may be performed by the system 1070. As shown, the outputs 1100 can include one or more graphical user interfaces (GUIs) 1110, 1120 and 1130. The GUI 1110 can be a drill optimization GUI that can present information as to increasing performance as to DLS. For example, consider the options presented in the GUI 1110, which may be ranked or otherwise ordered. As shown, the options include increase SR, reduce ROP, increase RPM, reduce flow and increase inclination. The GUI 1110 can include one or more graphical controls that can be actuated responsive to input from a human input device (HID) or other equipment such that one or more additional GUIs may be rendered to a display. For example, consider the SR GUI 1120 being rendered responsive to selection of the increase SR option. In such an example, a GUI may be presented that shows a range, a value, etc., that can be utilized automatically and/or via receipt of user input. As to the GUI 1130, it shows a series of plots of operational parameters. The GUI 1130 shows output indicated to increase DLS, increase SR, reduce ROP, increase RPM, reduce FLW, and increase INC. The detailed output GUI 1130 can show a user and/or inform a controller as to how a change in a parameter value may impact DLS. Further, error bounds may be shown such that confidence in values, trends, etc., may be ascertained and utilized in decision making, control, etc.

FIG. 12 shows an example of a method 1200 that can include selecting one or more options as to how to generate, present, etc., output, along with examples of output 1210 and 1230 as to various operational parameters. As to the method 1200, it can include selecting a WOB control block 1202 for ROP effect taken into consideration in error calculation and/or selection a ROP control block 1204 for WOB effect taken into consideration in error calculation. As shown, for the output 1210 and the output 1230, which may be rendered to a display as graphical user interfaces, they correspond to the ROP control block 1204. In the output 1210, the data indicate that surface RPM has not a substantial effect and that an optimal flow may be approximately 620 GPM. In the output 1230, a model recommendation of a computational framework is to increase the flow and reduce surface RPM. As to ROP control, the WOB effect can be taken in an error calculation.

Figure 13:
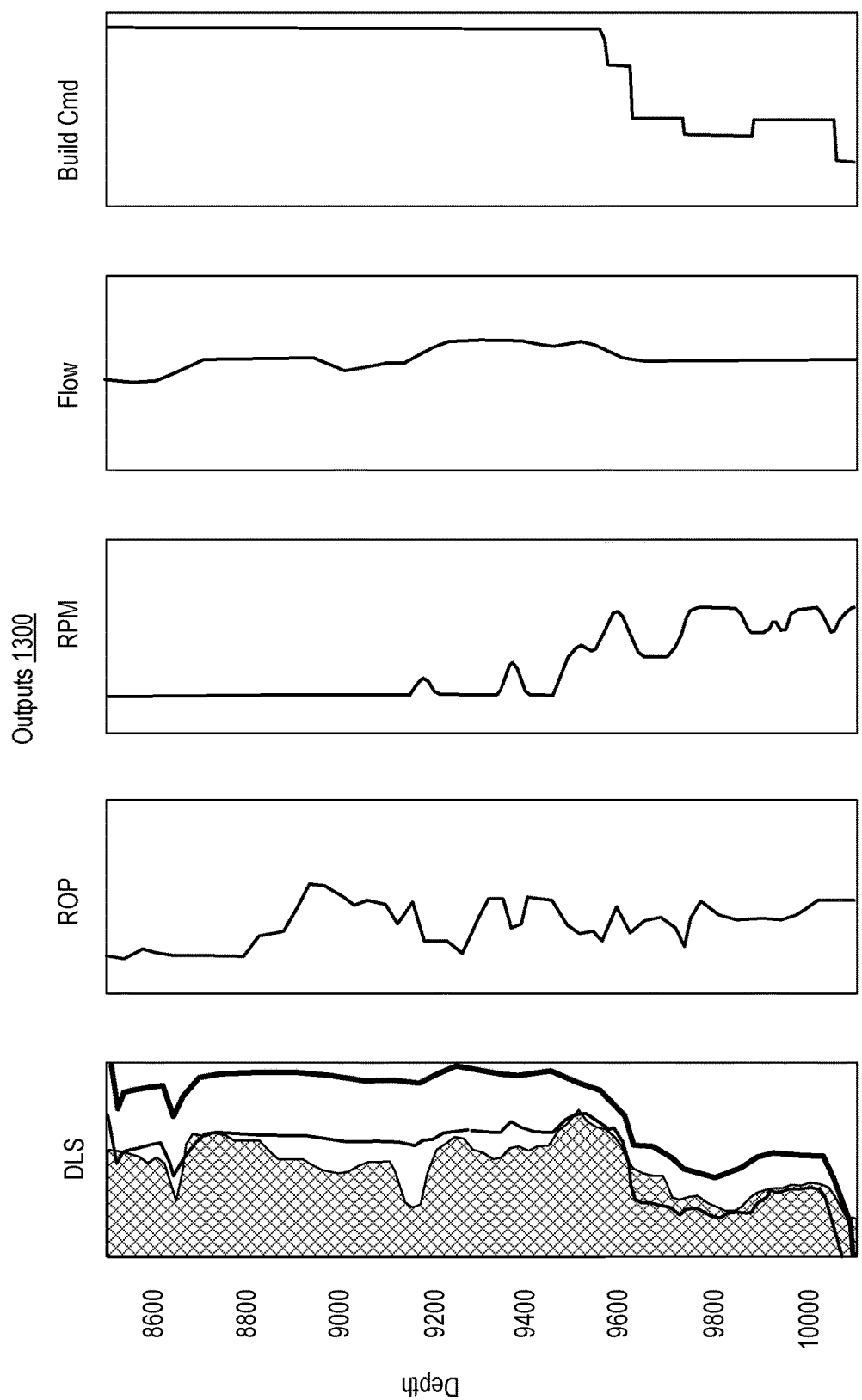
FIG. 13 illustrates examples of outputs of the system of FIG. 10.

FIG. 13 shows an example of output 1300 that includes ROP, RPM, flow (FLW) and Build Command (Bcmd) versus depth. Such output may be utilized by a driller and/or by a controller to control one or more operations associated with drilling. The output 1300 can be rendered as a graphical user interface (GUI), optional with respect to a 1D, 2D, 3D, etc., representation of a region in which a borehole is to be drilled, is being drilled, has been drilled, etc. For example, a user may visualize the DLS data with respect to depth and a trajectory where a borehole aims to reach a target. Various options, recommendations, etc., may provide for resources demanded, time, etc. For example, consider a first set of parameter values with respect to depth indicating a first time to reach a target and a second set of parameter values with respect to depth indicating a second time to reach a target. As shown in FIG. 13, ROP may change with respect to depth depending on formation properties and/or drilling parameters. As ROP changes, time to reach a target can change.

Figure 14:
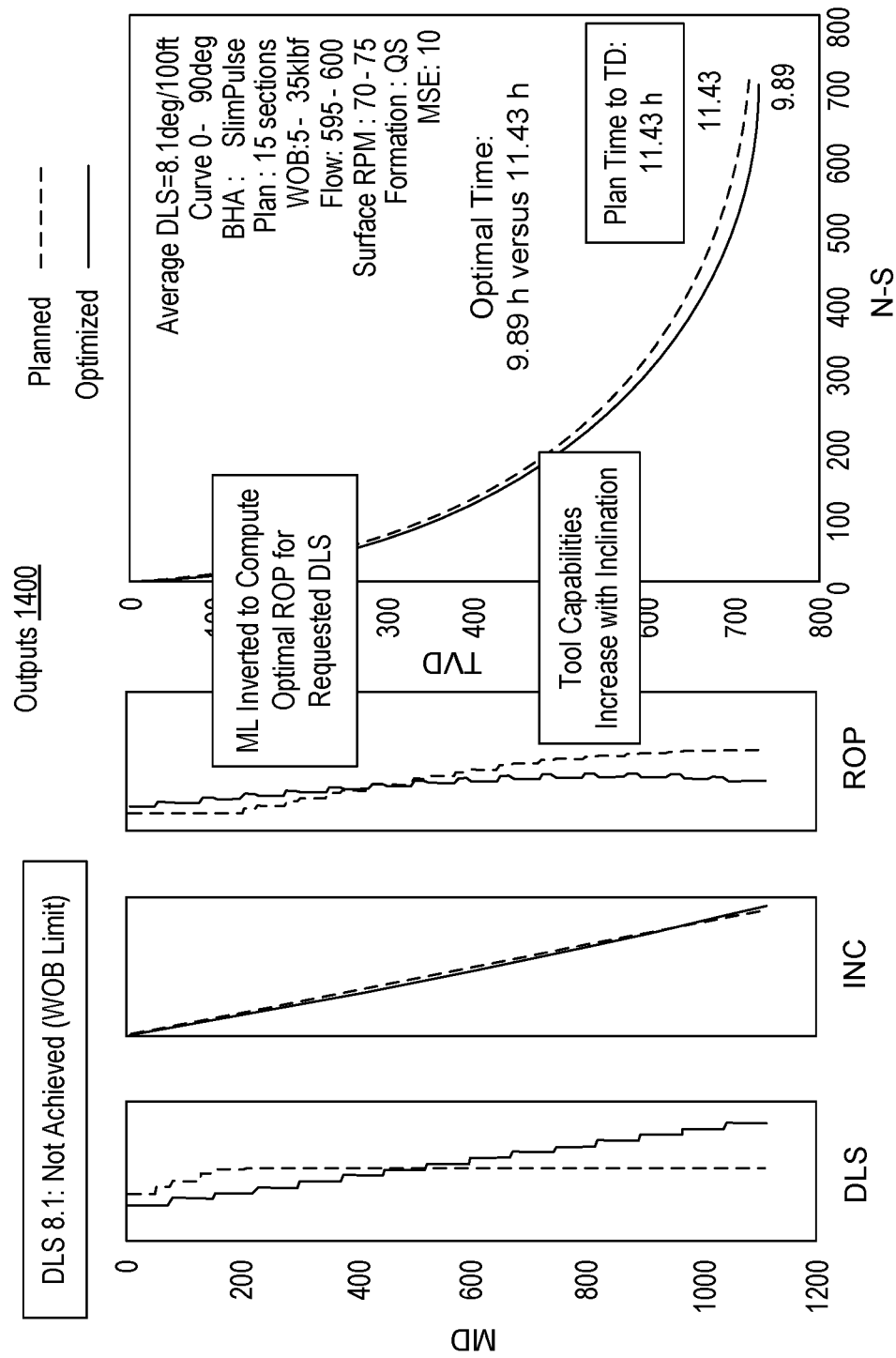
FIG. 14 illustrates examples of outputs of the system of FIG. 10.

FIG. 14 shows an example of output 1400 that includes a series of plots for DLS, INC, ROP and trajectory. The output 1400 includes a message that indicates that an optimization process can output values for parameters that reduce time to target from 11.43 hours (planned) to 9.89 hours (optimized). Other messages may include information as to DLS, etc. As indicated in the output 1400, machine learning was utilized in an inversion process to compute an optimal ROP to deliver a requested DLS. As indicated, tool capabilities as to DLS tend to increase with inclination. As indicated, a plot can include a prior plan's values and an optimized plan's values. In such a manner, a driller and/or planner can readily distinguish where and/or how an optimized plan is achieved.

As an example, the output 1400 can be in the form of a graphical user interface (GUI) that can include one or more graphic controls that allow for interaction, for example, to adjust one or more values of an optimized plan (e.g., to trim back, further optimize, etc.). As an example, a controller may be operatively coupled to a framework to receive output such as output indicated in one or more of FIGS. 11, 12, 13 and 14.

FIG. 15 shows a plot 1501 of the aforementioned run to illustrate how measured depth (MD) versus time can be expedited through use of appropriate control and FIG. 15 shows an example of a method 1505 that includes a trajectory 1510 in two-dimensions, which can be a 3D trajectory, with an origination point 1520, a zone 1530 and a target 1540. Within one or more geometric zones, deviations may be acceptable and mean that the target can still be intersected without violating one or more DLS limits and within the capability of the tool. As an example, the graphic of FIG. 15 may be presented as a graphical user interface (GUI) as rendered to a display, for example, in a driller's cabin during drilling and/or remote from a drilling site. As an example, a zone of acceptable trajectory can be a cone shape to a certain depth where the cone would start to converge to the target.

Specifically, the method 1505 of FIG. 15 shows an example of the trajectory target 1540 and a calculated 3D acceptable allowed divergence 1530 from the well plan (e.g., part of the PIs) that maybe used as part of an optimization algorithm (see, e.g., the system 900, the system 1070, etc.). In such an approach, a GUI can be rendered to a display to show a trajectory target with an added zone of acceptability that is part of the predictive control. As an example, control may be implemented to achieve a target (e.g., within acceptable limits) in a manner that can expedite drilling (see, e.g., the plot 1501).

As to data, they can include gamma ray (GR) data. For example, a LWD tool or segment (e.g., component of a drillstring) can include a GR tool (e.g., a GR unit, etc., as mentioned with respect to the RSS examples). As an example, GR offset data (as acquired by a logging while drilling tool) gathered before a job can be utilized in a predictive control method. As an example, a method can include acquiring gamma ray (GR) measurements downhole in real-time where these can be compared and correlated with a GR model derived from offset data (e.g., one or more offset wells). Such an approach can be implemented on the surface and/or downhole utilizing appropriate computational equipment.

As an example, if a correlation is found between the real-time GR and estimated GR model, a depth shift can be utilized to adjust the model to the current well depth.

Figure 16:
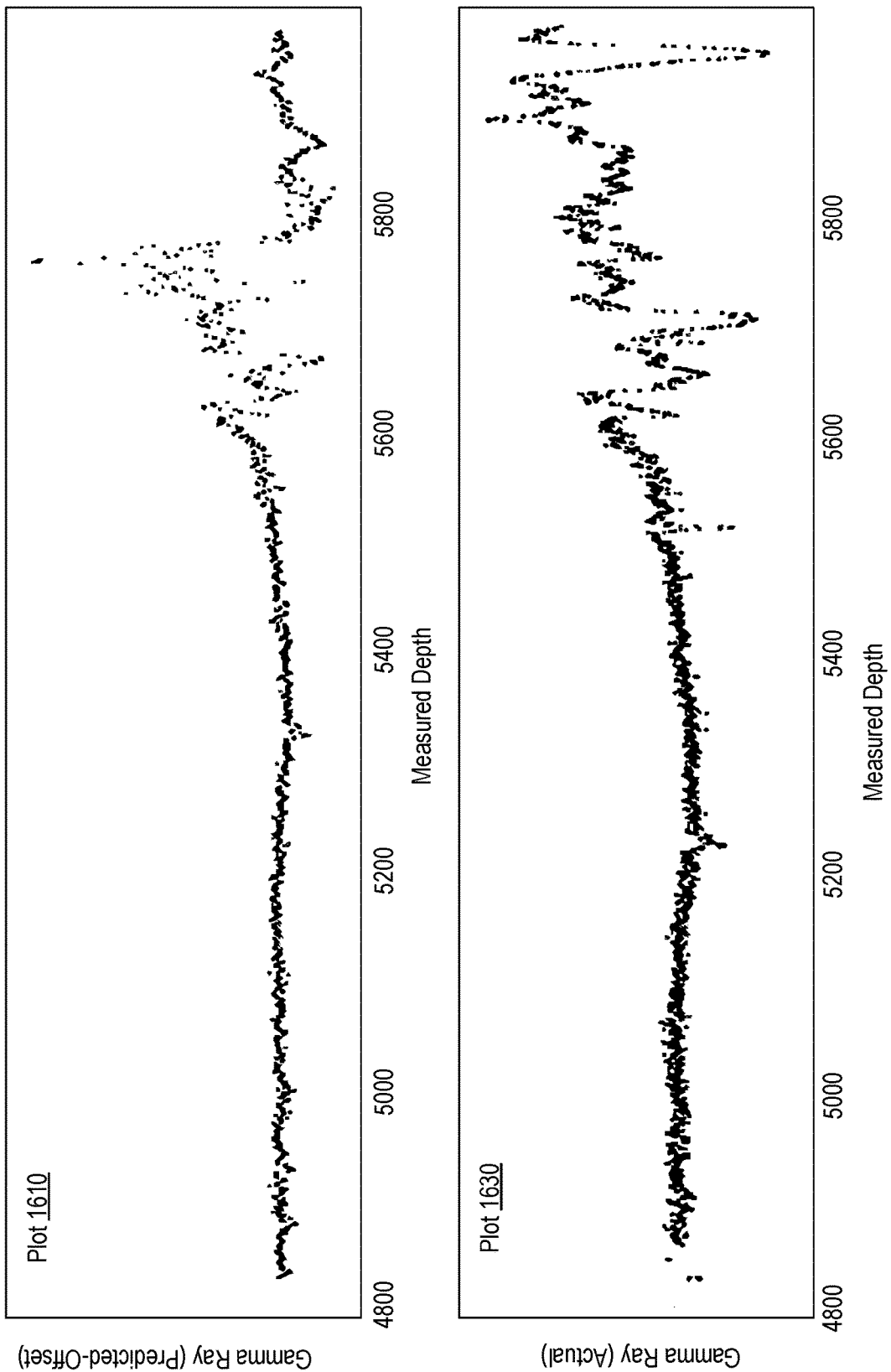
FIG. 16 illustrates examples of plots.

FIG. 16 shows example plots 1610 and 1630 of GR values versus measured depth (MD) as to such an approach for a GR model in the plot 1610 (e.g., from offset well GR data) and GR data in the plot 1630.

As an example, once data are depth shifted, one or more future LWD patterns (e.g., limestone layers, shales, clays and the GR predictions) along with the steerability model (e.g., including the steering commands and the drilling parameters—e.g. WOB, RPM and Flow) can be used to predict ahead of the bit and calculate the PIs (see, e.g., the method 1505).

As an example, if the predicted well path, while drilling violates one or more of the real time PIs then the predictive model-based control approach can be used to re-define (e.g., optimize) one or more trajectory targets (e.g., as one or more set-point changes in the trajectory) to satisfy the given PIs.

Figure 17:
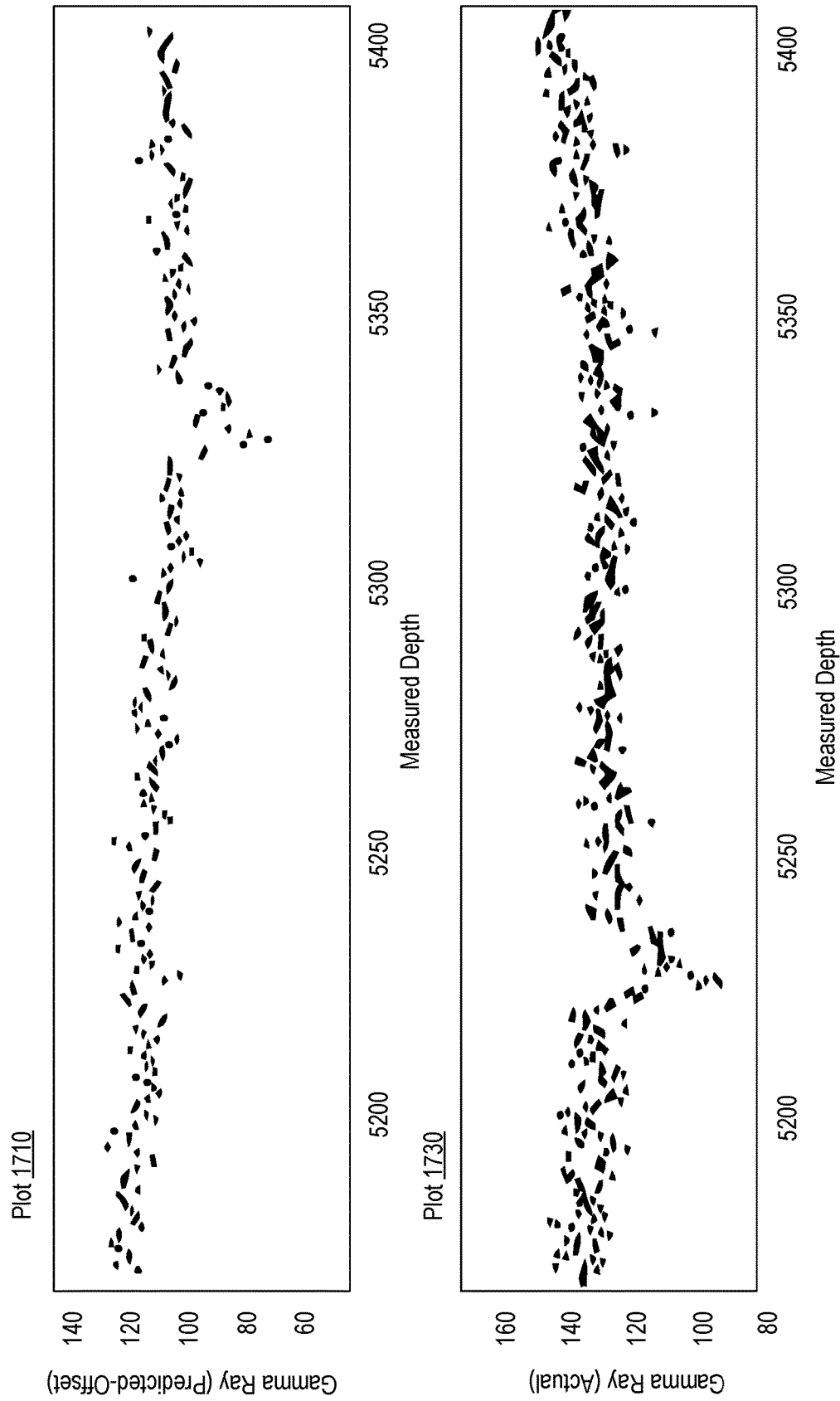
FIG. 17 illustrates examples of plots.

FIG. 17 shows example plots 1710 and 1730 of the depth difference between predicted GR values and measured real time GR values.

Figure 18:
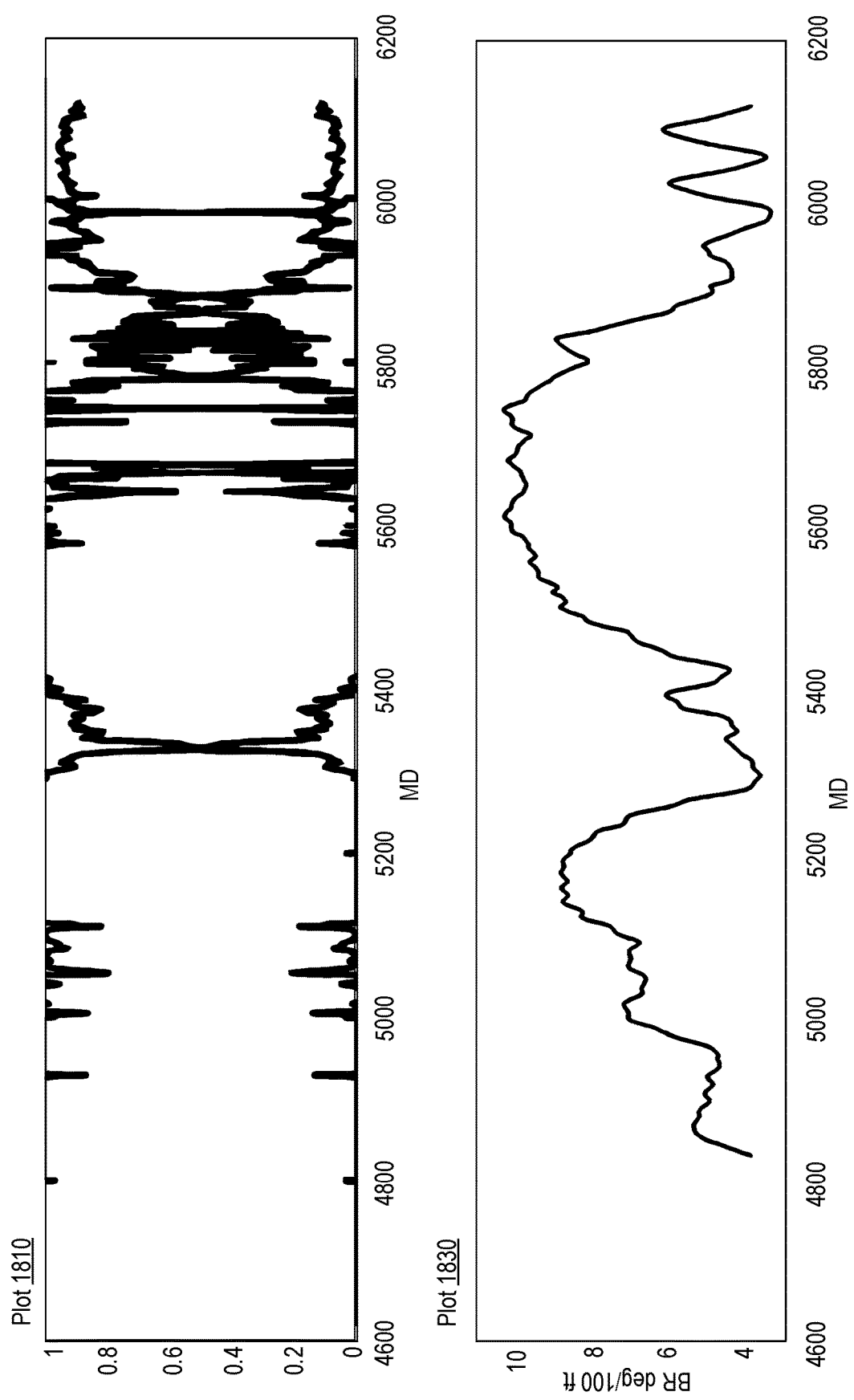
FIG. 18 illustrates examples of plots.

FIG. 18 shows example plots 1810 and 1830 as to build rate (BR) (ΔInc/ΔMD·100) (deg/100 ft or deg/30 m) versus MD in the plot 1830 while the plot 1810 shows the unshifted pattern estimates from an aforementioned drilling bit optimization framework as to limestone composition, shale composition, and volume/volume versus MD. The drop in the build rate is not due to a change in the steering settings. As shown in the unshifted data, it can be seen how the build rate is not correlated with the formation change.

Figure 19:
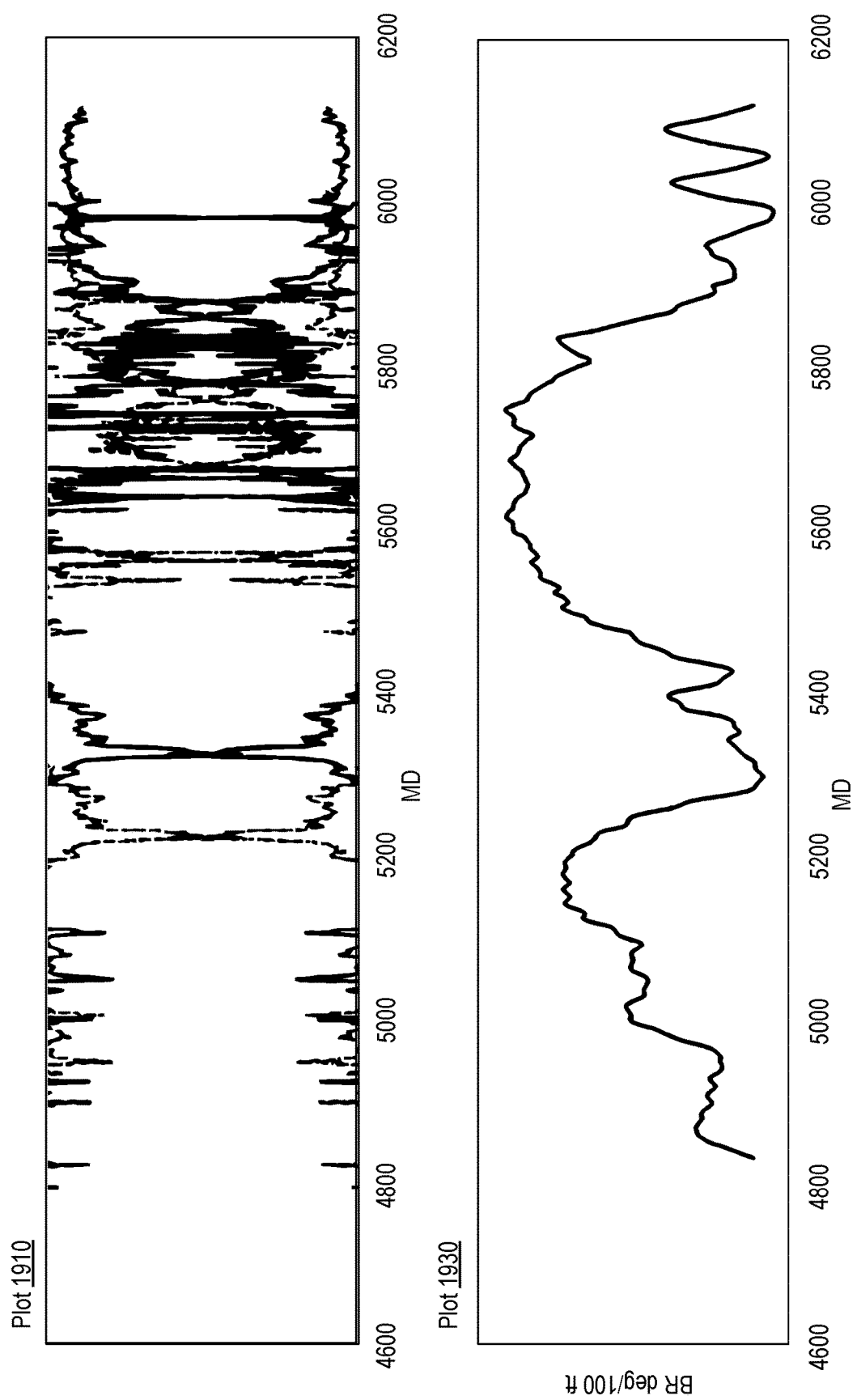
FIG. 19 illustrates examples of plots.

FIG. 19 shows example plots 1910 and 1930 where once the LWD estimates are shifted in MD based on the GR values, it becomes apparent that the drop in the build rate is due to the formation change. Such information is derived as a practical aspect that improves predicting steering performance ahead of a bit and thus allows a predictive controller to optimize steering to achieve given targets in real-time (see, e.g., the system 900 of FIG. 9, the system 1070 of FIG. 10, etc.). Specifically, FIG. 19 shows shifting the data (e.g., limestone layer, shale and v/v from the drilling bit optimization framework data) for the GR feature.

Figure 20:
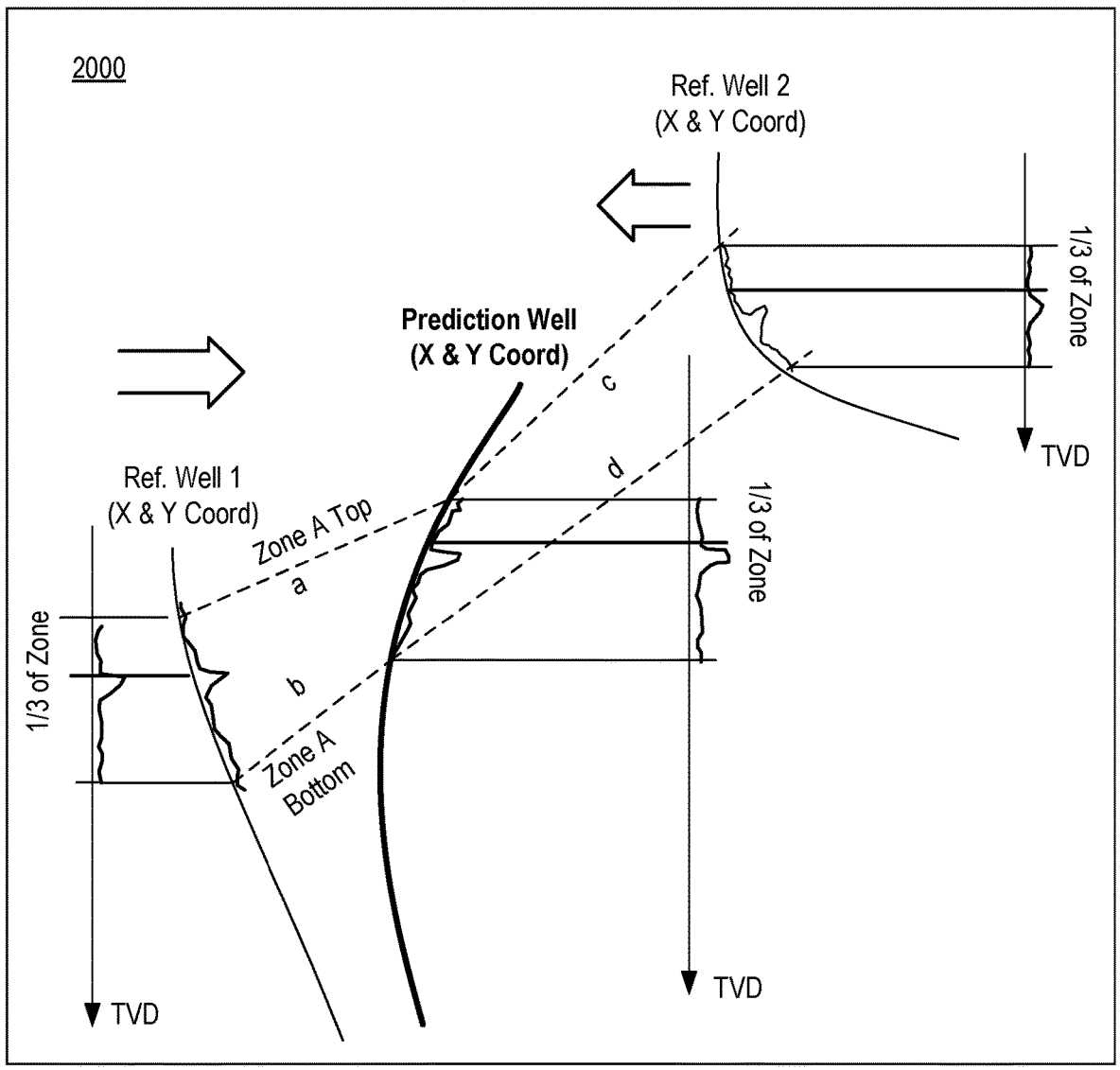
FIG. 20 illustrates an example of a graphic of a technique.

A method referred to as "well predict" can use a drilling bit optimization framework (e.g., DBOS framework, Schlumberger Limited, Houston, Texas), as shown in a graphic 2000 of FIG. 20, however, "well predict" does not involve automated predictive trajectory control from the RSS. The "well predict" approach uses projections to create a log on a "Prediction Well" in a manner that relies on accurate location coordinates and formation tops (see "zone A top" and "zone A bottom"). In FIG. 20, a plot of a reference well (Well 1) with X and Y coordinates, a plot of another reference well (Well 2) with X and Y coordinates, and a plot of a "Prediction Well" with X and Y coordinates are shown where logs are projected from the reference wells to the "Prediction Well". The logs are also shown in FIG. 20 with respect to total vertical depth (TVD) for each of the reference wells and the "Prediction Well".

Figure 22:
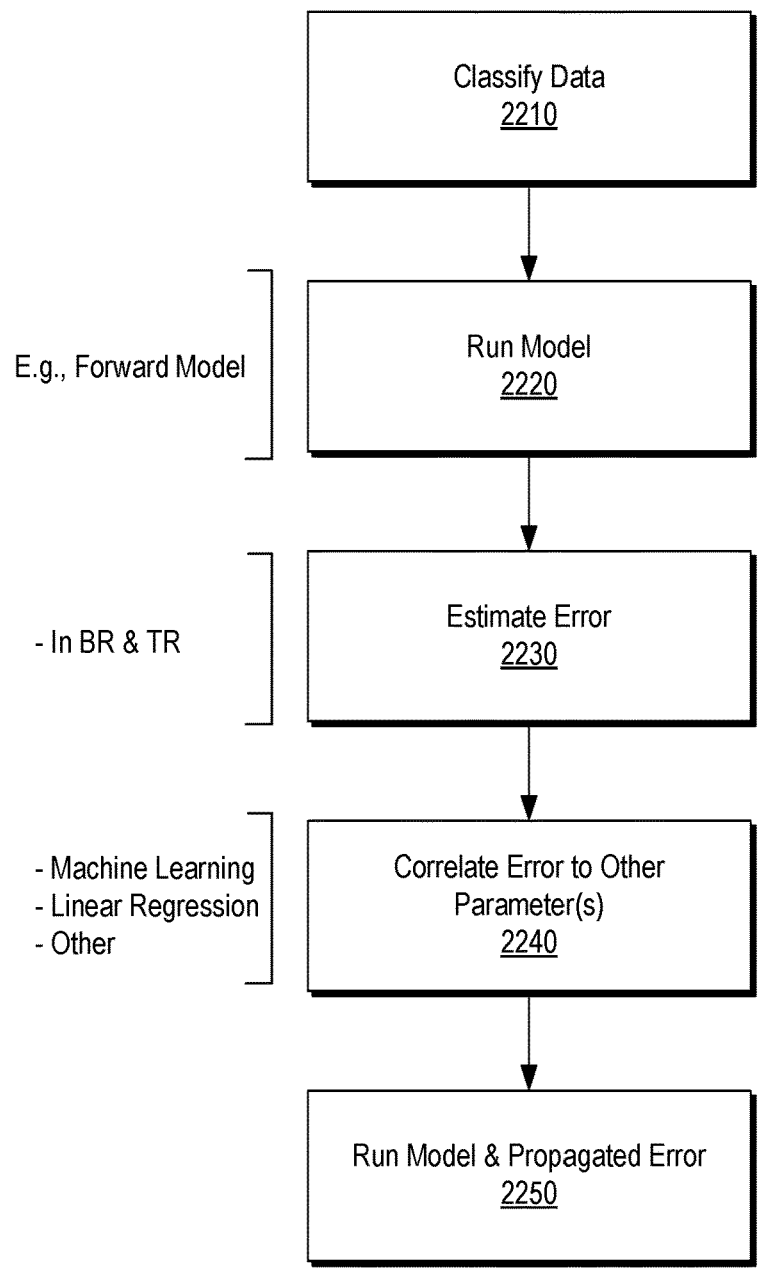
FIG. 22 illustrates an example of a method.
Figure 25:
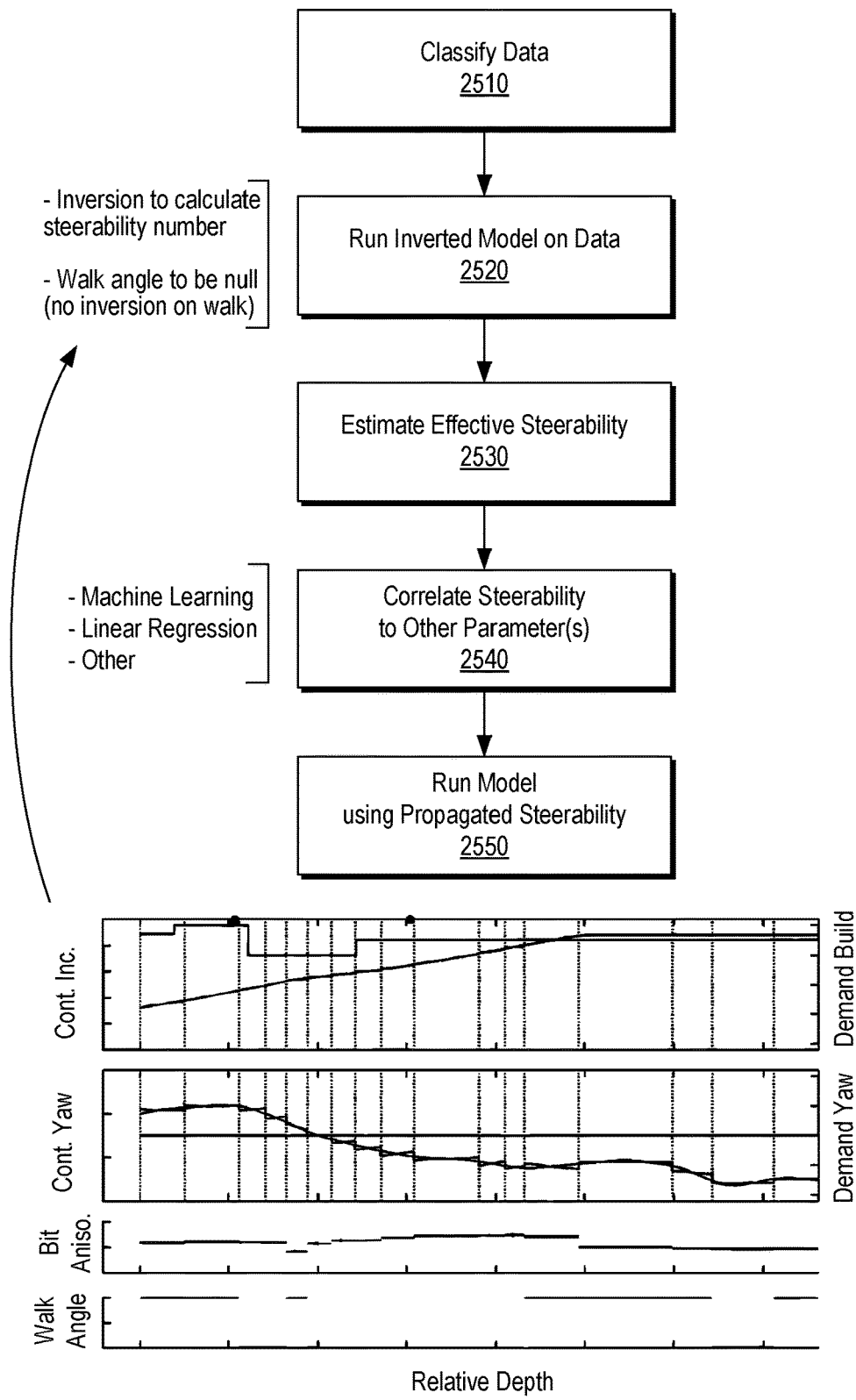
FIG. 25 illustrates an example of a method.

As mentioned, FIGS. 22 and 25 show the example methods 2200 and 2500, which are described in more detail further below. Such methods can use modeling and offset data learning to improve steering performance predictions and hence enable well construction planning and automation.

Figure 21:
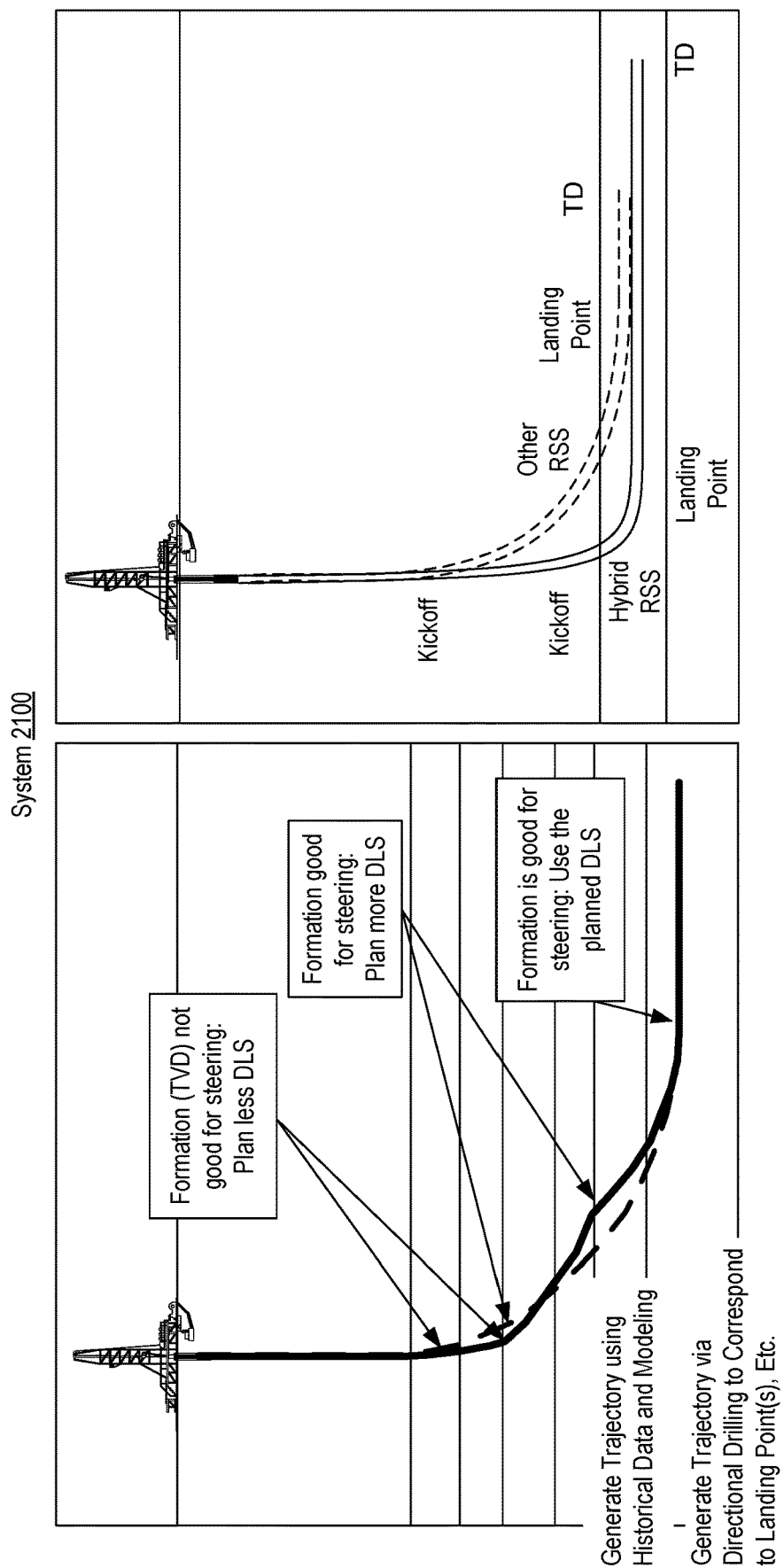
FIG. 21 illustrates an example of a system.

FIG. 21 shows an example of a system 2100 that includes a rig on a surface of the Earth where the Earth includes various formations, which can be represented as layers. While the layers are shown as being substantially horizontal and parallel to the surface of the Earth, one or more of such layers can be dipping (e.g., at an angle that is not parallel to the surface of the Earth, etc.). FIG. 21 shows various aspects associated with drilling into the formations, including a region for a formation that is determined to be not optimal for steering, which can instruct a control system to utilize less DLS or where a planner can recognize where expected DLS cannot be obtained despite attempting to achieve maximum DLS (e.g., less than what may be capable of a tool, a BHA, etc.); a region for a formation that is determined to be adequate or optimal for steering, which can instruct a control system to utilize more DLS than the prior region; and a region for a formation that is determined to be adequate or optimal for steering, which may be according to a plan and thereby utilize a planned DLS (e.g., an instruction for a controller to follow a digital well plan, etc.).

The system 2100 of FIG. 21 can include a hybrid rotary steerable system (e.g., POWERDRIVE ARCHER system), a push the bit rotary steerable system (e.g., POWERDRIVE X6 system), etc. As an example, the system 2100 can include a RSS and one or more RSSs may be utilized. FIG. 21 shows a few terms with respect to a trajectory, which include kickoff point, landing point, and total depth (TD). As shown, the hybrid rotary steerable system may be able to have a deeper kickoff point, which can make its landing point closer to the rig, which may provide for greater reservoir contact in that a greater portion of the borehole is formed from a reservoir such that fluid in the reservoir can flow to the borehole over a greater area of the borehole (e.g., area with respect to length, etc.).

A landing point of a trajectory of a borehole can be a heel. Such a point can be the point in a horizontal well trajectory where the inclination reaches approximately 90 degrees. As an example, an intermediate casing may be set at this point to isolate a pay zone. Landing can be a process of increasing the TVD and inclination until a trajectory reaches horizontal or near-horizontal position in a desired reservoir formation. A soft landing is a landing where a specific inclination (e.g., 80 to 85 degrees) is maintained until a formation top is confirmed, and the trajectory is turned to horizontal after that reservoir top is confirmed. As mentioned, the landing point may coincide with the heel (e.g., the point where inclination reached approximately 90 degrees, which may be referred to as horizontal).

As to a "toe", it can be at a total depth of a well, particularly a horizontal well. As an example, a toe-up profile can be achieved when the inclination is more than 90 degrees throughout a horizontal section (e.g., the well rises, "builds"), a toe-down profile can be achieved when the inclination angle is below 90 degrees in a horizontal section (e.g., the well points down, "drops", and the toe is located at a lower TVD than the heel).

Turn rate (TR) has been mentioned, which can correspond to, for example, the aforementioned walk rate (WR). TR and WR can be defined as an azimuth angle difference between two consecutive survey points, extrapolated to 30 m meters (or 100 feet); measured in a horizontal plane. As to build rate (BR), it can be defined as an inclination angle difference between two consecutive survey points, extrapolated to 30 m meters (or 100 feet); measured in a vertical plane (e.g., consider build rates in a build section of a horizontal well that may be in a range from about 6 degrees to about 8 degrees per 30 m). DLS can be defined as a combination of build rate (BR) and turn rate (TR). DLS can be a normalized measure of curvature (bend and turn) at a certain point. As may be appreciated, higher dogleg severity can pose difficulty in tripping and running casing or liner.

As an example, a process known as sliding may be implemented where drilling occurs without rotating the entire drillstring (e.g., by way of the rotary table or top-drive); rather, rotation of the bit occurs below a bend, as may be achieved by a mud driven downhole motor, etc.

The term "kicking off" can be used to define an operational process where a well path is diverted, for example, from one general direction to another, different general direction. As to the term "walk", it can refer to a bit walk tendency, bit walk rate, and amount of walk force created under the given operation conditions. As an example, a bit as a whole may walk left or right, which may depend on type of bit. As an example, consider a walk angle of about −8.5 degrees, a walk rate of about −1.49 degrees per 100 ft (or per 30 m), and a walk force.

In the example of FIG. 21, the system 2100 can include equipment at the surface of the Earth or elsewhere that may not be in the hole and/or equipment that is in the hole (e.g., downhole equipment). As an example, a trajectory may be generated using historical data and modeling. As an example, a trajectory may be generated via directional drilling in the Earth in a manner that is controlled to correspond to one or more landing points, etc.

As an example, a method can combine offset data to predict steering system performance in term of dogleg capabilities and/or rate of penetration (ROP).

Prediction of behavior of steering systems tends to be physical model-based, for example, used where BHAs, well and drilling parameters are input and performances in term of inclination and azimuth are input. Whether these models are dynamic or static they generally use elastic beam equations combined with a bit model. They generally model the interaction of the beam with a wellbore. However some of the most germane physics that can affect steering performances like hydraulics, or pad reaming formations are generally not well captured or missing. As an example, one or more methods can account for the aforementioned missing physics.

FIG. 22 shows the example method 2200, which may be referred to as an error propagation workflow. As shown, the method 2200 includes a classification block 2210 for classifying data, a run block 2220 for running a model, an estimation block 2230 for estimating error, a correlation block 2240 for correlating error to one or more other parameters and a run model and propagate error block 2250 for running a model with propagated error. As shown in FIG. 22, the run block 2220 can include use of a forward model (e.g., consider a forward BHA static model), a variable steerability pre-calculated model from a forward model dynamic simulation, a model to compute effective steering actuator force as a function of RPM and flow, and/or one or more other suitable models.

As to an error propagation workflow, such a workflow can include running a physical model using offset drilling parameters (e.g., WOB, ROP, RP, FLOW, etc.) to predict inclination and azimuth for an entire section (e.g., tens of meters or hundreds of feet). In such an example, the results of the model (e.g., build rate and turn rate) can be compared to actual data from the offset and the difference can be referred to as the error (see, e.g., the block 2230). As an example, a machine learning process can be performed to try and explain the error with respect to other data (e.g., the rest of the data). As an example, with reference to the block 2240, a machine learning process may utilize one or more linear or nonlinear models and its goal is to come up with a numerical model, such as, for example:

error=f(WOB, ROP, RPM, FLOW, GR, etc.)

The foregoing numerical model can be a correlation of error to various parameters. As shown, the parameters include drilling parameters and can include log parameters (e.g., measurement parameters, etc.).

In such an approach, a method can now to predict a next well model as well as a machine learning error model where both are run in which a sum may be utilized to make a new prediction (see, e.g., block 2250). While a sum is mentioned, one or more other approaches to use of such models may be taken to arrive at a new prediction. And, while error is mentioned, more generally, a residual may be determined where error may be a type of residual.

FIG. 23 shows various data structures 2310, 2330 and 2350, which include channels, sources, RT/RM and time/depth fields. As shown, the data structure 2310 corresponds to a level (e.g., L1 or minimum), the data structure 2330 corresponds to another level (e.g., L2 or refinement), and the data structure 2350 corresponds to yet another level (e.g., L3 or further refinement). As indicated, various dynamic channels and static information may be provided in one or more data structures.

As to the data structure 2350, it includes various examples of data such as caliper data (e.g., 1D, 2D, 3D, etc.), density data, sonic data and image data. Such data may be acquired using one or more downhole tools, which may do so in real-time. As an example, caliper data can provide for size and/or shape of a borehole with respect to depth. Such data may provide indications of various borehole conditions, which may correspond to types of formations, formation characteristics, etc. Such data may be utilized for purposes of DLS analyses, which may include characterizing drilling operations for one or more DLSs.

As an example, a method can include selecting a level for a particular region of a borehole, for example, along a trajectory. In such an example, L1 may be selected for a substantially vertical portion of a trajectory while a higher level (e.g., L2 and/or L3) may be selected for a dogleg and/or according to a DLS (e.g., higher DLS, higher level). As an example, ROP may be less at a higher DLS, which may provide for acquisition (e.g., uplink, etc.) of one or more types of LWD data. Thus, ROP may be utilized to select a level where, for example, as ROP decreases to achieve a desired DLS, a level may be increased to acquire and/or utilize particular data.

Figure 24:
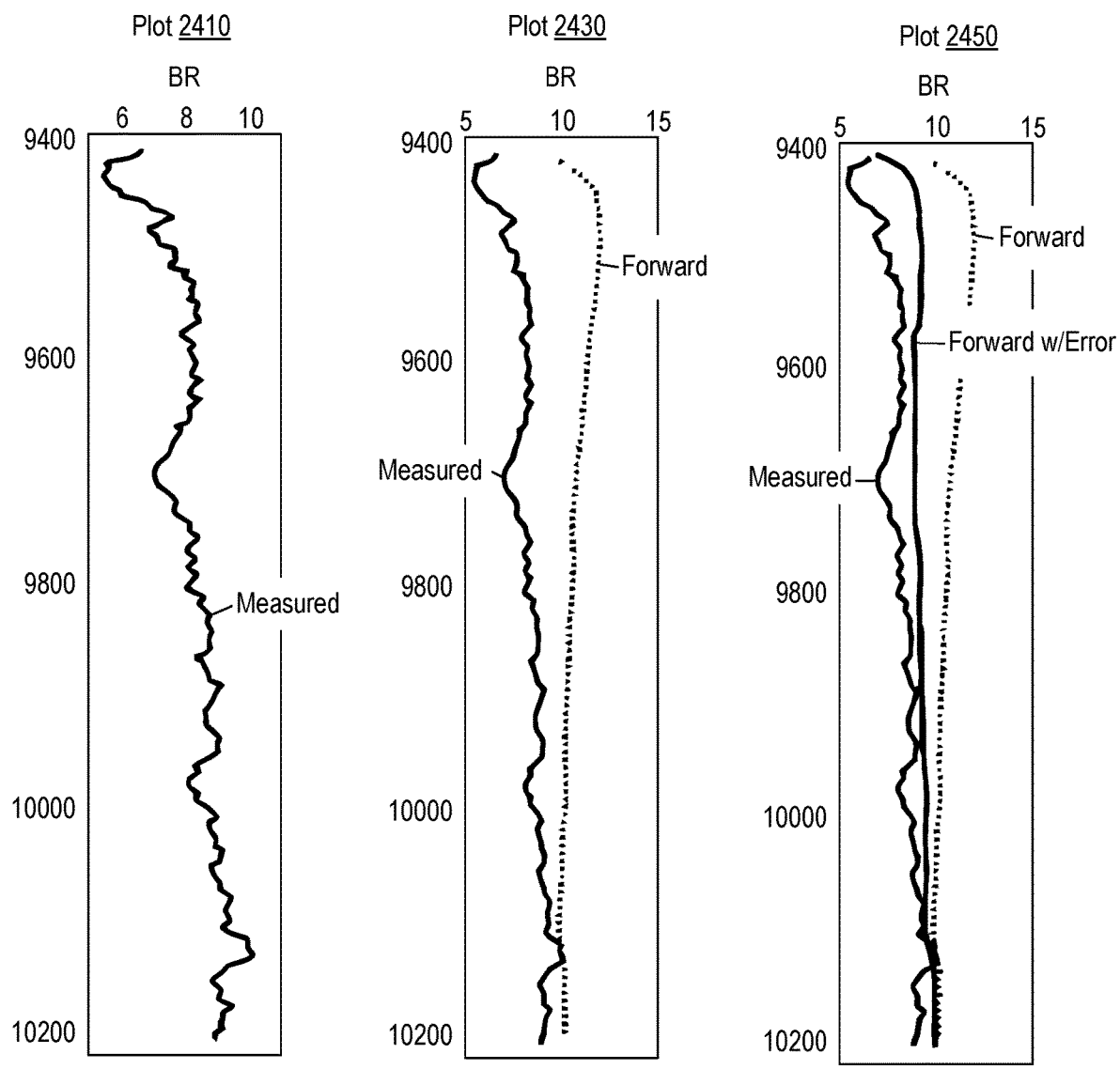
FIG. 24 illustrates examples of plots.

FIG. 24 shows various example plots 2410, 2430 and 2450 where measured information as to BR is plotted with respect to depth along with forward modeling values and forward modeling with model values. As shown in the plot 2430, error can be determined between the measured (actual data) and the forward modeling values for BR. As mentioned, a machine learning process can be performed to try and explain the error with respect to other data (see correlation function above as to error and various parameters). As shown in the plot 2450, the forward modeling with model values (e.g., that account for error) exhibit less error and are a more accurate representation of actual measured BR values. The data in FIG. 24 show how error can be utilized to fill in for the missing physics from one or more physics models to improve the one or more models.

As shown in the example plot 2450, a forward modeling approach can account for error where error can pertain to differences between actual and a physics-based model, for example, as shown in the example plot 2430. As an example, a method can include training a machine learning model using measurements (e.g., actual data) and forward modeling results from a physics-based model. In such an approach, the machine learning model can capture differences that may represent "uncaptured" physics of the physics-based model. As an example, a trained machine learning model may be utilized for outputting values for making adjustments to values of forward modeling of a physics-based model. For example, if a value of a physics-based model is 15, a trained machine learning model may output a value of 4 where an adjustment may be to subtract the value of 4 from the value of 15 to arrive at a value of 11. As an example, a trained machine learning model may be configured to output a value directly and/or indirectly. As an example, a trained machine learning model may be a correlation-based predictor that can predict an error-based adjustment for a physics-based forward model.

FIG. 25 shows the example method 2500, which may be referred to as a steerability propagation workflow. As shown, the method 2500 includes a classification block 2510 for classifying data, a run block 2520 for running an inverted model on data, an estimation block 2530 for estimating effective steerability, a correlation block 2540 for correlating steerability to one or more other parameters, and a run and propagation block 2550 for running a model using propagated steerability.

As to the method 2500, it can run an inversion model by trying to fit the steering performances outputs of the steering model to measurements. For example, such a process can be performed by looking for a steerability index log. Such a process can be performed for a portion of a trajectory, portions of a trajectory, an entire trajectory, etc.

After running the inversion model, the method 2500 can implement a machine learning process that can be applied to the steerability number (e.g., index log) where, afterwards, the steerability can be propagated to other conditions and, afterwards, the model can be run using the propagated steerability.

As an example, one or more of the data structures of FIG. 23 may be utilized for the method 2200 of FIG. 22 and/or the method 2500 of FIG. 25. In the example of FIG. 25, various data are shown versus relative depth, which include inclination, yaw, demand build, demand yaw, bit anisotropy, and walk angle. As to the block 2520, inversion may be utilized to calculate a steerability number. As an example, a method can include nulling walk angle such that inversion on walk does not occur.

As an example, once predictive steering is applied to an offset well, a method can include linking to a planner and use the recommendation to propose drilling and steering plans.

Figure 26:
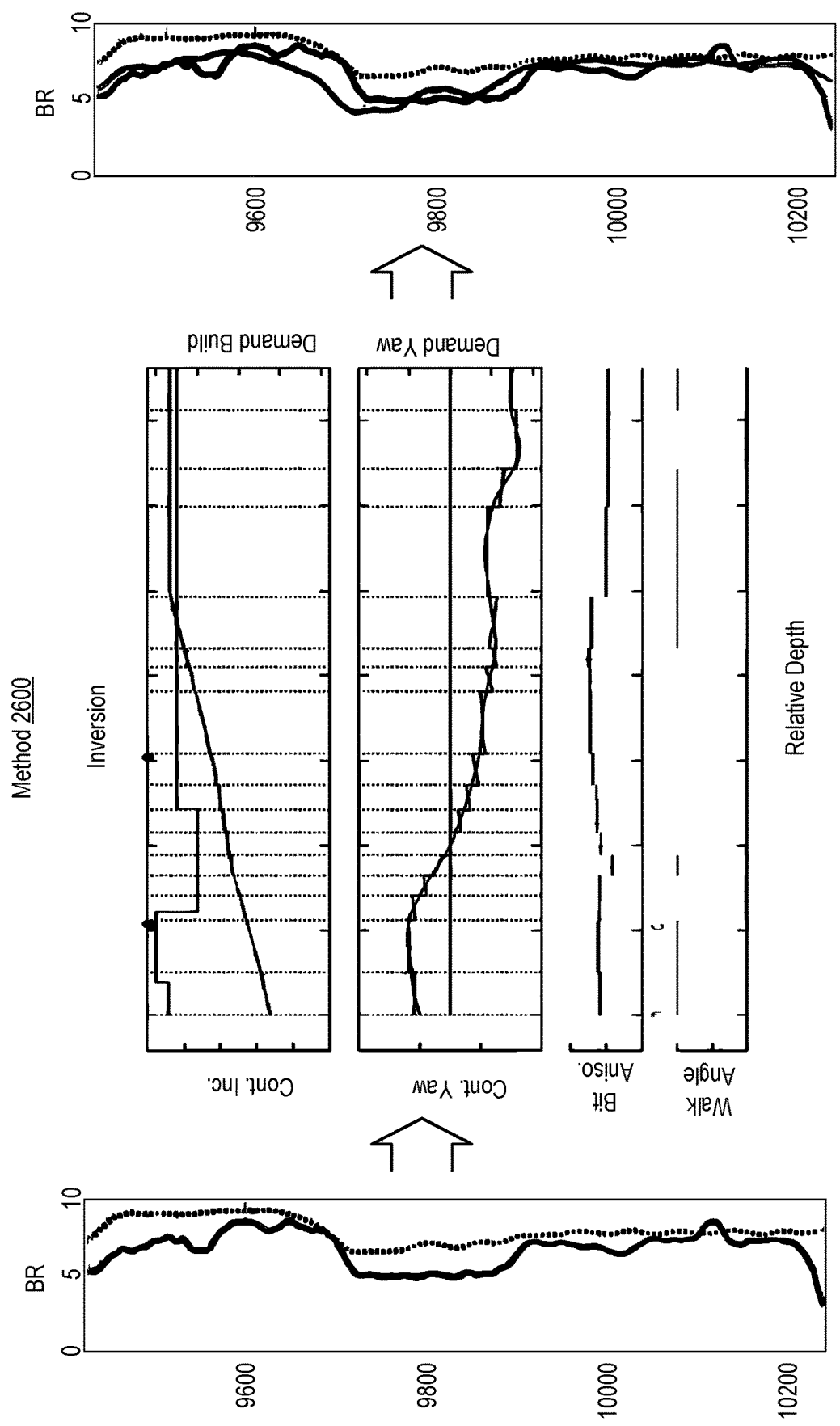
FIG. 26 illustrates an example of a method.

FIG. 26 shows an example of a method 2600 that includes utilizing an inversion framework to increase accuracy of BR with respect to actual BR. Such a method may be utilized for controlling one or more drilling processes, optionally in real time.

Figure 27:
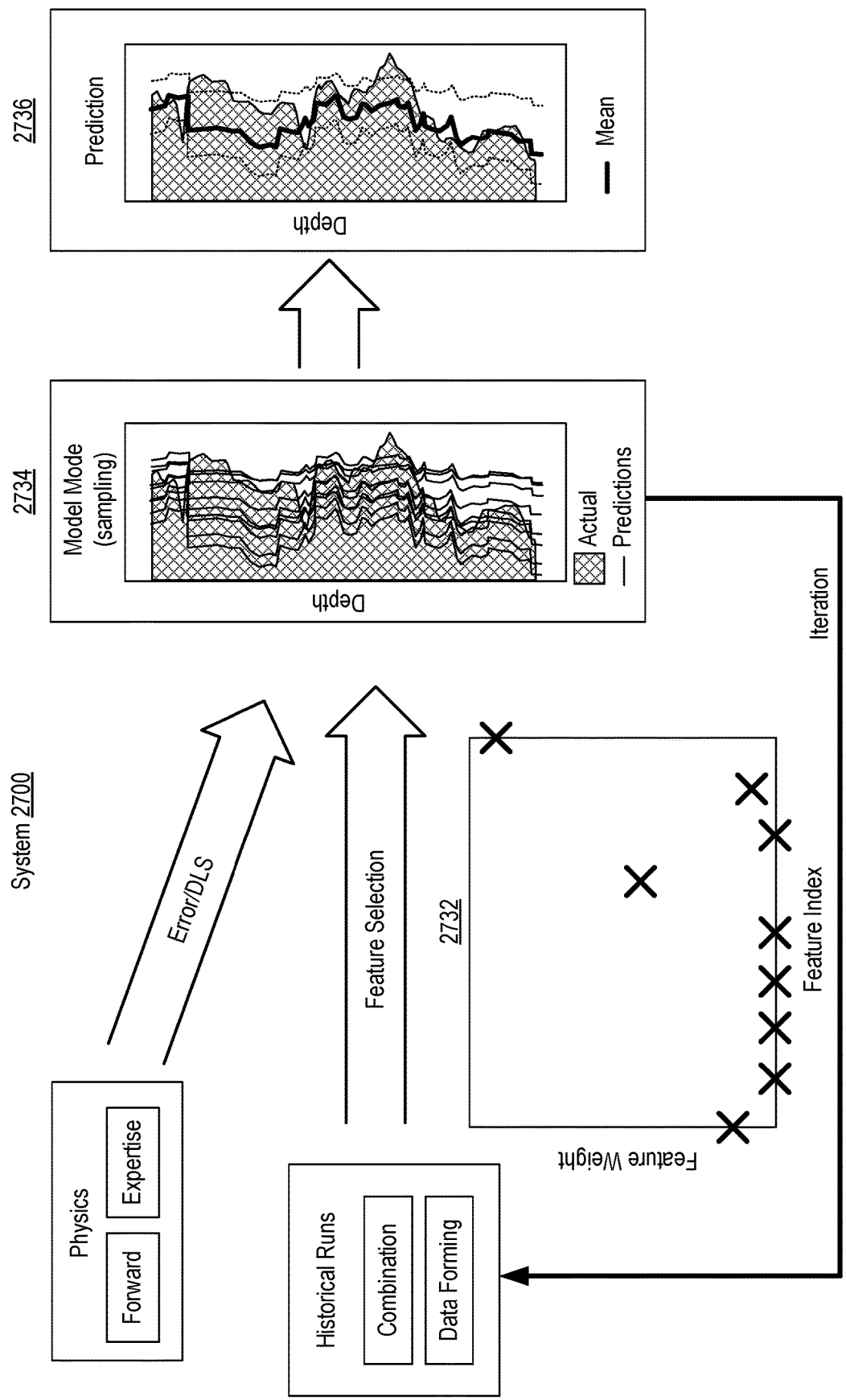
FIG. 27 illustrates an example of a system.

FIG. 27 shows an example of a system 2700 and a workflow where errors and DLS are provided with respect to physics and where data from historical runs are provided (e.g., offset wells, etc.). FIG. 27 includes various example plots, including a feature space plot 2732, a model mode plot 2734 and a prediction plot 2736. The plot 2732 shows various values for feature weights for various feature index members (e.g., index elements). The plot 2734 shows actual DLS values versus depth along with various predictions versus depth. The plot 2736 shows actual DLS values versus depth along with a mean of predictions and various confidence levels (e.g., confidence bounds) versus depth. In the workflow shown, the predictions of the plot 2734 can be generated at once or in an iterative manner by varying the feature space. As shown, feature space selection can be based at least in part on historical runs, which can include combining data, data forming, etc.

In the example of FIG. 27, as mentioned, iterations can occur for various feature weights, as shown with respect to a feature index for training to generate a trained machine learning model. As to feature indexes, consider, for example, one or more of Bcmd, ResForce, ROP, RPM, FLWI, SWOB, MSE, GR, INC, etc. In the example of FIG. 27, feature weights are non-zero for Bcmd, SWOB, GR and Inclination. FIG. 27 shows true and predicted values for an index with respect to depth as well as a prediction confidence.

In FIG. 27, the plot 2734 is shown for model mode sampling where true and predicted values are shown with respect to depth where the predicted values can vary with respect to depth. As shown the plot 2736, a mean may be calculated using the predicted values along with confidence intervals (e.g., at 95 percent), which may be plotted with respect to depth.

Various trials involved various models. For example, a trial involved a linear model for three wells. Results for field DLS, model DLS and predicted DLS with confidence bounds were generated where regions were identified (e.g., zones) that exhibited disagreement and agreement. The trial demonstrated that the model DLS with respect to the field DLS can be improved via an error analysis approach that involves machine learning. Another trial involved a non-linear NCA model for three wells where results for field DLS, model DLS and predicted DLS with confidence bounds were generated. Yet another trial involved a non-linear Gaussian process (GP) model for three wells where results for field DLS, model DLS and predicted DLS with confidence bounds were generated.

As explained, a method can involve data learning with propagation. The aforementioned models (linear, non-linear NCA and non-linear GP) were utilized in such a method.

Figure 28:
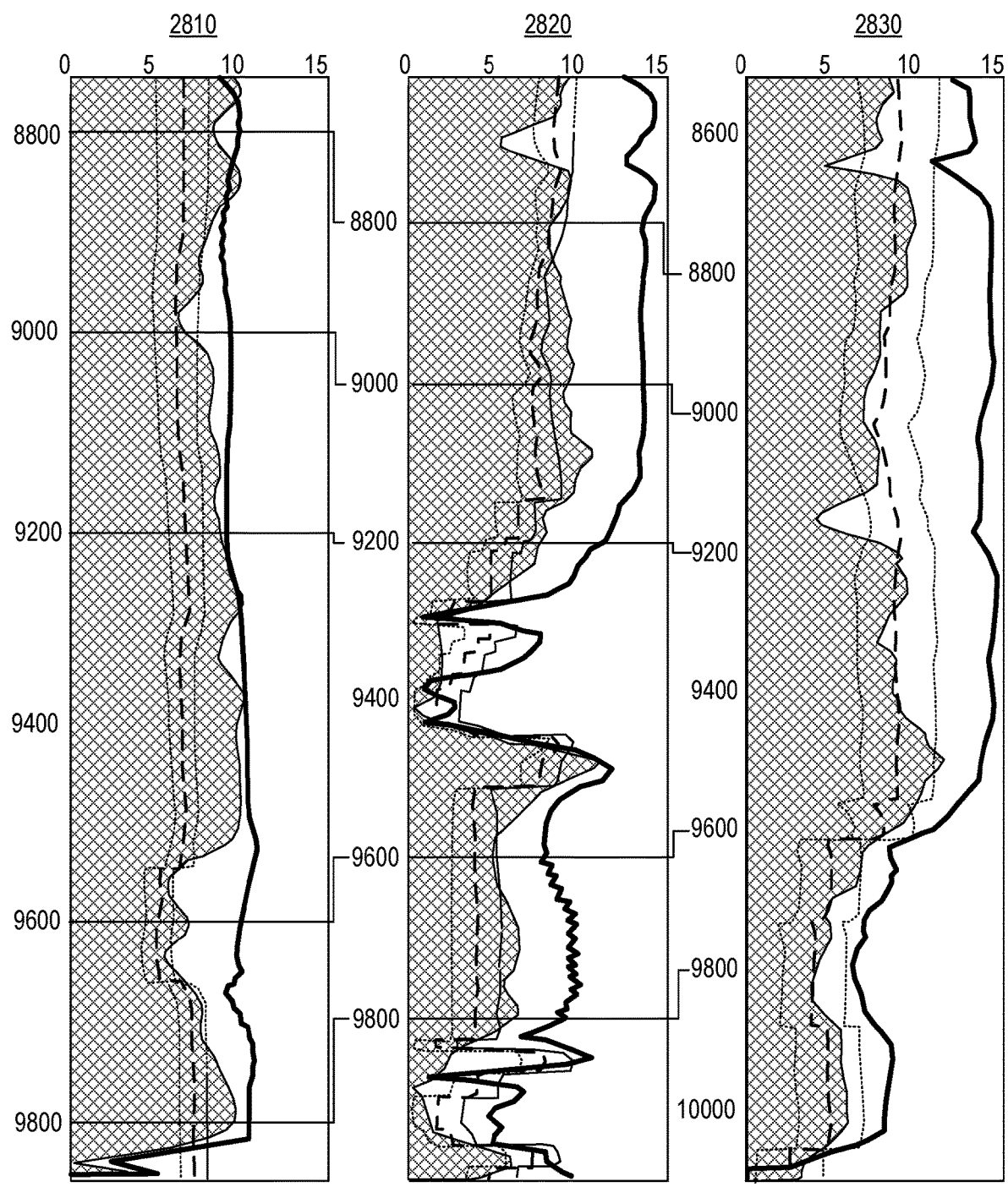
FIG. 28 illustrates examples of plots.

FIG. 28 shows example plots for data learning with propagation for a non-linear GP model 2800 (stochastic) for three wells, specifically for field DLS, model DLS and predicted DLS with confidence bounds.

In FIG. 28, plots 2810, 2820 and 2830 show DLS ranging from 0 to 15 with respect to depth ranging from less than 8600 to greater than 10000 where the scales as to depth are slightly offset. The plots 2810, 2820 and 2830 show how predictions can be improved through error learning and propagation. In particular, the plot 2830 shows a prediction with lower and upper confidence bounds that are closer to the field DLS (actual DLS) than the model DLS. With respect to depth, the actual values tend to be within the lower and upper confidence bounds over the entire depth range, with the exception of two valleys (low DLS values) and one peak (highest DLS value). As shown, the model may capture some aspects that result in deviations seen in the field DLS values. As an example, where a model trend is identified, a notification may be generated such that an operator, a controller, etc., can review and/or act accordingly. In such an example, absent a trend and/or during a trend, an operator and/or a controller may utilize and/or adjust a value that is based on error learning and propagation. For example, consider the depth of approximately 8650 where a model DLS and field DLS decrease and the value based on error learning and propagation remains relatively constant. In such an example, a system may generate a notification as to a model (e.g., physics-based model) trend and may adjust the value based on error learning and propagation according to the trend (e.g., utilizing a factor to increase or decrease it, etc.).

As to a Gaussian process (GP) approach, it can consider a stochastic process (e.g., a collection of random variables indexed by time or space), such that each finite collection of those random variables has a multivariate normal distribution. For example, each finite linear combination of them can be normally distributed. The distribution of a Gaussian process can be a joint distribution of random variables such that it provides a distribution over functions with a continuous domain (e.g., time, space, etc.).

A machine learning algorithm that involves a Gaussian process may utilize a lazy learning technique and a measure of similarity between points (e.g., a kernel function) to predict the value for an unseen point from training data. In such an example, a prediction is not just an estimate for that point, but also can include uncertainty information (e.g., a one-dimensional Gaussian distribution). For multi-output predictions, multivariate Gaussian processes may be used, for which the multivariate Gaussian distribution can be the marginal distribution at each point.

For some kernel functions, matrix algebra can be used to calculate the predictions using a technique such as kriging. When a parameterized kernel is used, an optimization framework may be utilized to fit a Gaussian process model.

As an example, a Gaussian process may be defined by second-order statistics. In such an example, if a Gaussian process is assumed to have mean zero, defining the covariance function completely can define process behavior. As an example, non-negative definiteness of such a function can enable its spectral decomposition, for example, using the Karhunen-Loève expansion. Various aspects that can be defined through the covariance function include stationarity, isotropy, smoothness and periodicity.

As an example, a Gaussian process can involve taking priors on functions where the smoothness of these priors can be induced by the covariance function. As an example, if it is expected that for "near-by" input points x and x' their corresponding output points y and y' are to be "near-by" also, then the assumption of continuity is present. If displacement is desired, then a rougher covariance function may be selected where extreme examples of the behavior can be the Ornstein-Uhlenbeck covariance function and the squared exponential where the former is not differentiable and the latter infinitely differentiable.

For solution of a multi-output prediction problem, consider, as an example, using a Gaussian process regression for vector-valued function where covariance describes correlations between input and output variables taken in points in the particular domain. As an example, one or more Gaussian processes can be utilized for non-linear multivariate interpolation. As an example, Gaussian process regression can be utilized to address learning tasks in both supervised (e.g. probabilistic classification, etc.) and unsupervised (e.g. manifold learning, etc.) learning frameworks.

Figure 29:
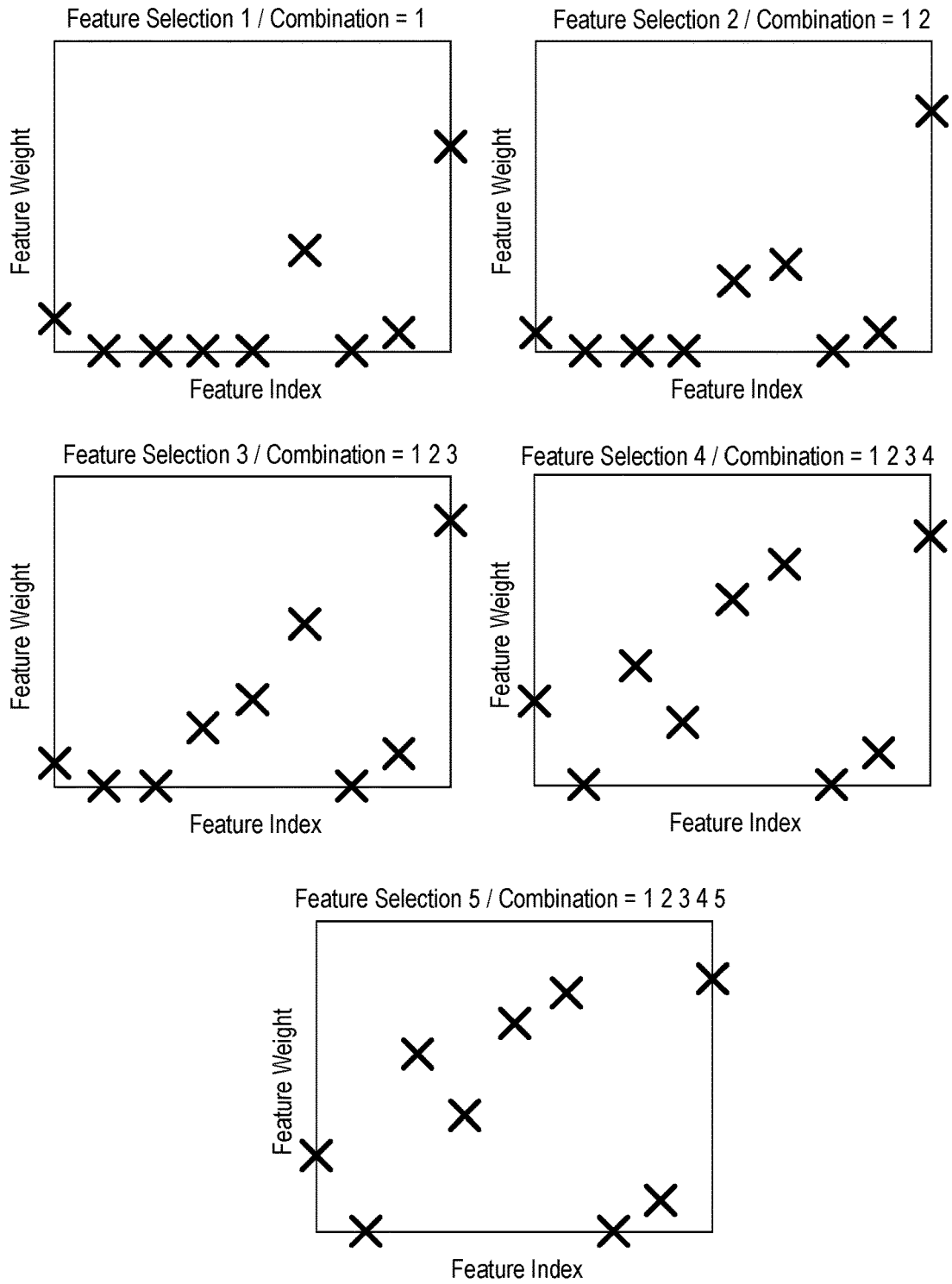
FIG. 29 illustrates examples of plots.

FIG. 29 shows various plots 2900 of feature weights for five different wells for the non-linear GP model approach. The feature weights show how the addition of the wells can alter the feature weights. The combination of wells 1, 2, 3, 4 and 5 corresponds closely to the combination of wells 1, 2, 3 and 4. As such, five wells (e.g., or four wells) may be sufficient. As shown in FIG. 29, the features of the feature index include Bcmd, ResForce, ROP, RPM, FLWI, SWOB, MSE, GRM, and INC.

As an example, where data are acquired during drilling operations for a subject well, such data may be utilized for learning such as further training of a machine learning model. As an example, a method can include model selection, ensemble modeling, etc. As an example, a method can dynamically adjust modeling during drilling operations. For example, consider selecting a particular trained machine model for one section of a borehole and dynamically selecting another trained machine model for another section of the borehole (e.g., along a desired trajectory, etc.).

Referring again to FIG. 29, a model may be selected based on a number of wells (e.g., offset well data) that is sufficient to arrive at a feature space of features and feature weights. In such an example, where the number of wells is low (e.g., less than approximately 5 and greater than or equal to 2), input from a current well may be able to transform the model as appropriate for a current job; whereas, a model that demands a large number of wells may be less amenable to adaptation to a current job.

FIG. 30 shows example outputs 3000, which can include one or more GUIs 3010, 3020 and 3030, for example, as explained with respect to FIG. 11. As shown in FIG. 30, the GUI 3010 may provide guidance to reduce error by one or more actions. In the example GUI 3010, an asterisk indicates as a marker how increasing RPM can help. In such an example, a GUI 3020 may be rendered to further advance a method, a workflow, etc. In FIG. 30, the GUI 3030 shows detailed output as to SR, ROP, RPM, FLW, WOB, GMR, and INC.

FIG. 31 shows example outputs 3100, which can include one or more GUIs 3110, 3120 and 3130. As shown, the GUI 3110 can indicate that to increase DLS, a process may have a maximum SR, reduce ROP to help, increase RPM, reduce the flow to help, etc. In FIG. 31, a process can include selection, such as selection of SR to increase DLS, which can be utilized in drilling control (see also FIG. 11).

Figure 32:
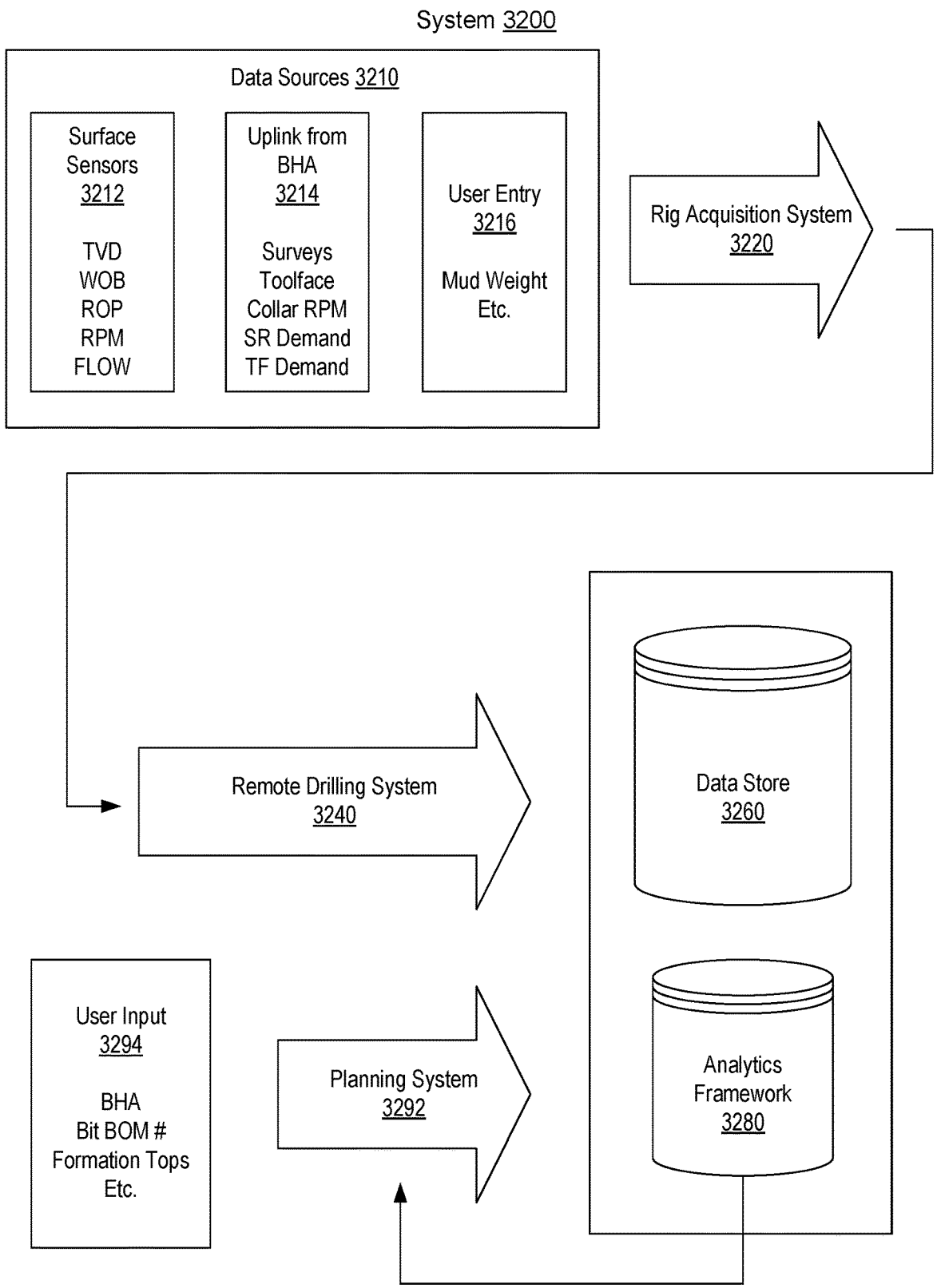
FIG. 32 illustrates an example of a system.

FIG. 32 shows an example of a system 3200 that includes various data sources 3210 such as surface sensors 3212 (e.g., TVD, MD, WOB, ROP, RPM, FLOW, etc.), downhole tool sensors 3214 (e.g., surveys, toolface, collar RPM, SR demand, TF demand, etc.) and user entry 3216 (e.g., mud weight, etc.). Such data sources 3210 can be received by a rig acquisition system (RAS) 3220, which can be operatively coupled to a remote drilling system (RDS) 3240. As shown, the RDS 3240 can be operatively coupled to a data store 3260 and/or an analytics framework 3280. As shown, the analytics framework 3280 may be operatively coupled to a planning system 3292 that can be utilized by a user or users via user input 3294. As shown, the user input 3294 can provide for various types of data (e.g., BHA specifications, Bit BOM #, Formation Tops, etc.).

In the example of FIG. 32, various features of the system 3200 can be utilized for obtaining data for use in creating a machine learning model for prediction, which may be a part of a prediction component, a prediction framework, etc. In the example system 3200, the analytics framework 3280 can be or include features for prediction (e.g., a prediction component, etc.). In one embodiment, a prediction component may use information about a plan for a well under consideration and information about operation of a tool from one or more previous use cases (e.g., offset wells, other section of a current well, etc.). In such an example, data may be provided via the data store 3260, the planning system 3292, etc. As an example, a prediction component may receive information directly and/or indirectly from one or more surface sensors (e.g., values for TVD, WOB, ROP, RPM, and FLOW) and information from a BHA (e.g., surveys, toolface, collar RPM, SR Demand, and TF Demand). In such an approach, data may be from one or more of the data sources 3210.

As an example, data may be channel data from different channels, which can include one or more of those shown in the system 3200 and/or one or more other channels. As shown, the RAS 3220 may collect data and transmit the data to the RDS 3240 for storage in a suitable storage medium as represented by the data store 3260.

In the example of FIG. 32, the RDS 3240 may be a network-attached system that receives and sends data to the RAS 3220. The RDS 3240 may be a system designed to allow users to monitor operations on multiple wells from a single location. The RDS 3240 may receive data in real-time or substantially real-time from the RAS 3220.

In certain embodiments, some data may be received in real-time from the RAS 3220 while other sources of data describing the operations at the rig may come from one or more other sources. For example, the RDS 3240 may receive information about one or more tools and operations from written reports submitted in connection with the operations, digitized written reports, from facilities where tools are taken for repair, servicing, or maintenance, or other sources and locations.

In one embodiment, the data store 3260 may also store information from the planning system 3292. In one embodiment, a drilling engineer may send a well plan for storage in the data store 3260. The well plan may be associated with the data collected by the RAS 3220 during execution of that plan, which can be a digital well plan with various digital data suitable for instructing one or more controllers, etc.

As explained, the system 3200 may accept user input; for example, a user may enter information about a selected BHA being or to be used. For example, a user such as a directional driller may enter the bit BOM number (bit BOM #) as part of submitted BHA information. As shown, such user entry may be performed via the planning system 3292 or via the RAS 3220 or, for example, via a stand-alone application.

In one embodiment, an RSS tool can be used with an appropriate RAS 3220 that can receive one or more channels for use by the analytics framework 3280. As mentioned, a BHA may include an uplink component capable of transmitting information collected by the BHA through one or more appropriate sensors. In one embodiment, the BHA captures MWD/DTC tool frames that include surveys, continuous inclination, continuous azimuth, collar RPM, PD Downlink acknowledge, and other information; noting that DTC can be sonic-while-drilling data (e.g., compressional data, slowness, etc.).

Figure 33:
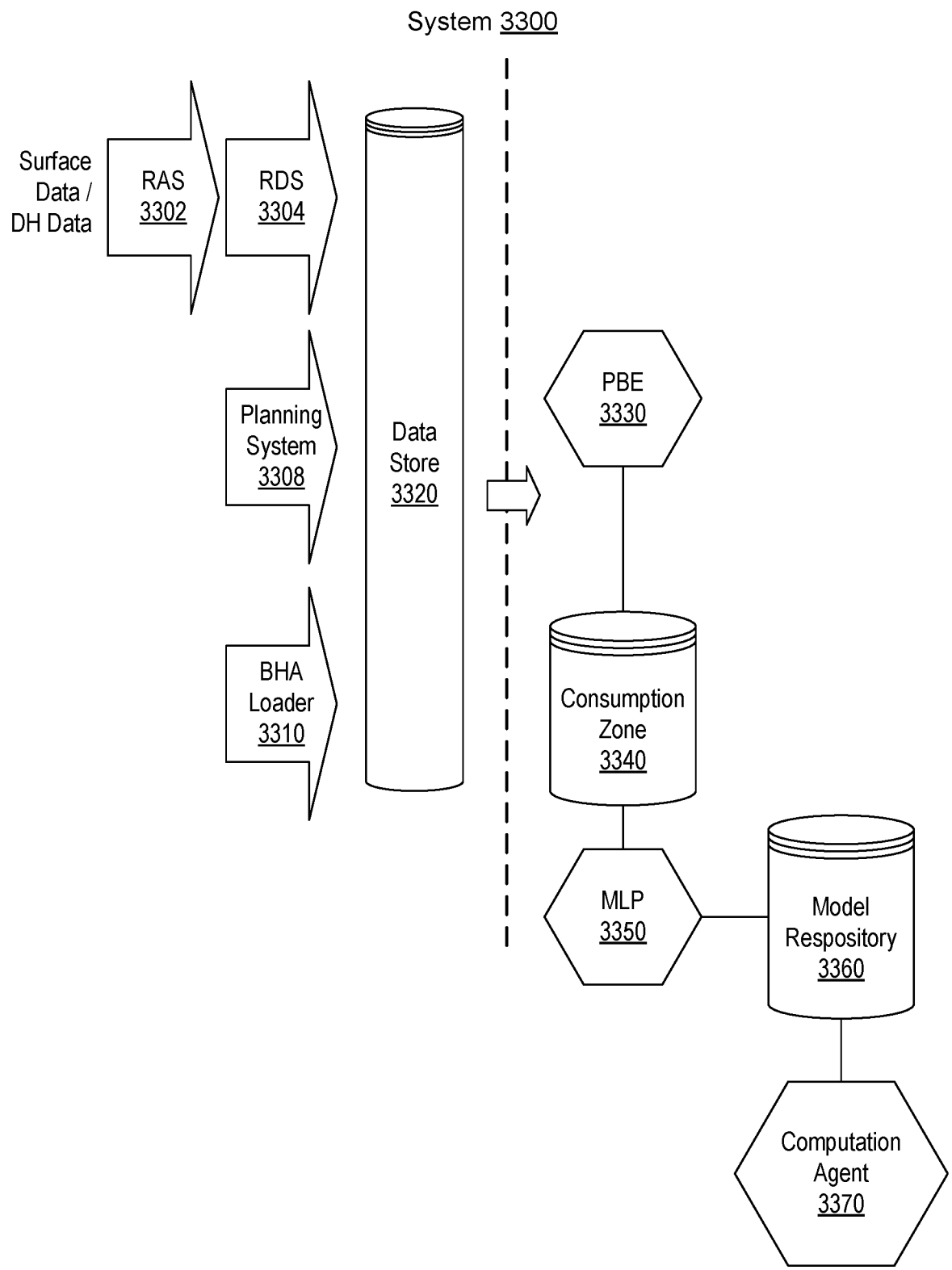
FIG. 33 illustrates an example of a system.

FIG. 33 shows an example of a system 3300 that can be utilized to perform one or more workflows. For example, the system 3300 may be utilized for generating one or more predictions about the behavior of a tool. In the example shown in FIG. 33, surface data and downhole (DH) data are gathered and sent from a RAS 3302 and RDS 3304 to a data store 3320. The data store 3320 may further receive information concerning a planned well, such as a digital drilling plan (DDP), from a planning system 3308 and/or one or more other sources. The data store 3320 may also receive information about the BHA in use during execution via a BHA loader 3310 and/or another application.

The data store 3320 may have one or more data pipelines (see, e.g., dashed line) that operate on the data in the data store 3320 and prepare it for one or more uses. The data pipelines, for example, may unify data from various sources and identify one or more complete data sets.

A physics-based engine (PBE) 3330 may receive data and run a physics-based simulation using the data. In one embodiment, the PBE 3330 may include various features of the IDEAS simulation framework (Schlumberger Limited, Houston, Texas). As an example, the PBE 3330 may receive drilling parameters used in connection with a tool and generate a prediction about the tool performance. In one embodiment, the PBE 3330 uses the parameters to generate a DLS prediction for the tool.

As shown in FIG. 33, the system 3300 can include a consumption zone 3340, which may be created to store drilling parameters from the data store 3320, the actual behavior of the tool, and the predicted behavior generated by the PBE 3330. For example, the consumption zone 3340 may include the drilling parameters used by the PBE 3330, the actual DLS as represented by data collected by the RAS 3302, and the DLS predicted by the PBE 3330. Other information, such as information about the formation being drilled, may also be used.

As shown in FIG. 33, the system 3300 can include a machine learning platform (MLP) 3350, which may be used to analyze the data stored in the consumption zone 3340. The MLP 3350 may include features to allow data scientists to analyze and create machine learning models from data in the consumption zone 3340, the data store 3320, and/or one or more other locations.

In one embodiment, the MLP 3350 may be used to create a machine learning model that is trained on differences between the actual behavior of the tool and the behavior of the tool as predicted by the PBE 3330. For example, the machine learning model may be trained on the difference between the actual, achieved DLS and the DLS as predicted by the PBE 3330.

Various types of machine learning models and approaches may be used to create models and predict the behavior of a tool. In one embodiment, the machine learning model can be trained to predict the amount of error associated with the predictions made by the PBE 3330. In another embodiment, the machine learning model can be trained to predict the behavior of a tool. The predictions of the PBE 3330 and the predictions of the machine learning model (e.g., the MLP 3350) can be combined or presented separately (e.g., via one or more GUIs, etc.). In one or more other embodiments, a variety of machine learning approaches can be used and combined as an ensemble learning structure.

The trained model from the MLP 3350 may be published to a model repository 3360 for use by one or more computation agents 3370. The model may be used in planning future wells, during drilling, during drilling of one or more additional wells, etc. For example, in one embodiment, the computation agent 3370 can use the input parameters entered by a drilling engineer in the planning system 3308 and uses one or more parameters to run a simulation using the PBE 3330. The computation agent 3370 may then adjust the results of the prediction using the trained model (e.g., of the MLP 3350) and present a final result to the drilling engineer. For example, a final result may be rendered via a GUI to a display of a display device (e.g., a mobile device, a laptop, a desktop, a workstation, etc.).

FIG. 34 shows an example of a GUI 3400 that includes various types of information as to full steering tendency. As shown, the GUI 3400 indicates that the BHA DLS capability is less than a trajectory DLS requirement in a run. Further, the GUI 3400 provides one or more suggested control actions, which may aim to achieve a desired DLS. For example, if a motor is being utilized, a suggested control action can be to increase a bend setting. One or more other control actions may be to adjust a stabilizer position, adjust a WOB and RPM, etc.

In the example GUI 3400, data may be rendered as to steering, toolface, trajectory depth, mode of calculation (e.g., model of a model repository such as the model repository 3360 of FIG. 33). The GUI 3400 can include one more graphical controls such as, for example, a graphical control for viewing a chart as to tendency.

Figure 35:
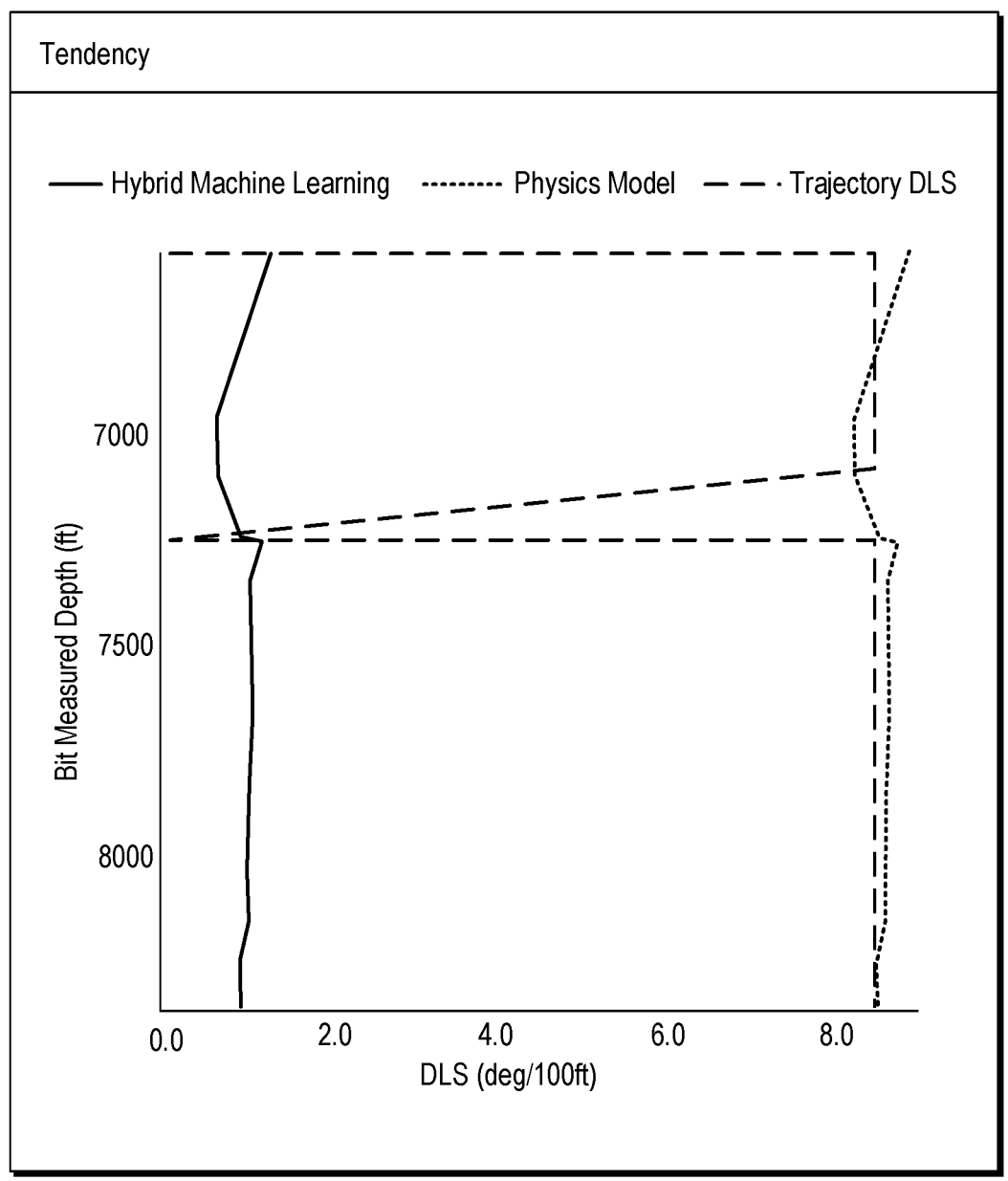
FIG. 35 illustrates an example of a graphical user interface.

FIG. 35 shows an example of a GUI 3500 where a chart of bit measured depth versus DLS is rendered for a depth range of approximately 2000 feet where DLS may be within a range of approximately 0 to 8 or more, which may be a range that is greater than that achievable by a particular BHA. As shown, the chart includes hybrid machine learning model data, physics-based model data and a trajectory DLS.

In one embodiment, a prediction component may receive planned parameters and BHA information and compute a predicted dog leg severity (DLS) and display a result to one or more users. As mentioned, such a result may be in the form of a GUI such as the GUI 3400, which shows one embodiment of a display component that indicates full steering tendency. In the GUI 3400, if the planned well trajectory DLS is lower than the predicted tool DLS, a check mark may be displayed. However, as shown in the GUI 3400, where the planned well trajectory DLS is higher than the predicted tool DLS, the prediction component may issue a warning such that the GUI 3400 renders an "X" and message "the BHA DLS capability is less than the trajectory DLS requirement in the run."

As explained, a user may, via a GUI graphical control, select additional or different information for rendering. As shown FIGS. 34 and 35, in one embodiment, a user may select the "view chart" link of the GUI 3400 to cause display of the GUI 3500.

In the example of FIG. 35, the GUI 3500 includes three types of data versus depth, which include: (1) trajectory DLS values as the DLS of the planned well trajectory; (2) physics model values as the predicted DLS for the tool as calculated by a physics-based simulation component such as the IDEAS framework; and (3) hybrid machine learning values as the predicted DLS as calculated by a hybrid machine learning-physics based model.

Machine learning approaches can be used to predict the performance of tools in a given environment. In one embodiment, machine learning is used to predict the performance of drilling tools and their performance in a particular region. The approach may account for the geological formations that will be drilled and aspects of the well plan, such as the planned trajectory. In certain embodiments, the machine learning workflow is used to adjust a physics-based model of tool performance. The combined machine learning and physics-based modeling may be used to provide information to planners or drillers about the expected behavior of the tool downhole.

As explained, during a well construction process, choosing an appropriate tool for a particular job can be challenging. For example, in directional wells, a well plan may call for a particular trajectory. Knowing in advance whether a particular tool, BHA, etc., can achieve that trajectory can be difficult, particularly when tools are being operated at or near their limits. Service providers and operators want to reduce occurrences of unable to follow trajectory (UTFT) events.

As explained, a system can improve tool performance prediction. In one embodiment, a system can improve steering prediction accuracy of a rotary steerable system (RSS). In one embodiment, a machine learning workflow can be utilized to provide for calibration of a physics-based simulation in order to increase the accuracy and usefulness of predictions for tool performance. Such modeling may be used to provide insights to planners who are planning a well, may be used in real-time (or substantially real-time) to provide insights and information to teams who are involved in executing a plan and drilling a well, etc.

In one embodiment, machine learning and physics-based modeling can be used to predict the behavior of a directional system such as, for example, a rotary steerable system (RSS). Such an approach may be utilized, for example, for one or more other directional drilling systems such as, for example, a motor-based system. For example, consider an approach that can predict behavior of a mud-motor assembly. In such an example, decision making as to operational modes may be made based at least in part on predicted behavior (e.g., predicted capabilities during actual performance, etc.). As an example, operational modes of a mud-motor assembly can include a rotary mode and a sliding mode. As an example, operation of a RSS can be based at least in part on predicted behavior of an RSS system (e.g., predicted capabilities during actual performance, etc.).

As an example, data for a mud-motor may be referenced with respect to stands, sections of drill pipe, etc. As an example, mud-motor control can include making one or more changes between modes on a stand-by-stand basis and/or during drilling of a stand. As to the latter, mode changes may be limited to a maximum number for one or more reasons such as, for example, time to change modes, which may contribute to non-productive time (NPT). As an example, control as to mud-motor modes can involve changing from rotating at surface to not rotating at surface and vice versa (e.g., with appropriate control of mud flow, etc.). In mud-motor-based drilling, various types of data may be acquired, for example, at the end of drilling a stand where time may be available for analysis while adding a new stand.

As an example, an RSS approach to changes in operation can include one or more downlink transmissions where each of the downlink transmissions provides one or more instructions to the RSS for purposes of making one or more changes in operation. As an example, a downlink transmission can transmit a data structure that includes one or more instructions for immediate implementation by an RSS, delayed implementation by an RSS (e.g., triggered by depth, by time, by sensor measurement value, etc.), etc. As an example, an RSS control scheme can include maintaining parameter settings of an RSS during drilling of a stand or, for example, changing one or more parameters settings of an RSS during drilling of a stand. As to the latter, depending on downlink technology, a delay may be experienced where the delay may be greater than that for control of surface rotation as surface rotation changes may be relatively rapidly effectuated as a rotary table or top drive is at the surface and operatively coupled to a surface controller such that transmission of control instructions is rapid (e.g., can be nearly instantaneous).

As to an RSS, downlink transmissions may be made with reference to drilling such as, for example, distance drilled. As an example, consider a scenario where RSS drilling is at a ROP of approximately 100 ft/h and where a time interval between two successive downlink transmissions is approximately 30 minutes, which can correspond to a distance interval of approximately 50 ft. As an example, a RSS control scheme may make downlink transmissions at a pre-determined minimum interval during normal RSS operational conditions (e.g., where abnormal conditions are not encountered). For example, consider 30 minutes as a minimum, 35 minutes as a minimum, 40 minutes as a minimum, 45 minutes as a minimum, etc. Given such time intervals, a controller may include and/or be operatively coupled to computational resources for purposes of predictive modeling, which can include one or more of generating predictions, selecting one or more machine learning models, training one or more machine learning models, etc.

As an example, an RSS downlink transmission may be via one or more technologies. For example, consider wired and/or wireless technologies. As to wireless technologies, consider, for example, a mud-pulse technology, a metal conductive pulse technology, etc. As an example, an RSS downlink transmission time may be of the order of 10 minutes or less (e.g., consider 1 minute or less).

As an example, a drilling operation can include one or more types of data delays. For example, consider a downhole surveying instrument that is operable when a drillstring is stationary and not drilling. Such an instrument may be utilized at the completion of drilling a stand (e.g., when a drillstring is in-slips, etc.). Where a stand is approximately 100 ft in length, survey data may be available at 100 ft intervals, which, for a ROP of 100 ft/h would be approximately on an hourly basis. As an example, a controller may utilize survey data, as acquired at least in part through use of a downhole instrument, to make one or more control decisions, which may be based at least in part on use of one or more trained machine learning models. In various instances, a downhole instrument may be a distance from a bit of a drillstring where the distance may be greater than approximately 20 ft. In such an example, some inaccuracy and/or uncertainty may exist in downhole instrument data, for example, consider a survey where survey data from an instrument displaced a distance from a bit is utilized to estimate a position of the bit (e.g., a bit location). As explained, a trajectory can be specified in multiple dimensions and drilling may aim to create a borehole that matches the trajectory. Where surveying equipment is provided, a drillstring can transmit survey data uphole to surface equipment, which, in turn, may determine a bit position that can be compared to a trajectory position. As explained with respect to the example of FIG. 15, the zone of acceptable physical trajectory divergence 1530 may be utilized for purposes of making one or more control decisions in an effort to reach the desired target 1540.

As an example, a digital well plan can be specified according to a distance interval. For example, consider a 30 ft well plan, a 50 ft well plan, a 100 ft well plan, etc. In such examples, time intervals may be estimated using an expected ROP. For example, at an ROP of 100 ft/h, the aforementioned intervals may be 20 minutes, 30 minutes and 60 minutes. As mentioned, in a downhole tool mode of operation (e.g., a downhole control mode), one or more approaches may be implemented that may differ with respect to such intervals (e.g., consider shorter intervals, which can include controlling while drilling and/or controlling while adding drill pipe).

In one embodiment, a prediction component can receive planned parameters and information about BHA for a well being planned. In such an example, the prediction component may use data from past operations of the tool to predict behavior for the well being planned. In such an example, the tool may be the same tool or a tool with the same or similar specifications (e.g., from same manufacturer, etc.).

In one embodiment, a prediction component may receive planned parameters and BHA information and compute a predicted DLS. In such an example, as explained with respect to the GUI 3400 of FIG. 34, a system can provide for rendering a predicted DLS to a display (e.g., directly and/or indirectly). As an example, a system may transmit information using one or more Internet protocols to one or more addresses of display devices that may then render one or more GUIs to a corresponding display or displays. In FIG. 34, the GUI 3400 shows data as to full steering tendency of a particular BHA being utilized in a drilling operation. As an example, the GUI 3400 may be rendered to a display at a rigsite, to a display of a mobile device, etc. As an example, a system may include one or more application programming interfaces (APIs) that can be operable in conjunction with one or more browser applications where API calls and responses may be communicated that can result in particular GUI renderings, control actions, etc. As an example, the GUI 3400 can include a graphical control associated with one or more of the suggested control actions where actuation of the graphical control can cause one or more instructions to be transmitted, directly and/or indirectly, to equipment to cause such equipment to act. For example, consider the "increase bend setting" control action where upon selection thereof via the GUI 3400 a control interface is rendered with one or more graphical controls to increase the bend setting or, for example, where upon selection thereof via the GUI 3400 a control instruction is transmitted that automatically increases the bend setting by a particular amount (e.g., pre-determined, recommended, etc.). In response to a control action, the GUI 3400 may be automatically updated, which may occur at an appropriate time or times. For example, an update may indicate control action staged, control action transmitted (e.g., via downlink transmission technology), control action effectuated, result of control action, etc. As mentioned, where a BHA includes local control circuitry, one or more control actions may be made, optionally without uplink transmission and/or without waiting for a downlink transmission.

As explained, a system can include various features that provide for receiving data gathered during use of a tool; and using the data, predicting behavior of the tool. As an example, a non-transitory computer-readable medium can store instructions that, when executed by a processor, cause the processor to perform operations, where the operations can include creating a hybrid machine learning-physics-based model for predicting performance of a downhole tool. In such an example, the term "hybrid" can refer to using a machine learning model to model differences between actual data of a drilling operation and physics-based model data of the drilling operation. As explained, a machine learning model (or machine learning models) can be a GP model that can model error where error represents a residual of actual data of a drilling operation and physics-based model data of the drilling operation (e.g., a difference, a correlation, a multiplication, etc.).

As explained, a method can provide for predicting behavior in one or more types of downhole tools. Drilling in, for example, oil and gas wells, often involves controlling behavior of a downhole tool. Being able to accurately predict behavior of a downhole tool can facilitate planning and execution. For example, a well plan may call for steering a downhole tool to drill a horizontal well. During planning, when selecting one or more downhole tools, an engineer may want to know whether a particular downhole tool can be steered in the way that the well plan dictates.

As an example, a system that can predict behavior of a downhole tool may be utilized during one or more drilling operations. For example, as mentioned, a controller may operate according to output from a prediction component where such a prediction component can utilize a trained machine learning model (e.g., or trained machine learning models).

As an example, a method may involve creating models for a downhole tool (e.g., optionally as operational in an environment, etc.), creating one or more ensemble models from the models, and generating a predicted behavior of the downhole tool using at least one of the ensemble models. For example, such a method may be used to predict steering behavior of a downhole tool.

As an example, a dynamic approach may be utilized where a model change can occur depending on one or more variables. For example, consider a first model, which may be an ensemble model, that performs better for a first type of formation with respect to steering behavior of a BHA and a second model, which may be an ensemble model, that performs better for a second type of formation with respect to steering behavior of the BHA. In such an example, during planning and/or drilling, a model may be selected depending at least in part on one or more formation characteristics (e.g., that characterize a type or types of formations).

As an example, a system can provide for selection of various models for various purposes. For example, a system can provide for a variety of physics-based models and a variety of machine learning models. As explained, one or more machine learning models may be trained using differences generated via comparisons between actual results and physics-based model results.

As an example, one or more machine learning models may be trained using gathered data that represents behavior of a downhole tool where the data has been processed and cleaned. For example, consider data that is from one or more offset wells, a portion or portions of current well, etc., where such data may be segregated into training data and testing data for purposes of generating a trained machine learning model or models. As an example, data may include operational data gathered during use of a downhole tool in one or more previous operations and may include simulated data generated by a simulator. In such an approach, where operational data is insufficient for satisfactory training and/or testing, simulated data may supplement the operational data. As an example, one or more augmentation techniques may be applied to generate augmented data from operational data and/or simulated data for purposes of supplementing operational data for training and/or testing.

As an example, one or more machine learning models may be created using one or more of a variety of machine learning techniques. For example, one or more machine learning models may be created using linear regression, X gradient boosted decision trees, random forests, multi-layer neural networks, support vector machines, Gaussian processes, and/or one or more other appropriate machine learning techniques.

In one embodiment, a method can be executed using a non-transitory computer readable storage medium that includes instructions to execute the method. In such an embodiment, the method may generate a predicted behavior as part of a well planning process. In such an embodiment, the computer readable storage medium may be configured to receive a well plan that includes a proposed trajectory, receive a proposed downhole tool for use in executing the well plan, and predicting whether the downhole tool can execute the proposed trajectory.

An ensemble learning pattern may allow for building a progressive machine learning structure which can learn from different data-driven models, domain models, and probability models. In one embodiment, intermediate predictions can be built using different machine learning techniques and/or physical models. As an example, a system can include an integration layer that generates a model that takes intermediate predictions as input and fuses them together to give a final prediction. In various instances, one or more ensemble models may obtain a final result that is more accurate than an individual intermediate model.

Figure 36:
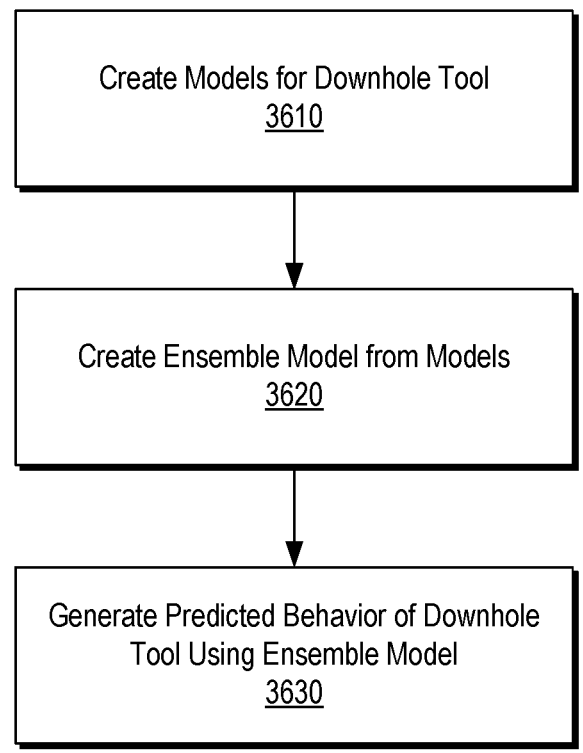
FIG. 36 illustrates an example of a method.

FIG. 36 shows an example of a method 3600 that includes a creation block 3610 for creating models for a downhole tool, a creation block 3620 for creating an ensemble model from the created models, and a generation block 3630 for generating predicted behavior of the downhole tool using the created ensemble model. In such an example, a downhole tool can be BHA or one or more subcomponents that make up the BHA.

Figure 37:
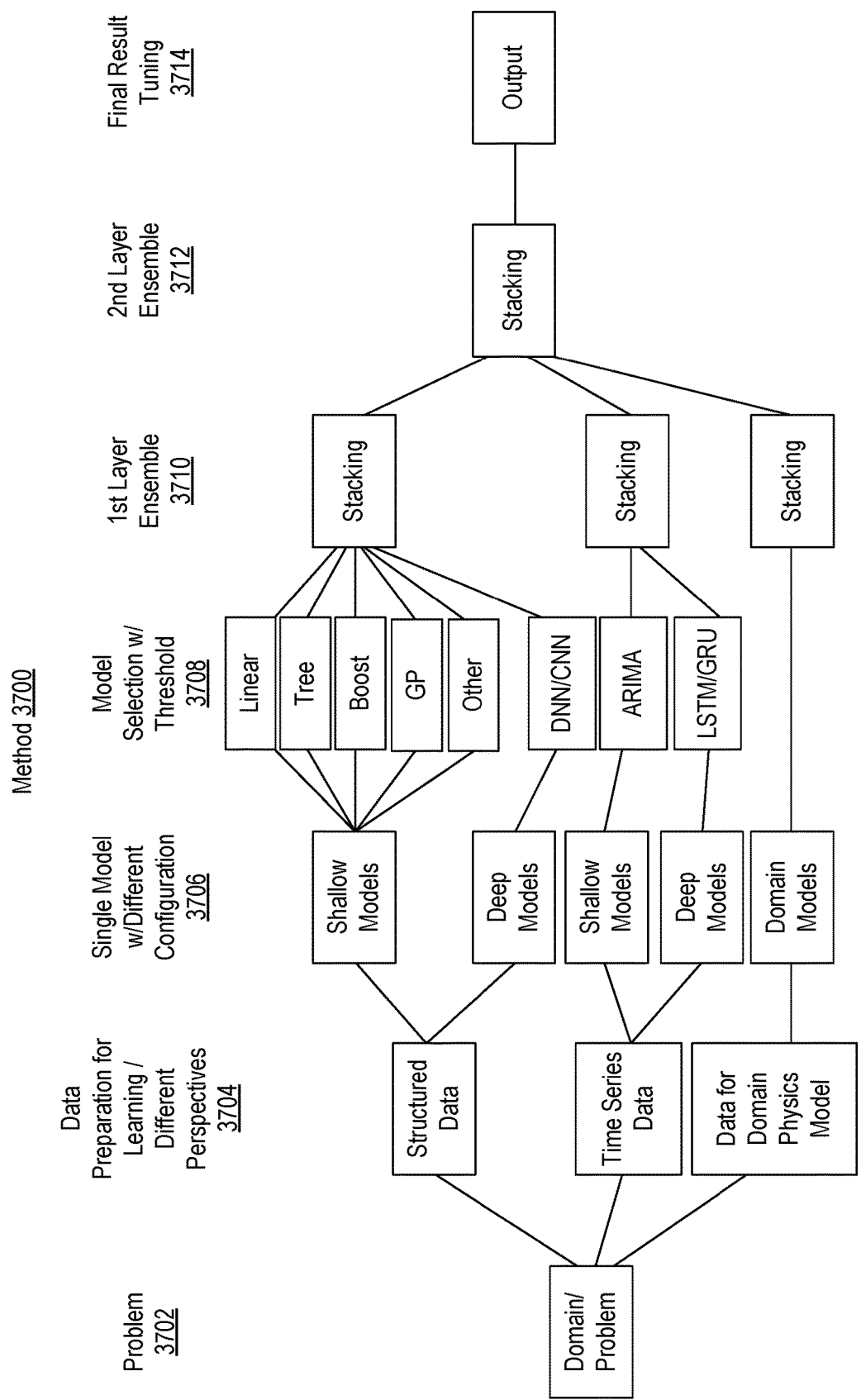
FIG. 37 illustrates an example of a method.

FIG. 37 shows an example of a method 3700 that includes various stages or phases, including a problem formulation phase 3702, a data preparation for learning phase 3704 (e.g., using one or more perspectives, etc.), a single model with different configurations phase 3706, a model selection with threshold phase 3708, a first layer ensemble phase 3710, a second layer ensemble phase 3712 and a final result tuning phase 3714. In such an approach, various phases may include iterative approaches, optionally with feedback from one or more phases, adjustments from one or more phases, etc.

As shown, the problem formulation phase 3702 can include domain selection for purposes of formulating a problem such as a tool behavior problem associated with operation of the tool (e.g., tool capabilities, etc.). The data preparation for learning phase 3704 can include, for example, data structuring, selecting and/or preparing time series, selecting and/or preparing data for a domain physics-based model. The single model with different configurations phase 3706 can include preparation of a variety of different single models, which may include one or more shallow models, one or more deep models, one or more domain models, etc. The model selection with threshold phase 3708 can include utilizing one or more thresholds to select models that perform acceptably for downhole tool behavior prediction (e.g., for one or more conditions, etc.). As shown, the model selection with threshold phase 3708 can include selection of models such as linear, tree (e.g., decision tree), boosted (Boost), Gaussian process (GP), deep neural network (DNN), convolution neural network (CNN), autoregressive integrated moving average (ARIMA), long short-term memory (LSTM) and/or gated recurrent units (GRUs) (e.g., as an artificial recurrent neural network (RNN) architecture), etc.

As shown in FIG. 37, the first layer ensemble phase 3710 can include stacking, which may stack one or more models (e.g., from the phase 3706 and/or the phase 3708), and the second layer ensemble phase 3712 can include stacking, for example, of one or more stacks of the first layer ensemble phase 3710. In FIG. 37, the final result tuning phase 3714 can provide for tuning an ensemble model, for example, to address one or more problems such as the problem formulated in the problem formulation phase 3702.

In one embodiment, a plurality of models can include one or more physics-based models and one or more machine learning models. In such an embodiment, a hybrid machine learning model and a physics-based model may generate predicted behavior of a downhole tool. In certain embodiments, the predicted behavior can be steering behavior of the downhole tool (e.g., ability to steer a bit to drill a desired trajectory, etc.).

Figure 38:
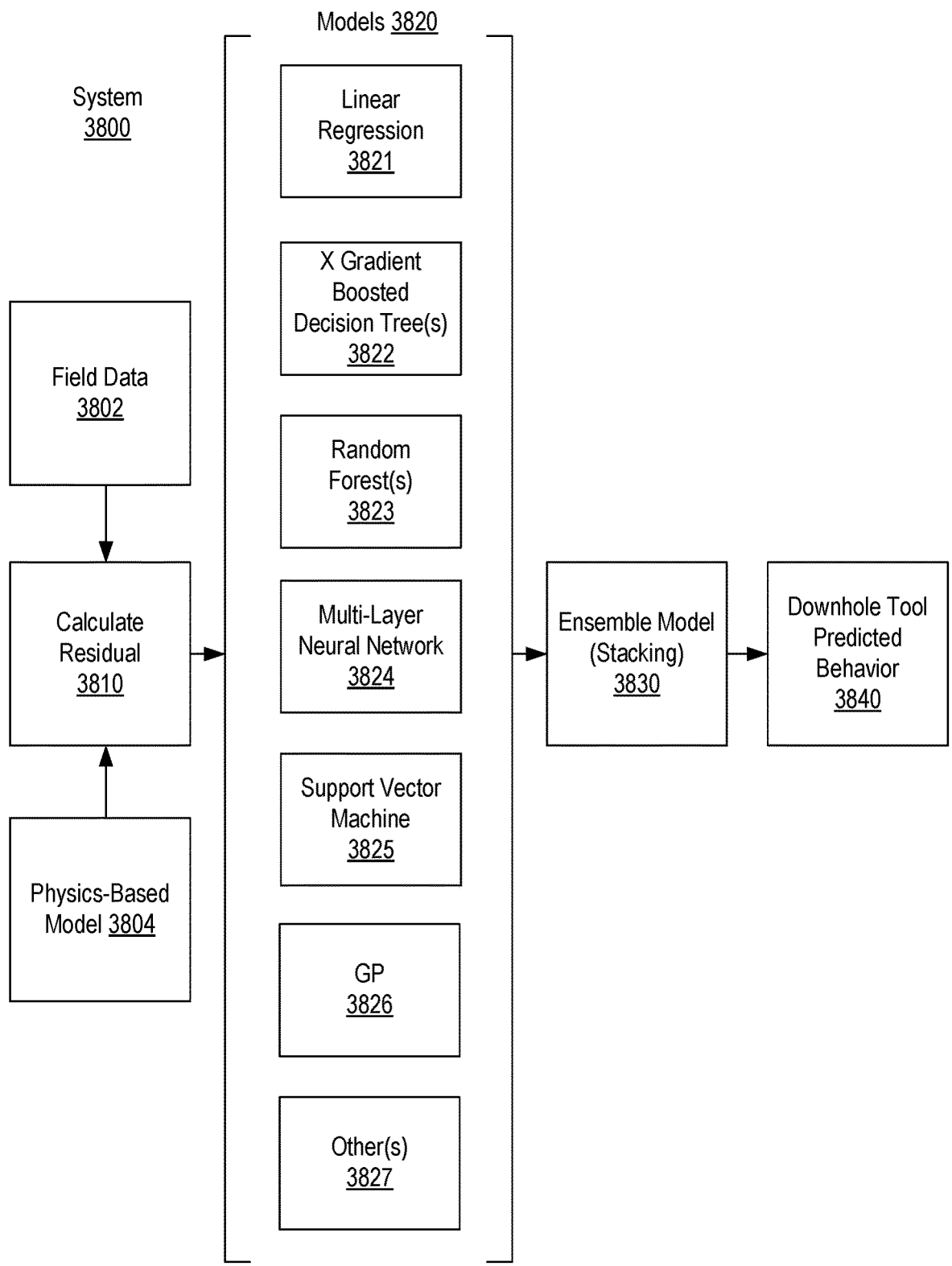
FIG. 38 illustrates an example of a system.

FIG. 38 shows an example of a system 3800 that includes various blocks that can represent one or more system components and/or components accessible to the system 3800 (e.g., via one or more networks, etc.). As shown, a field data block 3802 and a physics-based model block 3804 can receive and/or generate data where a calculation block 3810 can calculate one or more differences using the data, for example, consider a residual that is a difference between a field data value and a physics-based model value.

In the system 3800, the calculation block 3810 can generate data that can be utilized by one or more models of a models layer 3820, which may include various types of models such as, for example, a linear regression model 3821, an X gradient boosted decision tree(s) model 3822, a random forest(s) model 3823, a multi-layer neural network model 3824, a support vector machine (SVM) model 3825, a Gaussian process (GP) model 3826, and one or more other models 3827.

The system 3800 can train two or more of the models of the models layer 3820 based at least in part on output of the calculation block 3810. As mentioned, a selection process (e.g., threshold based selection, etc.) may be utilized to determine which models to stack to form an ensemble model per the ensemble model block 3830 (e.g., stacking block 3830).

The system 3800 can output one or more ensemble models where such one or more models can be utilized to predict behavior of one or more downhole tools, combinations of downhole tools, etc., for example, per the prediction block 3840.

As an example, the method 3600 can utilize one or more features of the system 3800. As an example, the method 3600 can include receiving a well plan that includes a proposed trajectory, receiving a proposed downhole tool for use in executing the well plan, and predicting whether the downhole tool can execute the proposed trajectory. In one embodiment, multiple candidate downhole tools may be presented and the method 3600 can include selecting one or more of the candidates that can achieve the proposed trajectory. As an example, an operator may select a downhole tool and a method may be utilized that can propose one or more changes to a trajectory based on predicted behavior of the downhole tool. In one or more embodiments, a method can provide alerts or other messages to an operator planning a well, an operator drilling a well, etc., where the method determines that a particular downhole tool is unlikely or unable to achieve a proposed trajectory (e.g., under a set of circumstances, under various sets of circumstances, etc.).

Referring again to FIGS. 37 and 38, various approaches can be utilized to create one or more ensemble models for predicting behavior of a downhole tool. In one embodiment, an approach can involve dedicating resources to understanding a domain and a problem and data preparation. Data preparation may involve, for example, collecting structured data, time series data, data from simulators and other sources as appropriate.

An approach can involve single model generation to generate individual models using different techniques (e.g., consider creating shallow models, deep models, and domain models). Such an approach can include, for example, model selection with threshold that applies one or more criteria for selecting a plurality of models. As explained, an approach can include a first layer ensemble phase that may stack one or more models as selected and a second layer ensemble phase that may further stack results to create a final result, which may be a tuned result or a result subject to tuning.

The system 3800 of FIG. 38 can be an architecture for a computational framework. As mentioned, various blocks can provide for field data, physics-based model results (e.g., IDEAS, etc.), etc., where one or more residuals may be calculated, which may, for example, be with respect to depth (e.g., depth of a borehole in an environment, etc.). As explained, various machine learning models can be trained using calculated residuals; noting that residuals may be modeled as one or more functions. As explained, stacking can be used to generate an ensemble model that can be utilized to predict downhole tool behavior such as, for example, dogleg capabilities (e.g., DLS, etc.).

Figure 39:
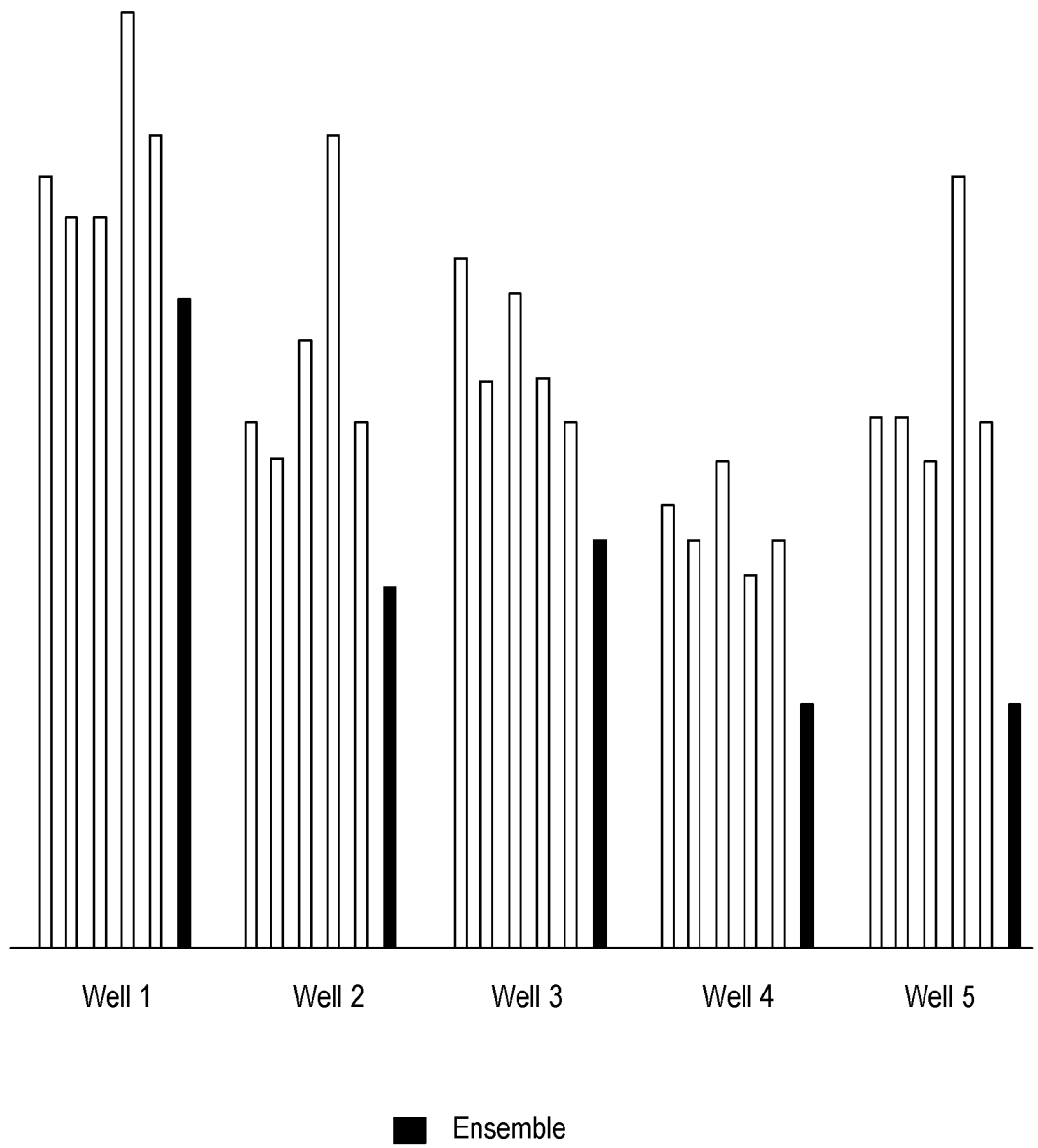
FIG. 39 illustrates an example of a plot.

FIG. 39 shows an example plot 3900, which may be a graphical user interface (GUI), that includes results from various models that can be stacked to form an ensemble model. Specifically, the plot 3900 shows trained machine learning model error for different wells using different techniques. As shown, each of the ensemble models (black bars) for a corresponding well demonstrates less error than the individual trained machine learning models (white bars) for that well.

FIG. 40 shows various example plots 4010, 4020 and 4030 that show DLS error distributions. The plot 4010 shows DLS error distribution for a forward model (e.g., a physics-based model, specifically IDEAS framework model), the plot 4020 shows DLS error distribution for a trained machine learning model (e.g., a single trained machine learning model), and the plot 4030 shows DLS error distribution for an ensemble model. As shown, the mean absolute (ABS) error is approximately −4.18 deg/100 ft for the forward model, approximately −1.31 deg/100 ft for the single trained machine learning model, and approximately −0.82 deg/100 ft for the ensemble model.

In certain embodiments, the ensemble approach may be used to provide rapid predictions of steering behavior of a downhole tool, a combination of downhole tools, etc. As an example, a downhole tool can be or include a motor that can be part of a steering mechanism (e.g., consider a POWER-DRIVE RSS).

As an example, a tool can be the POWERDRIVE XCEL RSS, which is configured for use in high-profile directional drilling operations. As an example, a tool may include features for magnetic and gravity field measurement for steering control. As an example, a tool may include features for inertial directional control (e.g., in one or more deviated sections, etc.). As an example, inertial directional control may be controlled (e.g., on/off) via downlink transmission. Such type of control may provide for drilling through a magnetic zone-of-exclusion (ZOE). As an example, a tool can include one or more gyroscopes, which may be utilized for directional control, redundancy (e.g., redundant to magnetic control), etc. As an example, a tool can include features to one or more of sense magnetic and inertial stick/slip, shock and vibration on three axes, etc. As an example, prediction of behavior can include prediction of various sensors under certain conditions where, if sensor operation and/or sensor data are deemed insufficient for purposes of control, a tool may be deemed insufficient for use under such conditions and/or may be recommended to be controlled in one or more alternative manners.

As an example, a method for predicting behavior of a downhole tool can include creating a plurality of models for a downhole tool; creating an ensemble model from the plurality of models; and generating a predicted behavior of the downhole tool using the ensemble model. In such an example, the plurality of models may include a physics-based model, which may be in addition to one or more machine learning models. As explained, a physics-based model may be utilized for generating results that can be processed along with actual data (e.g., field data), for example, to generate residuals, which can include residuals with respect to one or more variables (e.g., mud flow rate, depth, formation character, rate of penetration, sensor accuracy, sensor capabilities, etc.). As an example, a non-transitory computer-readable storage medium can include instructions that when executed by a computer, cause the computer to: create a plurality of models for a downhole tool; create an ensemble model from the plurality of models; and generate a predicted behavior of the downhole tool using the ensemble model.

Figure 41:
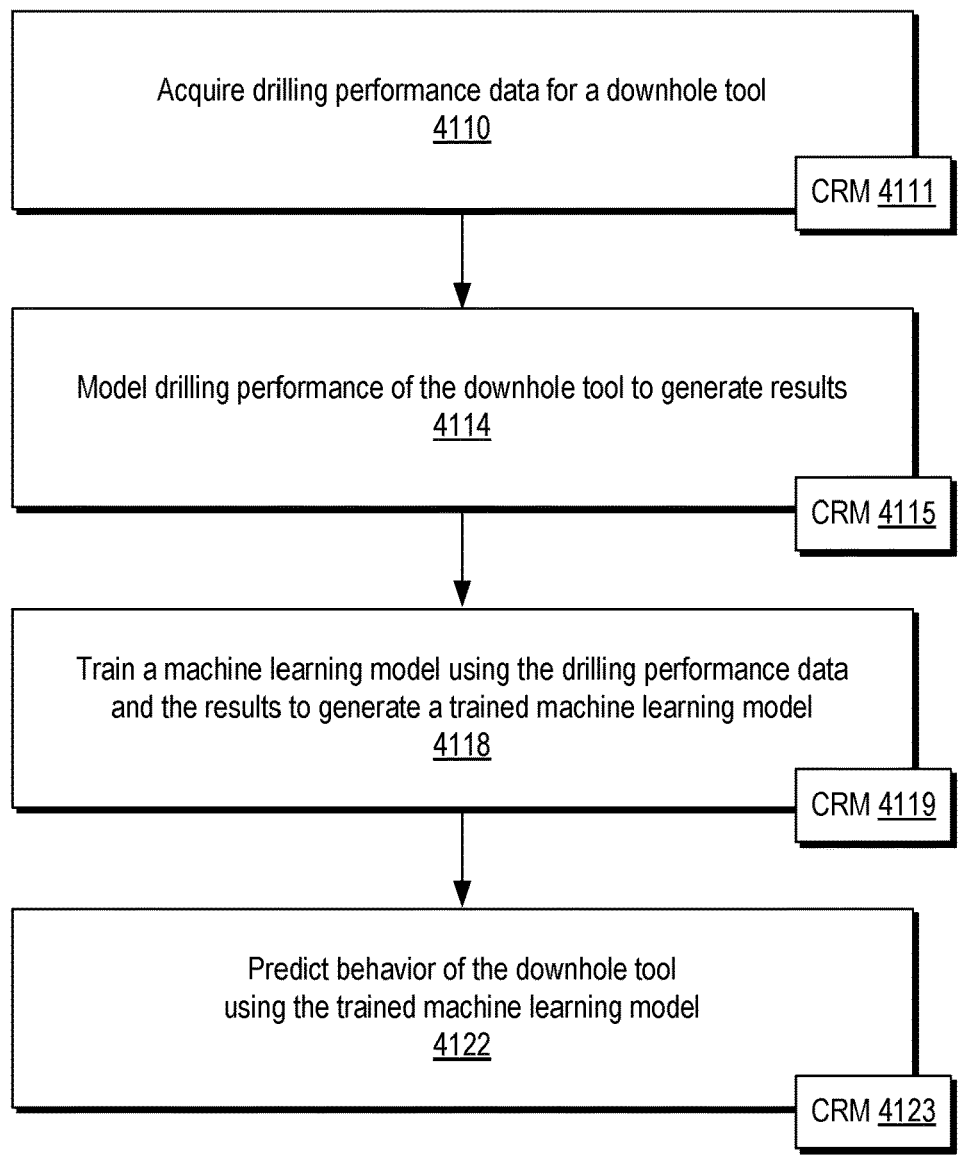
FIG. 41 illustrates an example of a method.

FIG. 41 shows an example of a method 4100 that includes an acquisition block 4110 for acquiring drilling performance data for a downhole tool; a modeling block 4114 for modeling drilling performance of the downhole tool to generate results; a training block 4118 for training a machine learning model using the drilling performance data and the results to generate a trained machine learning model; and a prediction block 4122 for predicting behavior of the downhole tool using the trained machine learning model.

In the example of FIG. 41, the acquisition block 4110 can include accessing data from a data storage, for example, as to one or more wells that may be at least partially drilled using the downhole tool and/or a similar downhole tool (e.g., from a common manufacturer, etc.). As to the modeling block 4114, it can include using a physics-based model. For example, consider using the IDEAS framework, which includes a finite element model that can discretize equations such as continuity equations, etc., which are derived from laws of physics. In such an example, the physics-based model can account for one or more formation characteristics and one or more operational characteristics of the downhole tool or a portion thereof (e.g., at least a bit) for formation drilling. As to the training block 4118, it can include training one or more machine learning models. As an example, an ensemble approach may be utilized such that the generated trained machine learning model is an ensemble model. As to the prediction block 4122, it may be utilized as part of a planning framework, a downhole tool design framework, a BHA selection framework, a real-time drilling control framework, etc.

FIG. 41 also shows various computer-readable medium (CRM) blocks 4111, 4115, 4119 and 4123, which can include computer-executable instructions (e.g., processor-executable instructions) that can instruct a system to perform one or more of the actions associated with the method 4100. For example, consider the system 470 of FIG. 4 where one or more of the CRM blocks can be included as the instructions 476 or as at least a portion of the instructions 476, the system 790 of FIG. 7 where one or more of the CRM blocks can be included as the instructions 796 or as at least a portion of the instructions 796, the system 890 of FIG. 8 where one or more of the CRM blocks can be included as the instructions 896 or as at least a portion of the instructions 896, etc.

Figure 42:
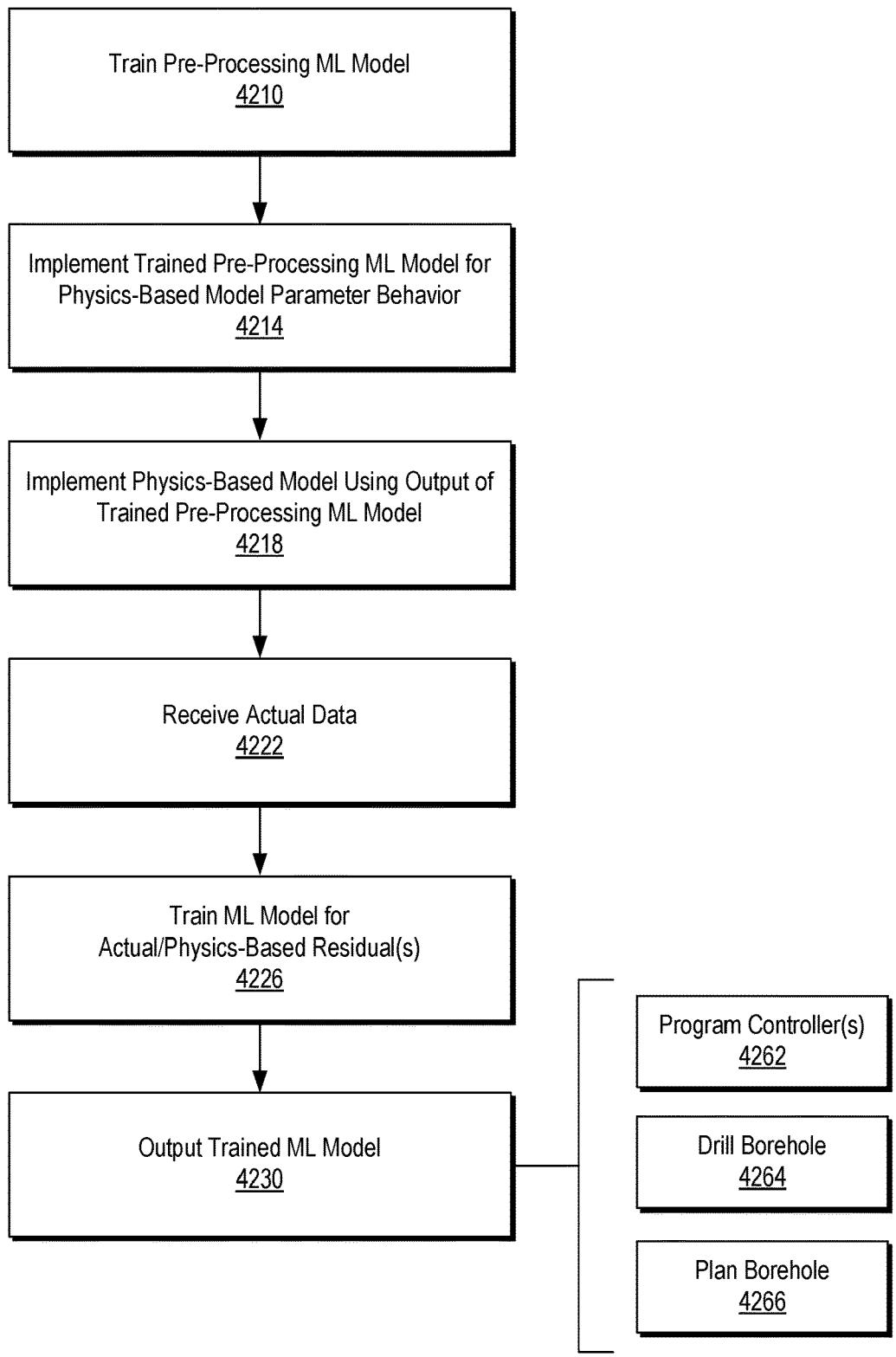
FIG. 42 illustrates an example of a method.

FIG. 42 shows an example of a method 4200 that includes various blocks, some of which may be optional, depending on drilling conditions, tool availability, etc.

As shown, the method 4200 includes a training block 4210 for training a pre-processing machine learning (ML) model as to an input parameter or input parameters to a physics-based model, an implementation block 4214 for implementing the trained pre-processing ML model for the physics-based model parameter behavior (e.g., bit steerability with respect to flow rate, bit steerability with respect to formation density, etc.), an implementation block 4218 for implementing the physics-based model using output of the trained pre-processing ML model to generate results, a reception block 4222 for receiving actual data (e.g., measurements, which may include surface and/or downhole measurements), a training block 4226 for training a machine learning (ML) model for predicting behavior of a downhole tool using one or more actual data and physics-based model results residuals (e.g., differences, multiplications, functions, etc.), and an output block 4230 for outputting a trained ML model that can predict behavior of the downhole tool.

As shown in FIG. 42, the output trained ML model can be utilized by a program block 4262 for programming one or more controllers, a drill block 4264 for drilling a borehole, and a plan block 4266 for planning a borehole (e.g., a well plan, etc.).

In the example method 4200, a portion of the method 4200 may be for pre-processing such as, for example, the actions of the blocks 4210, 4214 and 4218. As an example, pre-processing can provide for more accurate representation of how a stated characteristic of a tool may vary with respect to one or more conditions. As mentioned, a bit may be provided with a steerability index value where data may indicate that the steerability index value depends on one or more conditions. In such an example, when flow rate of drilling fluid is low, the steerability index value may be less than a stated value and/or when flow rate of drilling fluid is high, the steerability index value may be higher than the stated value. As an example, a pre-processing approach can aim to model a correlation or correlations of a specified tool characteristic where output of the model can be utilized as input to a physics-based model. In such an approach, the pre-processing trained machine learning model may be an ensemble model. As an example, one or more pre-processing models may be utilized for generating input to a physics-base model.

As to a post-processing approach, that is post implementation of the physics-based model, various blocks of the method 4200 may be utilized, such as, for example, blocks 4226 and 4230, where one or more machine learning models can be trained using one or more residuals.

As to the blocks 4262, 4264 and 4266, consider the system 900 of FIG. 9, which may utilize one or more output trained machine learning models for purposes of generating one or more predictive responses. For example, one or more predicted responses can be utilized for purposes of optimization with respect to one or more PI targets.

Figure 43:
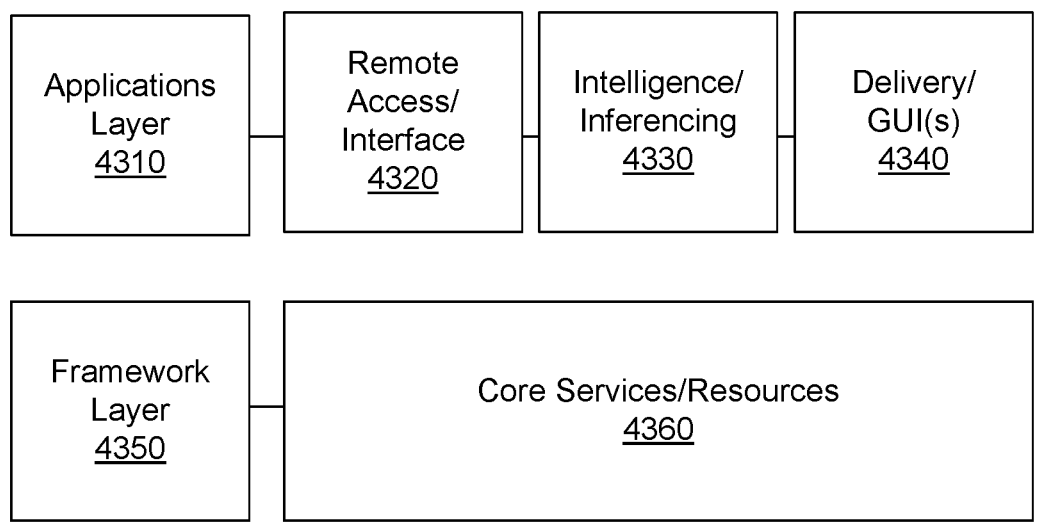
FIG. 43 illustrates an example of a system.

FIG. 43 shows an example of a system 4300 that includes various layers and operational blocks, including an applications layer 4310 that can include a remote access and interface block 4320 (e.g., for access to interfaces of rigsite equipment from one or more remote locations, etc.), an intelligence and inferencing block 4330 (e.g., resources optionally remote from a rigsite, etc.), an applications delivery and/or GUIs block 4340 (e.g., optionally including one or more application programming interfaces, etc.), and a framework layer 4350 that includes a core services and/or resources block 4360.

In the example of FIG. 43, the applications layers 4310 can include various applications that can be executable using one or more of the framework layer 4350 resources. Such applications can include, for example, applications that operate locally, remotely and/or a combination of remotely and locally. As an example, one or more of the methods described herein may be implemented using a system that includes one or more of the features of the system 4300.

Figure 44:
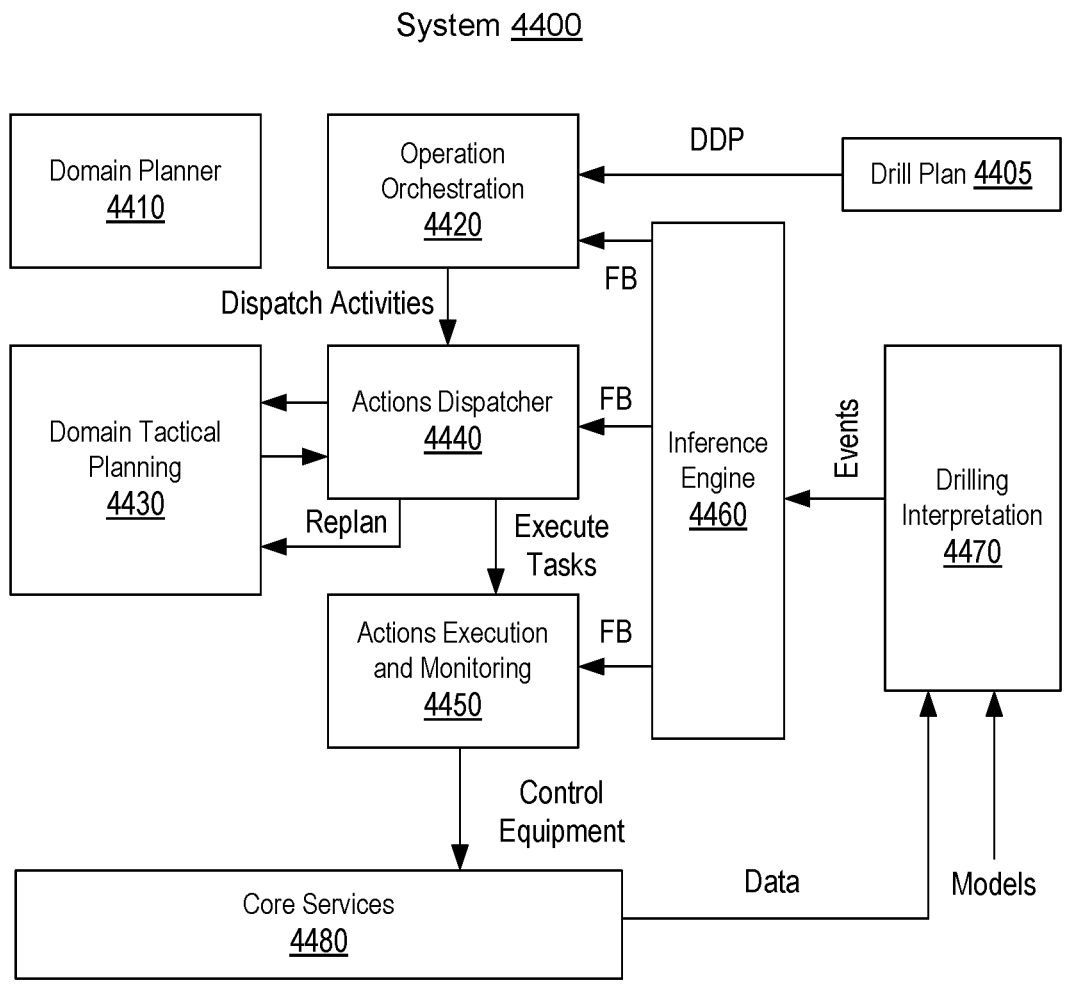
FIG. 44 illustrates an example of a system.

FIG. 44 shows an example of a system 4400 that includes various blocks including a digital drill plan (DDP) block 4405, a domain planner block 4410, an operation orchestration block 4420, a domain tactical planning block 4430, an actions dispatcher block 4440, an actions execution and monitoring block 4450, an inference engine block 4460, a drilling interpretation block 4470, and a core services block 4480.

As shown in FIG. 44, various arrows indicate some examples of actions that can be performed utilizing the system 4400. In the example of FIG. 44, the inference engine 4460 can provide feedback (FB) based at least in part on events as may be provided as output via the drilling interpretation block 4470. As shown, the drilling interpretation block 4470 can receive data and one or more models (e.g., as to one or more drilling operations, production, injection, materials modeling, fluids modeling, etc.). As shown data may be provided via the core services block 4480 (see, e.g., core services 4360 of FIG. 43).

The system 4400 can include features for dispatching activities, for example, via the operation orchestration block 4420, which may dispatch activities response to information (e.g., instructions, etc.) in the drill plan block 4405 (e.g., consider executable commands, instructions, etc., as may be specified in a digital drill plan, which may be a digital well plan as explained with respect to FIG. 6 where various activities are illustrated in the GUI 600).

The system 4400 can include features for execution of activities, which may be classified as tasks. In such an example, the domain tactical planning block 4430 may act to receive activities and to output tasks based on the activities. As an example, the actions dispatcher block 4440 can provide logic that requests replanning of tasks and/or activities, which may occur responsive to feedback (FB) as provided via the inference engine block 4460. For example, equipment at a rigsite may transmit (e.g., via pull and/or push) data to the core services block 4480 where the data are received via the drilling interpretation block 4470, which may utilize one or more models to interpret at least a portion of the data based at least in part on one or more of the one or more models. In such an example, one or more events may be output where such one or more events are received by the inference engine block 4460, which can infer how such one or more events may impact activities and/or tasks. As the actions dispatcher block 4440 is responsible for dispatching, the inference engine block 4460 can output feedback as information that may, for example, call of replanning (e.g., via the domain tactical planning block 4430). In such an example, real-time operations can be controlled with one or more feedback loops as tasks are executed and data are acquired and received at a rigsite by one or more pieces of equipment.

In the example of FIG. 44, the inference engine block 4460 can be cast in a drilling operations context as informed by the drilling interpretation block 4470. For example, the drilling interpretation block 4470 can inform an inference engine such that inferences are made in the context of drilling operations.

While the foregoing example refers to output of the inference engine block 4460 to the actions dispatcher block 4440, as shown in FIG. 44, the inference engine block 4460 can provide feedback to one or more other blocks. For example, the inference engine block 4460 can provide feedback to the operations orchestration block 4420 and/or the actions execution and monitoring block 4450. In such an example, an informed inference engine can be cast in the context of drilling operations such that inferences, which can be data-based and/or model-based inferences, can affect control of equipment at one or more levels of the system 4400. Such an approach provides for multi-level robustness such that data from equipment at one or more rigsites can inform drilling operations, optionally in real-time. As an example, one or more of the methods described herein may be implemented using a system that can include one or more features of the system 4400.

Figure 45:
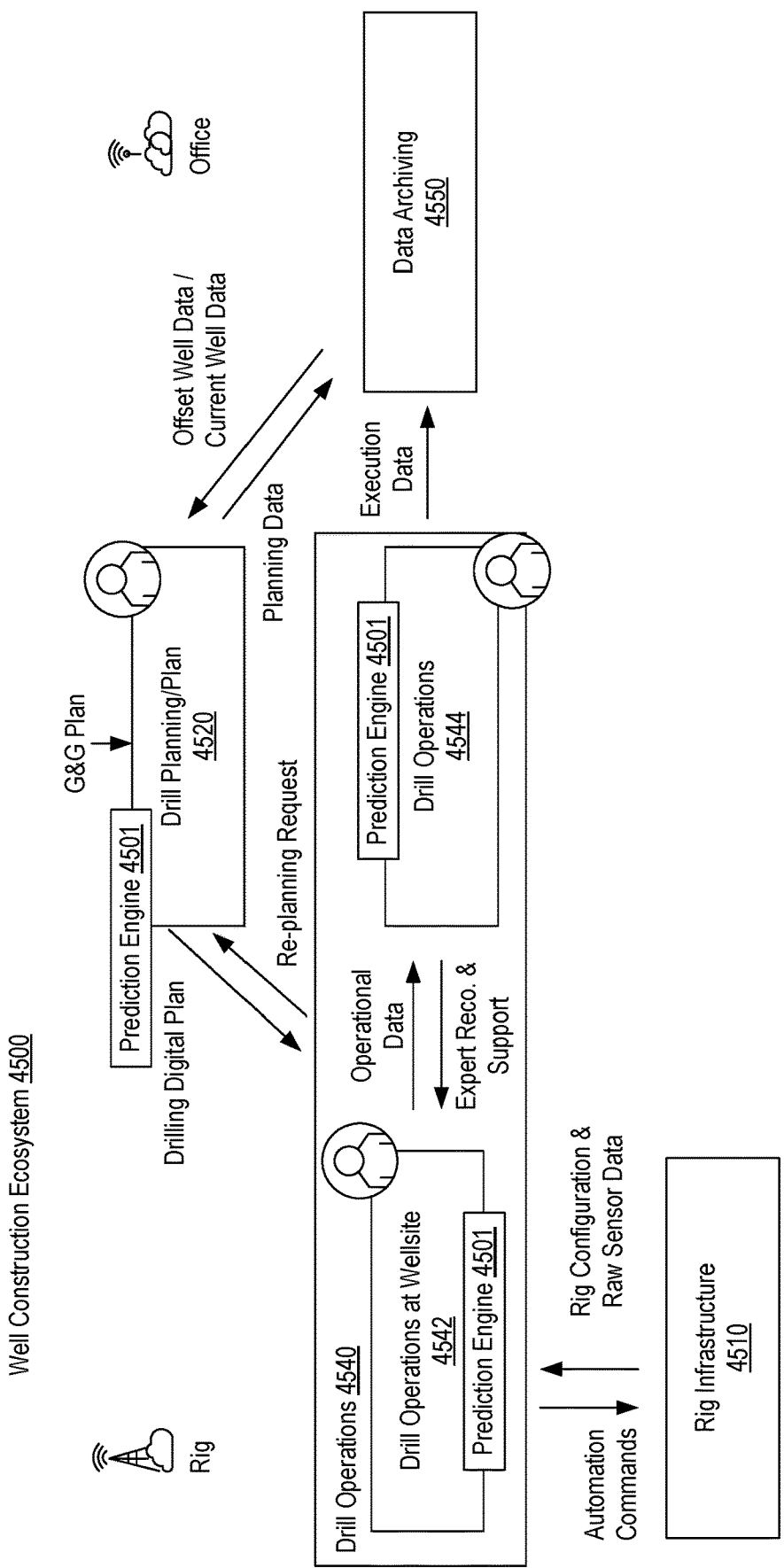
FIG. 45 illustrates an example of a system.

FIG. 45 shows an example of a system 4500 that can be a well construction ecosystem that can include one or more instances of a prediction engine 4501, which may be a prediction component, a prediction framework, a prediction system, etc., which can predict behavior of one or more tools in one or more environments (e.g., operational behavior, etc.).

As shown, the system 4500 can include one or more instances of the prediction engine 4501 and can include a rig infrastructure 4510 and a drill plan component 4520 that can generate or otherwise transmit information associated with a plan to be executed utilizing the rig infrastructure 4510, for example, via a drilling operations layer 4540, which includes a wellsite component 4542 and an offsite component 4544. As shown, data acquired and/or generated by the drilling operations layer 4540 can be transmitted to a data archiving component 4550, which may be utilized, for example, for purposes of planning one or more operations (e.g., per the drilling plan component 4520).

In the example of FIG. 45, the prediction engine 4501 is shown as being implemented with respect to the drill plan component 4520, the wellsite component 4542 and/or the offsite component 4544.

As an example, the prediction engine 4501 can interact with one or more of the components in the system 4500. As shown, the prediction engine 4501 can be utilized in conjunction with the drill plan component 4520. In such an example, data accessed from the data archiving component 4550 may be utilized to assess output of the prediction engine 4501 or, for example, may be utilized as input to the prediction component 4501. As an example, the data archiving component 4550 can include drilling data for one or more offset wells and/or one or more current wells pertaining to specifications for and/or operations of one or more types of bits, one or more types of mud motors, etc. As an example, data may be utilized in combination with a framework such as, for example, the IDEAS framework. As mentioned, the IDEAS framework can provide one or more physics-based models, which may be finite element method (FEM) models that can generate results that can be compared with field data, for example, for purposes of training one or more machine learning models.

As shown in FIG. 45, various components of the drilling operations layer 4540 may utilize the prediction engine 4501 and/or a drilling digital plan as output by the drill plan component 4520 (e.g., a PDDL planner plan, etc.). During drilling, execution data can be acquired, which may be utilized by the prediction engine 4501, for example, to update one or more plans, actions, etc. Such execution data can be archived in the data archiving component 4550, which may be archived during one or more drill operations and may be available by the drill plan component 4520, for example, for re-planning, etc.

As an example, a method can include acquiring drilling performance data for a downhole tool; modeling drilling performance of the downhole tool to generate results; training a machine learning model using the drilling performance data and the results to generate a trained machine learning model; and predicting behavior of the downhole tool using the trained machine learning model. In such an example, the method can include, based at least on the predicting behavior of the downhole tool, selecting the downhole tool for drilling a borehole.

As an example, a method can include predicting behavior of a downhole tool using a trained machine learning model and generating a digital well plan to drill a borehole using the downhole tool.

As an example, a method can include programming a controller using a trained machine learning model that is trained to predict behavior of a downhole tool. In such an example, the trained machine learning model may be trained using actual data and a data from a physics-based model where residuals thereof are utilized (e.g., representing a correlation or correlations between actual data and physics-based model data, etc.). In such an example, the method can include controlling a drilling operation using the controller. For example, consider the system 470 of FIG. 4 being programmed using a trained machine learning model. In such an example, the system 470 may include one or more data structures that represent outputs of such a trained ML model given various inputs (e.g., functions, data tables, look-up tables, etc.); the system 470 may include executable instructions to run the trained ML model given appropriate input; the system 470 may include executable instructions that can call a resource to compute output using the trained ML model (e.g., consider API calls, etc.) and to return such computed output responsive thereto or, for example, to return one or more control instructions responsive thereto where such one or more control instructions are based at least in part on the computed output; etc. As explained with respect to the well construction ecosystem 4500 of FIG. 45, the prediction engine 4501 can be or include a trained machine learning model that can predict behavior of equipment such as, for example, behavior of a downhole tool that is being utilized to, or is considered for utilization in, drilling a borehole.

As an example, a method can include modeling drilling performance of a downhole tool utilizing a physics-based model. In such an example, the physics-based model can be a finite element method model. As mentioned, such a physics-based model can be a model of the IDEAS framework. The IDEAS integrated dynamic design and analysis framework can provide 4D simulations of at least a downhole tool and an entire drillstring and wellbore geometry. The IDEAS framework can generate results as to interactions in a virtual environment, which can allow for customizations in real time. For example, consider features for predicting bit performance where the bit is part of a BHA operational in a borehole to deepen the borehole. The IDEAS framework can generate results that may be verified and validated through one or more of theoretical calculations, finite element packages, in-house drill rig tests, full-scale rig tests, and field tests with MWD or downhole drilling dynamics sensors. As explained, results may differ from actual field data. As mentioned, a DLS result, directly or indirectly, from a physics-based model may differ from an actual DLS. In such an example, a residual approach may be taken using the DLS result and actual DLS (e.g., and/or specific parameter data underlying such data). In such an example, residuals may be utilized to train a machine learning model that can then be utilized for predictions such as predictions pertaining to DLS (e.g., directly and/or indirectly). In such an approach, the predictions of the trained machine learning model can be improved when compared to the results of the physics-based model. As an example, in some instances, physics-based model results can suffice (e.g., negligible error, error not impacting control decisions, etc.); while, in other instances, such results may not suffice in that planning and/or control can be optimized (e.g., improved) through use of a trained machine learning model. As an example, a method can include determining when to use a trained machine learning model in an effort to improve planning and/or control. For example, where a residual analysis as to physics-based model results and actual data demonstrates that a residual is negligible, a method may forego calling a trained machine learning model and utilize the physics-based model results (e.g., for planning, for control, etc.). Such an approach may save time, which during drilling may optionally diminish non-productive time (NPT), while, where appropriate, calling for use of a trained machine learning model to optimize drilling. Such a selective approach may reduce calls for computations, etc., which may reduce transmission demands, generation of redundant information, etc., which, overall, may improve a driller's experience when drilling (e.g., fewer GUI changes, rendering of limited and appropriate information and/or control commands, etc.).

As explained, a machine learning model can be or include a Gaussian process model. A Gaussian process can be utilized in taking a probabilistic approach to learning in kernel machines. As an example, a stochastic process can be a generalization of a probability Gaussian process distribution (e.g., which describes a finite-dimensional random variable) to functions. In supervised learning problems in machine learning, a method can involve learning a function from examples that may be cast directly into a Gaussian process framework. A Gaussian process can define a distribution over functions with inference taking place directly in the space of functions. A Gaussian process may be defined as a collection of random variables, where a Gaussian process finite number of which have a joint Gaussian distribution. A Gaussian process can be specified by its mean function (e.g., m(x)) and covariance function (e.g., k(x,x')) of a real process (e.g., f(x)). For example, consider:

$$m(x) = \mathbb{E}[f(x)],$$
$$k(x, x') = \mathbb{E}[(f(x) - m(x))(f(x') - m(x'))]$$

where a Gaussian process may be written as:

$$f(x) \sim \mathcal{GP}(m(x), k(x, x'))$$

In such an example, the random variables represent the value of the function. Above, the covariance function can be part of a Gaussian process predictor, as it can encode assumptions about the function to be learned. From a supervised learning viewpoint, the notion of similarity between data points can be considered where there can be a similarity assumption that points with inputs x, which are close, are likely to have similar target values y, and thus training points that are near to a test point are expected to be informative about the prediction at that point. Under the Gaussian process view, the covariance function can define nearness or similarity.

As an example, a machine learning model can be a model other than a Gaussian process model. For example, consider a support vector machine (SVM) model, a least-squares classification model (LSC), a relevance vector machine (RVM) model, etc.; noting that a RVM may be a special case of a GP.

As to supervised learning, as explained, one or more of linear regression, logistic regression, decision trees, neural networks, support vector machines, kernel smoothers, k-nearest neighbor classifiers, etc., may be utilized. Supervised learning can be defined as an inductive process where, for example, given a finite training set "learning" aims to infer a function that makes predictions for various possible input values. As an example, one or more machine learning models may be suitable for use in, or as components in, unsupervised learning.

In various instances, GP models can provide a computationally attractive method for dealing with a smoothing problem for a given kernel where aspects such as, for example, feature discovery, may be handled through kernel function selection.

As an example, a method can include utilizing a trained machine learning model that is an ensemble model. As explained, a method can include utilizing a plurality of models and then forming an ensemble model (e.g., via stacking, etc.).

As an example, training a machine learning model can utilize drilling performance data and physics-based model results to generate a trained machine learning model. In such an example, residuals may be utilized, for example, consider a method that involves computing residuals. In such an example, the residuals can be or include errors between the drilling performance data and the results. As an example, residuals can be or include values with respect to a trajectory, for example, where the trajectory includes a dogleg.

As an example, a method can include rendering a graphical user interface to a display based on predicting behavior of a downhole tool. For example, consider a graphical user interface that includes dogleg information for the downhole tool.

As an example, a method can include providing a trained pre-processing machine learning model that outputs one or more values for a downhole tool for modeling drilling performance of the downhole tool. In such an example, at least one of the one or more values may differ from a manufacturer specified value or values for the downhole tool. As an example, a method can include generating a trained pre-processing machine learning model.

As an example, a method can include predicting behavior of a downhole tool where the downhole tool is a rotary steerable system.

As an example, a system can include a processor; memory accessible by the processor; processor-executable instructions stored in the memory and executable to instruct the system to: acquire drilling performance data for a downhole tool; model drilling performance of the downhole tool to generate results; train a machine learning model using the drilling performance data and the results to generate a trained machine learning model; and predict behavior of the downhole tool using the trained machine learning model.

As an example, one or more computer-readable storage media can include processor-executable instructions to instruct a computing system to: acquire drilling performance data for a downhole tool; model drilling performance of the downhole tool to generate results; train a machine learning model using the drilling performance data and the results to generate a trained machine learning model; and predict behavior of the downhole tool using the trained machine learning model.

As an example, a computer program product can include instructions which, when the program is executed by a computer (e.g., or computing system), cause the computer (e.g., or computing system) to carry out one or more methods described herein.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 46:
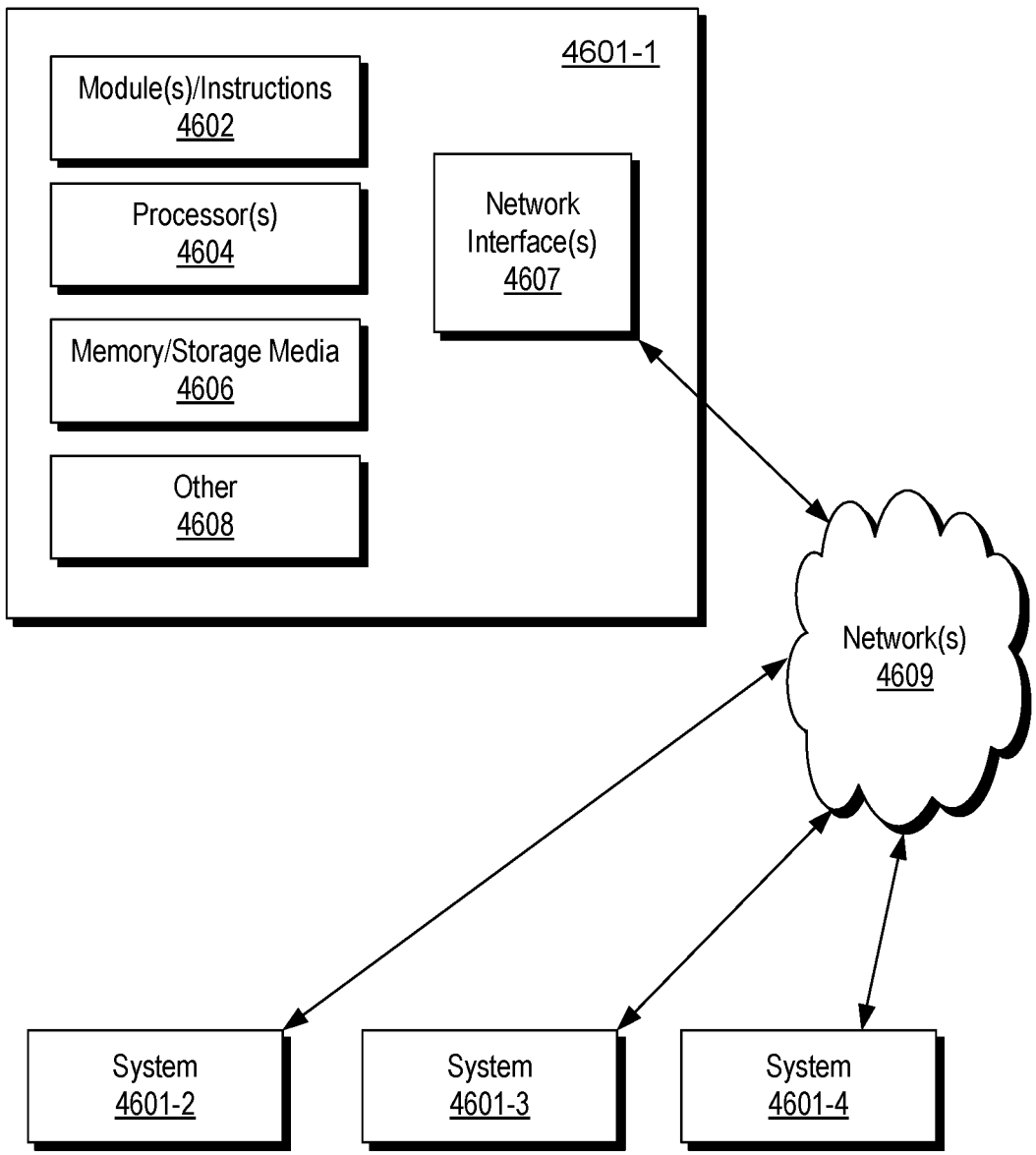
FIG. 46 illustrates an example of computing system.

In some embodiments, a method or methods may be executed by a computing system. FIG. 46 shows an example of a system 4600 that can include one or more computing systems 4601-1, 4601-2, 4601-3 and 4601-4, which may be operatively coupled via one or more networks 4609, which may include wired and/or wireless networks.

As an example, a system can include an individual computer system or an arrangement of distributed computer systems. In the example of FIG. 46, the computer system 4601-1 can include one or more modules 4602, which may be or include processor-executable instructions, for example, executable to perform various tasks (e.g., receiving information, requesting information, processing information, simulation, outputting information, etc.).

As an example, a module may be executed independently, or in coordination with, one or more processors 4604, which is (or are) operatively coupled to one or more storage media 4606 (e.g., via wire, wirelessly, etc.). As an example, one or more of the one or more processors 4604 can be operatively coupled to at least one of one or more network interface 4607. In such an example, the computer system 4601-1 can transmit and/or receive information, for example, via the one or more networks 4609 (e.g., consider one or more of the Internet, a private network, a cellular network, a satellite network, etc.).

As an example, the computer system 4601-1 may receive from and/or transmit information to one or more other devices, which may be or include, for example, one or more of the computer systems 4601-2, etc. A device may be located in a physical location that differs from that of the computer system 4601-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 4606 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices 4608.

Figure 47:
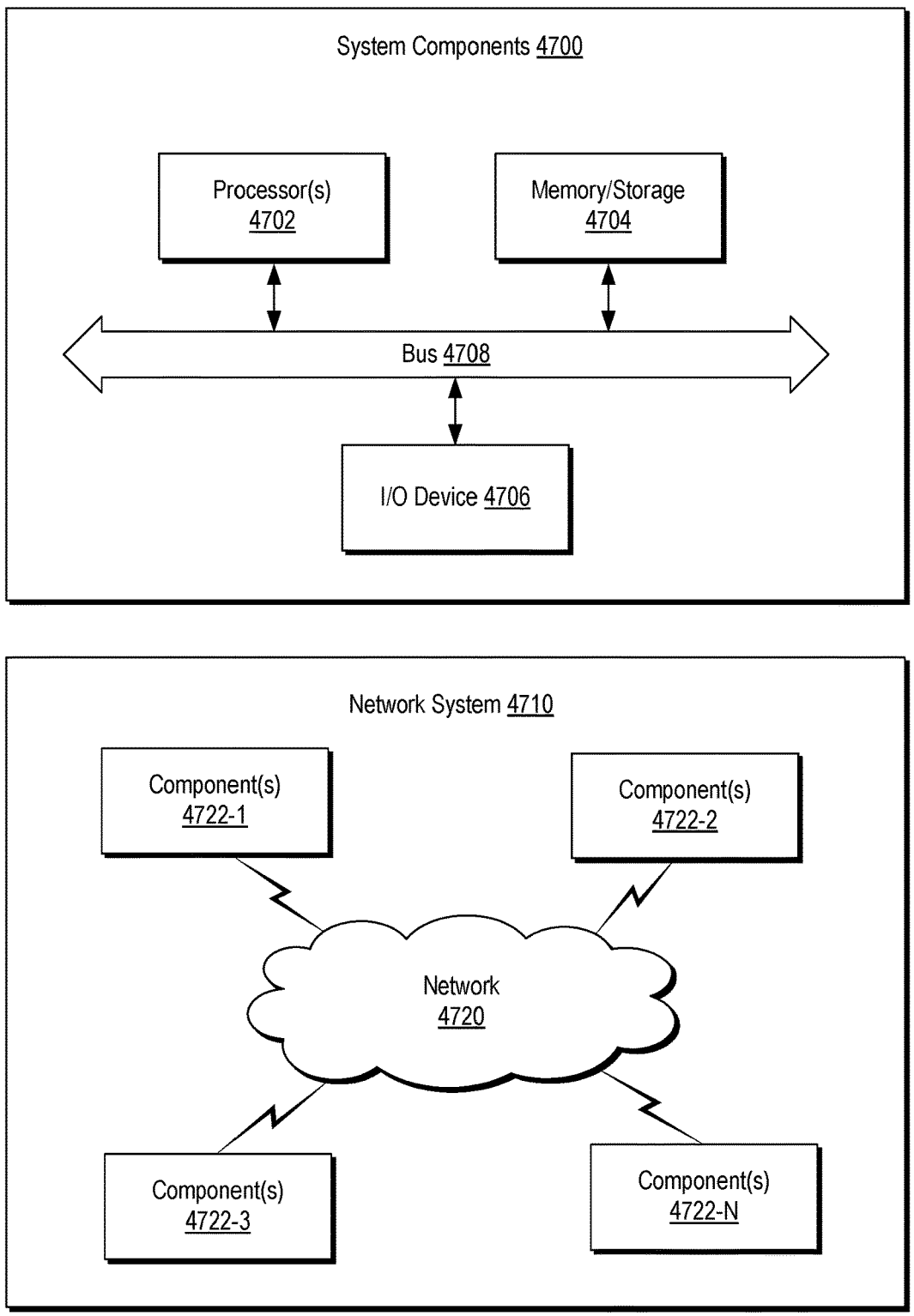
FIG. 47 illustrates example components of a system and a networked system.

FIG. 47 shows components of a computing system 4700 and a networked system 4710. As an example, one or more of the methods described herein may be implemented using one or more of the components shown in FIG. 47. The system 4700 includes one or more processors 4702, memory and/or storage components 4704, one or more input and/or output devices 4706 and a bus 4708. According to an embodiment, instructions may be stored in one or more computer-readable media (e.g., memory/storage components 4704). Such instructions may be read by one or more processors (e.g., the processor(s) 4702) via a communication bus (e.g., the bus 4708), which may be wired or wireless. The one or more processors may execute such instructions to implement (wholly or in part) one or more attributes (e.g., as part of a method). A user may view output from and interact with a process via an I/O device (e.g., the device 4706). According to an embodiment, a computer-readable medium may be a storage component such as a physical memory storage device, for example, a chip, a chip on a package, a memory card, etc.

According to an embodiment, components may be distributed, such as in the network system 4710. The network system 4710 includes components 4722-1, 4722-2, 4722-3, . . . 4722-N. For example, the components 4722-1 may include the processor(s) 4702 while the component(s) 4722-3 may include memory accessible by the processor(s) 4702. Further, the component(s) 4722-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
acquiring, via one or more downhole tool sensors, drilling performance data for a downhole tool;
modeling drilling performance of the downhole tool to generate results;
training a machine learning model using the drilling performance data and the results to generate a trained machine learning model, wherein training the machine learning model includes using the drilling performance data and the results to compute residuals associated with values of a drilling trajectory that comprises a dogleg during drilling;
predicting behavior of the downhole tool using the trained machine learning model;
selecting, based at least on the behavior of the downhole tool, the downhole tool for drilling a borehole;
operating the downhole tool in regularly spaced intervals that are proportioned into neutral periods and bias periods;
cycling a tool face of the downhole tool at a first rate during the neutral periods such that a net trajectory response of the downhole tool is approximately tangent with zero net curvature;
cycling the tool face of the downhole tool at a second rate during the bias periods such that the net trajectory response of the downhole tool has a curvature;
acquiring, via the one or more downhole tool sensors, second drilling performance data for the downhole tool during the drilling of the borehole; and
dynamically adjusting the trained machine learning model in real-time based on the second drilling performance data during the drilling of the borehole.

2. The method of claim 1, comprising:
outputting, via the trained machine learning model, control instructions based in part on the behavior of the downhole tool; and
controlling the drilling of the borehole based in part on the control instructions.

3. The method of claim 1, wherein the modeling the drilling performance of the downhole tool comprises utilizing a physics-based model.

4. The method of claim 1, wherein the machine learning model comprises a Gaussian process model.

5. The method of claim 1, wherein the trained machine learning model comprises an ensemble model.

6. The method of claim 1, wherein the training the machine learning model using the drilling performance data and the results to generate the trained machine learning model comprises computing one or more additional residuals.

7. The method of claim 6, wherein the one or more additional residuals comprise errors between the drilling performance data and the results.

8. The method of claim 1, comprising rendering a graphical user interface to a display based on the predicting the behavior of the downhole tool, optionally wherein the graphical user interface comprises dogleg information for the downhole tool.

9. The method of claim 1, comprising providing a trained pre-processing machine learning model that outputs one or more values for the downhole tool for the modeling the drilling performance of the downhole tool.

10. The method of claim 1, wherein the downhole tool comprises a rotary steerable system.

11. A system comprising:
a processor;
memory accessible by the processor;
processor-executable instructions stored in the memory and executable to instruct the system to:
  acquire, via one or more downhole tool sensors, drilling performance data for a downhole tool;
  model drilling performance of the downhole tool to generate results;
  train a machine learning model using the drilling performance data and the results to generate a trained machine learning model, wherein to train the machine learning model, the processor-executable instructions stored in the memory and executable to further instruct the system to compute residuals associated with values of a drilling trajectory that comprises a dogleg during drilling based on the results and the drilling performance data;
  predict behavior of the downhole tool using the trained machine learning model;
  select, based at least in part on the behavior of the downhole tool, the downhole tool for drilling a borehole;
  generate control instructions for operating the downhole tool in regularly spaced intervals that are proportioned into neutral periods and bias periods;
  generate control instructions for cycling a tool face of the downhole tool at a first rate during the neutral periods such that a net trajectory response of the downhole tool is approximately tangent with zero net curvature;
  generate control instructions for cycling the tool face of the downhole tool at a second rate during the bias periods such that the net trajectory response of the downhole tool has a curvature;
  acquire, via the one or more downhole tool sensors, second drilling performance data for the downhole tool during drilling of the borehole; and
  dynamically adjust the trained machine learning model in real-time based on the second drilling performance data during the drilling of the borehole.

12. One or more computer-readable storage media comprising processor-executable instructions to instruct a computing system to perform the method according to claim 1.

13. A method comprising:
acquiring first drilling performance data for a downhole tool;
modeling drilling performance of the downhole tool to generate results;
training a machine learning model using the first drilling performance data and the results to generate a trained machine learning model, wherein training the machine learning model includes using the drilling performance data and the results to compute residuals associated with values of a drilling trajectory that comprises a dogleg during drilling;
predicting behavior of the downhole tool using the trained machine learning model;
controlling a drilling operation that uses the downhole tool;
acquiring, via one or more downhole tool sensors, second drilling performance data for the downhole tool during the drilling operation;
dynamically adjusting the trained machine learning model in real-time based on the second drilling performance data during the drilling operation;
outputting, via the trained machine learning model, control instructions for the adjusting the downhole tool;
operating, based in part on the control instructions, the downhole tool in regularly spaced intervals that are proportioned into neutral periods and bias periods;
cycling, based in part on the control instructions, a tool face of the downhole tool at a first rate during the neutral periods such that a net trajectory response of the downhole tool is approximately tangent with zero net curvature; and
cycling, based in part on the control instructions, the tool face of the downhole tool at a second rate during the bias periods such that the net trajectory response of the downhole tool has a curvature.

14. The system of claim 11, wherein the one or more downhole tool sensors include at least one of a first sensor for measuring rotations per minute of a collar of the downhole tool, a second sensor for measuring a steering ratio demand of the downhole tool, or a third sensor for measuring a parameter of the tool face of the downhole tool.

15. The system of claim 11, wherein to generate the control instructions for drilling the borehole with the downhole tool, the processor-executable instructions stored in the memory and executable to further instruct the system to:
quantize drilling time cycles into regularly spaced intervals, wherein the regularly spaced intervals are further proportioned into the neutral and bias periods.

16. The method of claim 13, wherein the one or more downhole tool sensors include at least one of a first sensor for measuring rotations per minute of a collar of the downhole tool, a second sensor for measuring a steering ratio demand of the downhole tool, or a third sensor for measuring a parameter of the tool face of the downhole tool.

* * * * *